(12) United States Patent
Trabolsi et al.

(10) Patent No.: US 11,027,257 B2
(45) Date of Patent: Jun. 8, 2021

(54) POLYCALIXARENE MATERIALS, METHODS OF MAKING SAME, AND USES THEREOF

(71) Applicant: New York University in Abu Dhabi Corporation, Abu Dhabi (AE)

(72) Inventors: Ali Trabolsi, Abu Dhabi (AE); Dinesh Shetty, Karnataka (IN)

(73) Assignee: New York University in Abu Dhabi Corporation, Abu Dhabi (AE)

( * ) Notice: Subject to any disclaimer, the term of this patent is extended or adjusted under 35 U.S.C. 154(b) by 181 days.

(21) Appl. No.: 16/035,616

(22) Filed: Jul. 14, 2018

(65) Prior Publication Data

US 2019/0015814 A1 Jan. 17, 2019

Related U.S. Application Data

(60) Provisional application No. 62/532,651, filed on Jul. 14, 2017.

(51) Int. Cl.
| | |
|---|---|
| *B01J 20/26* | (2006.01) |
| *B01J 20/28* | (2006.01) |
| *C02F 1/28* | (2006.01) |
| *C08G 8/12* | (2006.01) |
| *C08J 3/24* | (2006.01) |
| *C02F 101/30* | (2006.01) |
| *C02F 101/32* | (2006.01) |

(52) U.S. Cl.
CPC ....... *B01J 20/267* (2013.01); *B01J 20/28061* (2013.01); *B01J 20/28064* (2013.01); *B01J 20/28066* (2013.01); *C02F 1/285* (2013.01); *C08G 8/12* (2013.01); *C08J 3/24* (2013.01); *C02F 2101/308* (2013.01); *C02F 2101/32* (2013.01); *C08J 2361/10* (2013.01)

(58) Field of Classification Search
CPC .............. B01J 20/267; B01J 20/28061; B01J 20/28064; B01J 20/28066; C02F 1/285; C02F 2101/308; C02F 2101/32; C08G 8/12; C08J 3/24; C08J 2361/10
See application file for complete search history.

(56) References Cited

U.S. PATENT DOCUMENTS

2015/0291494 A1* 10/2015 Huc .................. C08G 8/08
568/627

OTHER PUBLICATIONS

Adhikari, B., et al., "Solid phase extraction, preconcentration and separation of indium with methylene crosslinked calix[4]- and calix[6]arene carboxylic acid resins", Chemical Engineering Science, 78, 144-154. (Year: 2012).*
Gidwani, M.S., et al., "Chelating polycalixarene for the chromatographic separation of Ga(III), In(III) and Tl(III)", Reactive & functional polymers, 53, 143-156. (Year: 2002).*
Sameni, S., et al., "Calix[4]arene daisychains", Chemical Society Reviews, 38, 2117-2146. (Year: 2009).*

* cited by examiner

*Primary Examiner* — Benjamin L Lebron
(74) *Attorney, Agent, or Firm* — Hodgson Russ LLP

(57) ABSTRACT

Provided are porous polymeric materials, methods of making same, and methods of using same. The porous polymeric materials include crosslinked calixarene moieties. The porous polymeric materials can be added to a sample and absorb/adsorb pollutants present in the sample. The absorbed/adsorbed pollutant can further be isolated from the porous polymeric material. The porous polymeric materials can be recycled.

19 Claims, 45 Drawing Sheets
(36 of 45 Drawing Sheet(s) Filed in Color)

Contact angle:
155.4 ± 4.01°

| Sorbent | $k_{obs}$ (g/mg min) | Correlation coefficient $R^2$ | Time to reach equilibrium (min) |
|---|---|---|---|
| AC | 0.1290 | 1.0 | >60 |
| CalP2 | 0.0648 | 0.97 | 45 |
| CalP3 | 0.1019 | 1.0 | 20 |
| CalP4 | 2.1244 | 1.0 | 15 |

Figure 22

| Sorbent | $k_{obs}$ (g/mg min) | Correlation coefficient $R^2$ | Time to reach equilibrium (min) |
|---|---|---|---|
| AC | 0.1382 | 1.0 | >60 |
| CalP2 | 0.0476 | 0.92 | >60 |
| CalP3 | 0.0310 | 0.98 | 60 |
| CalP4 | 1.7515 | 1.0 | 30 |

Figure 23

| Sorbent | $k_{obs}$ (g/mg min) | Correlation coefficient $R^2$ | Time to reach equilibrium (min) |
|---|---|---|---|
| AC | 0.2404 | 1.0 | >60 |
| CalP2 | 0.0891 | 1.0 | >60 |
| CalP3 | 0.2725 | 1.0 | >60 |
| CalP4 | 9.6624 | 1.0 | 10 |

Figure 24

| Sorbent | $k_{obs}$ (g/mg min) | Correlation coefficient $R^2$ | Time to reach equilibrium (min) |
|---|---|---|---|
| AC | 0.3548 | 1.0 | >60 |
| CalP2 | 0.0587 | 0.9 | >60 |
| CalP3 | 0.3685 | 1.0 | >60 |
| CalP4 | 3.8206 | 1.0 | 45 |

Figure 25

|  | CalP2 | CalP2_Li | CalP3 | CalP3_Li | CalP4 | CalP4_Li |
|---|---|---|---|---|---|---|
| Structural Units | [structure with OH]₄ | [structure with O⁻Li⁺]₄ | [structure with OH]₄ | [structure with O⁻Li⁺]₄ | [structure with OH]₄ | [structure with O⁻Li⁺]₄ |
| Surface area (m²/g) | 596 | 274 | 630 | 308 | 759 | 445 |
| Triple bonds | 6 | 6 | 8 | 8 | 10 | 10 |
| Phenyl rings | 8 | 8 | 8 | 8 | 20 | 20 |
| Ionic bonds | 0 | 4 | 0 | 4 | 0 | 4 |
| I₂ adsorption (mg/g) | 884 | 1083 | 1960 | 2480 | 2200 | 3120 |

Figure 40

POLYCALIXARENE MATERIALS, METHODS OF MAKING SAME, AND USES THEREOF

CROSS REFERENCE TO RELATED APPLICATIONS

This application claims priority to U.S. Provisional Application No. 62/532,651, filed on Jul. 14, 2017, the disclosure of which is hereby incorporated by reference.

FIELD OF THE DISCLOSURE

The present disclosure relates to porous polymeric materials. More particularly, the disclosure provides porous polymeric materials comprising calixarenes, and synthesis and uses thereof.

BACKGROUND OF THE DISCLOSURE

Contamination of water with petroleum products, organic solvents, micropollutants and textile dyes causes a wide array of health problems in animals, as well as a range of environmental issues. The importance of preserving the environment, spurs the growing need for novel multi-functional materials that effectively remove these contaminants from the environment. Of several available decontamination methods, sorption presents several advantages for wastewater treatment. However, most of the adsorbents used have the common drawbacks including the high cost of production, limited regeneration ability and slow pollutant uptake.

Therefore, improved sorbent materials that combine, for example, high sorption capacity, high selectivity, cost efficiency, excellent recyclability, and that are environmentally friendly are needed for, for example, the management of broad category of atmospheric contaminants emitted from industry, nuclear power plant, transportation, and commercial products.

SUMMARY OF THE DISCLOSURE

The present disclosure provides, for example, for example, synthesis and characterization of a porous covalent calix[4]arene-based polymer (CalP) as well as its use for the removal of organic contaminants from water. CalP has high surface, large pore volume and good sorption capacity for a range of organic solvents, oils, and toxic dyes. The polymer can selectively absorb up to seven times its weight of oil from oil/water mixtures. From aqueous solutions, it can adsorb both anionic and cationic dyes in under 15 minutes. Its uptake capacity is significantly higher than those of the most adsorbent materials reported to date, including commercial activated carbon. Additionally, the polymer can be easily regenerated using mild washing procedures and reused several times with no loss of absorption efficiency. Uses of the CalP are also described.

In an aspect, the present disclosure provides polycalixarene materials comprising crosslinked calixarene moieties. The polycalixarene materials are porous polymeric materials.

In various examples, the polycalixarene has one or more calixarene moieties having the following structure:

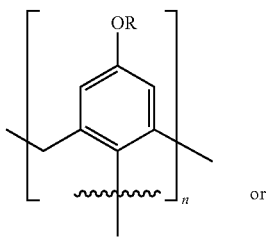
(Structure I)

or

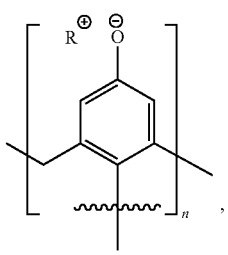
(Structure II)

where R is at each occurrence in the polymeric material is independently H, $Na^+$, $K^+$, $Cs^+$, $Li^+$, polyether group (e.g., hydroxyl terminated or sulfonic acid terminated polyether groups), polythioether group, or two R groups are linked by a polyether moiety or polythioether moiety, and n=4, 6, or 8.

In an aspect, the present disclosure provides methods of making porous polymeric materials. The methods are based on reaction of functionalized calixarenes and crosslinking compounds. In an example, the crosslinking compound comprises terminal alkyne groups and the polymerization is carried out using a Sonogashira-Hagira reaction. The Sonogashira-Hagira reaction is a convenient means for crosslinking calixarenes having reactive groups (e.g., bromine groups). This method has the additional benefits of alkyne functionality, which can endow materials with, for example, high surface area, high absorption capacity and provide superhydrophobicity. In an example, the crosslinking compound comprises boronic acid groups and/or boronate ester groups and the polymerization is carried out using an adapted Suzuki coupling reaction.

In an aspect, the present disclosure provides compositions. The compositions comprise one or more porous polymeric material of the present disclosure.

In an aspect, the present disclosure provides articles of manufacture and devices. The articles of manufacture or devices comprise one or more polycalixarene material of the present disclosure.

In an aspect, the present disclosure provides methods of using the porous polymeric materials. The methods are based on use of one or more porous polymeric material of the present disclosure. The methods can use an article of manufacture or device of the present disclosure. The methods are based on contacting a sample with one or more porous polymeric material to remove and, optionally, isolate one or more components of the sample. The methods can be separation methods.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a fuller understanding of the nature and objects of the disclosure, reference should be made to the following detailed description taken in conjunction with the accompanying figures.

In FIG. 3*a*) for each set of bars for 1-NA, 2-NO, BPA and propranolol, the bars from left to right are: AC, CalP2, CalP3, and CalP4. In FIG. 3*c*) for each set of bars for number of cycles 1, 2 and 3, the bars from left to right are Bispenhol A, and Propranolol.

FIG. 22 shows rates of bisphenol A uptake by different adsorbents. A comparison of the apparent second-order rate constants $k_{obs}$ of the uptake of bisphenol A (0.1 mM) uptake by each adsorbent (0.5 mg ml$^{-1}$), correlation coefficients ($R^2$) of the fit to the pseudo-second-order kinetic model, and the required contact time (in minutes) to reach equilibrium.

FIG. 23 shows rates of propranolol.HCl uptake by different adsorbents. A comparison of the apparent second-order rate constants $k_{obs}$ of the uptake of propranolol.HCl (0.1 mM) uptake by each adsorbent (0.5 mg ml$^{-1}$), correlation coefficients ($R^2$) of the fit to the pseudo-second-order kinetic model, and the required contact time (in minutes) to reach equilibrium.

FIG. 24 shows rates of 1-naphthylamine uptake by different adsorbents. A comparison of the apparent second-order rate constants $k_{obs}$ of the uptake of 1-naphthylamine (0.1 mM) uptake by each adsorbent (0.5 mg ml$^{-1}$), correlation coefficients ($R^2$) of the fit to the pseudo-second-order kinetic model, and the required contact time (in minutes) to reach equilibrium.

FIG. 25 shows rates of 2-naphthol uptake by different adsorbents. A comparison of the apparent second-order rate constants $k_{obs}$ of the uptake of 1-naphthol (0.1 mM) uptake by each adsorbent (0.5 mg ml$^{-1}$), correlation coefficients ($R^2$) of the fit to the pseudo-second-order kinetic model, and the required contact time (in minutes) to reach equilibrium.

FIG. 40 shows a summary of structural characteristics, surface areas and $I_2$ uptake capacities of CalPn and CalPn-Li polymers.

DETAILED DESCRIPTION OF THE DISCLOSURE

Figure 1:
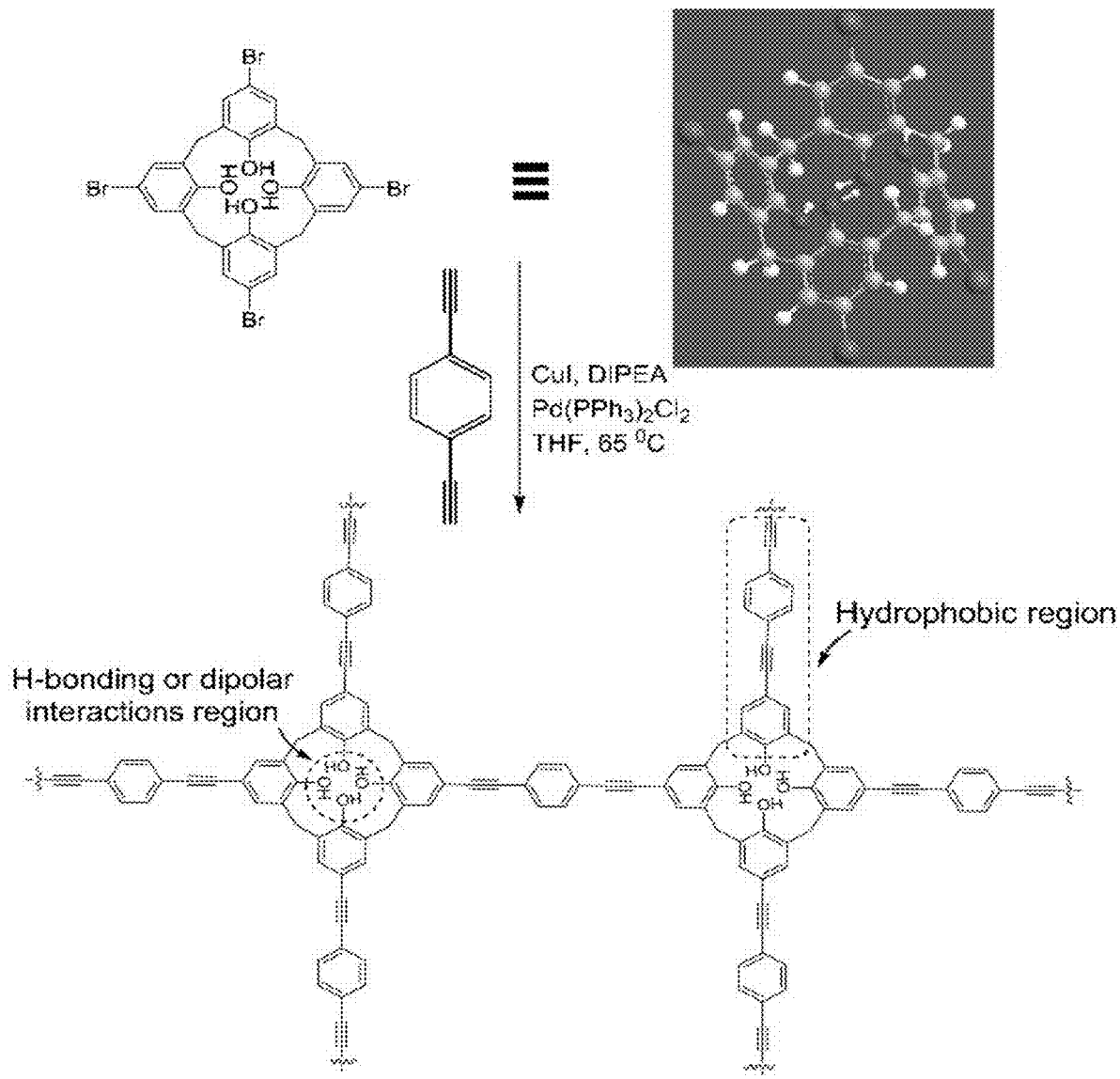
FIG. 1 shows a synthetic route to porous calix[4]arene polymer CalP by Sonogashira-Hagihara cross-coupling. Plausible sites on the polymer for interaction with pollutants are demarcated by dotted lines.

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides porous polymeric materials comprising calixarenes, synthesis of porous polymeric materials of the present disclosure, and methods of using porous polymeric materials of the present disclosure to separate components of a sample.

As used herein, unless otherwise stated, the term "group" refers to a chemical entity that has one terminus that can be covalently bonded to other chemical species. Examples of groups include, but are not limited to:

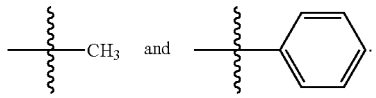

As used herein, unless otherwise stated, the term "moiety" refers to a chemical entity that has two or more termini that can be covalently bonded to other chemical species. Examples of moieties include, but are not limited to:

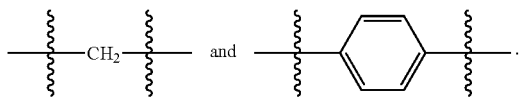

As used herein, unless otherwise indicated, the term "aliphatic" refers to branched or unbranched hydrocarbon moieties/groups that are saturated or, optionally, contain one or more degrees of unsaturation. Moieties/groups with degrees of unsaturation include, but are not limited to, alkenyl groups/moieties, alkynyl groups/moieties, and cyclic aliphatic groups/moieties. For example, the aliphatic group can be a $C_1$ to $C_{40}$ (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, and $C_{40}$), including all integer numbers of carbons and ranges of numbers of carbons therebetween, aliphatic group/moiety (e.g., alkyl group). Examples of substituents include, but are not limited to, substituents such as, for example, halogens (—F, —Cl, —Br, and —I), aliphatic groups (e.g., alkyl groups, alkenyl groups, alkynyl groups, and the like), halogenated aliphatic groups (e.g., trifluoromethyl group), aryl groups, halogenated aryl groups, alkoxide groups, amine groups, nitro groups, carboxylate groups, carboxylic acids, ether groups, alcohol groups, alkyne groups (e.g., acetylenyl groups and the like), and the like, and combinations thereof.

As used herein, unless otherwise indicated, the term "alkyl" refers to branched or unbranched, linear saturated hydrocarbon groups/moieties and/or cyclic hydrocarbon groups/moieties. Examples of alkyl groups/moieties include, but are not limited to, methyl groups/moieties, ethyl groups/moieties, propyl groups/moieties, butyl groups/moieties, isopropyl groups/moieties, tert-butyl groups/moieties, cyclopropyl groups/moieties, cyclopentyl groups/moieties, cyclohexyl groups/moieties, and the like. Alkyl groups/moieties are saturated groups/moieties, unless it is a cyclic group/moiety. For example, the alkyl groups/moieties are a $C_1$ to $C_{40}$ alkyl group/moiety, including all integer numbers of carbons and ranges of numbers of carbons therebetween (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, and $C_{40}$). The alkyl group/moiety can be unsubstituted or substituted with one or more substituent. Examples of substituents include, but are not limited to, substituents such as, for example, halogens (—F, —Cl, —Br, and —I), aliphatic groups (e.g., alkyl groups, alkenyl groups, alkynyl groups, and the like), halogenated aliphatic groups (e.g., trifluoromethyl group), aryl groups, halogenated aryl groups, alkoxide groups, amine groups, nitro groups, carboxylate groups, carboxylic acids, ether groups, alcohol groups, alkyne groups (e.g., acetylenyl groups and the like), and the like, and combinations thereof.

As used herein, unless otherwise indicated, the term "aryl" refers to $C_5$ to $C_{30}$, including all integer numbers of carbons and ranges of numbers of carbons therebetween (e.g., $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, and $C_{30}$), aromatic or partially aromatic carbocyclic groups/moieties. An aryl group/moiety can also be referred to as an aromatic group/moiety. The aryl groups/moieties can comprise polyaryl moieties such as, for example, fused ring or biaryl moieties. The aryl group/moiety can be unsubstituted or substituted with one or more substituent. Examples of substituents include, but are not limited to, substituents such as, for example, halogens (—F, —Cl, —Br, and —I), aliphatic groups (e.g., alkenes, alkynes, and the like), aryl groups, alkoxides, carboxylates, carboxylic acids, ether groups, and the like, and combinations thereof. Examples of aryl groups/moieties include, but are not limited to, phenyl groups/moieties, biaryl groups/moieties (e.g., biphenyl groups/moieties and the like), and fused ring groups/moieties (e.g., naphthyl groups/moieties and the like).

As used herein, unless otherwise indicated, the term "heteroaryl" refers to a $C_5$ to $C_{30}$, including all integer numbers of carbons and ranges of numbers of carbons therebetween (e.g., $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, and $C_{30}$), monocyclic, polycyclic, or bicyclic ring groups/moieties (e.g., aryl groups) comprising one or two aromatic rings containing at least one heteroatom (e.g., nitrogen, oxygen, sulfur, and the like) in the aromatic ring(s). The heteroaryl groups/moieties can be substituted or unsubstituted. Examples of heteroaryl groups/moieties include, but are not limited to, benzofuranyl groups/moieties, thienyl groups/moieties, furyl groups/moieties, pyridyl groups/moieties, pyrimidyl groups/moieties, oxazolyl groups/moieties, quinolyl groups/moieties, thiophenyl groups/moieties, isoquinolyl groups/moieties, indolyl groups/moieties, triazinyl groups/moieties, triazolyl groups/moieties, isothiazolyl groups/moieties, isoxazolyl groups/moieties, imidazolyl groups/moieties, benzothiazolyl groups/moieties, pyrazinyl groups/moieties, pyrimidinyl groups/moieties, thiazolyl groups/moieties, and thiadiazolyl groups/moieties, and the like. Examples of substituents include, but are not limited to, substituents such as, for example, halogens (—F, —Cl, —Br, and —I), aliphatic groups (e.g., alkyl groups, alkenyl groups, alkynyl groups, and the like), aryl groups, alkoxide groups, amine groups, carboxylate groups, carboxylic acids, ether groups, alcohol groups, alkyne groups (e.g., acetylenyl groups and the like), and the like, and combinations thereof.

The present disclosure provides, for example, for example, synthesis and characterization of a porous covalent calix[4]arene-based polymer (CalP) as well as its use for the removal of organic contaminants from water. CalP has high surface, large pore volume and good sorption capacity for a range of organic solvents, oils, and toxic dyes. The polymer can selectively absorb up to seven times its weight of oil from oil/water mixtures. From aqueous solutions, it can adsorb both anionic and cationic dyes in under 15 minutes. Its uptake capacity is significantly higher than those of the most adsorbent materials reported to date, including commercial activated carbon. Additionally, the polymer can be easily regenerated using mild washing procedures and reused several times with no loss of absorption efficiency. Uses of the CalP are also described.

In an aspect, the present disclosure provides polycalixarene materials. The polycalixarene materials comprise calixarenes, at least a portion thereof or all of which are crosslinked. The polycalixarene materials are porous polymeric materials. The porous polymeric materials can simply be referred to as polymers.

In an example, a porous polymeric material comprises a plurality of calixarene moieties (e.g., calix[4]arene, calix[6]arene, or calix[8]arene moieties, or a combination thereof) crosslinked by one or more crosslinking moieties (e.g., crosslinking moieties comprising aryl moiety or crosslinking moieties comprising an aryl moiety and two or more alkynyl moieties). The calixarene moieties are crosslinked via covalent bonds to calixarene moiety aryl rings.

In various examples, the polycalixarene has one or more calixarene moieties having the following structure:

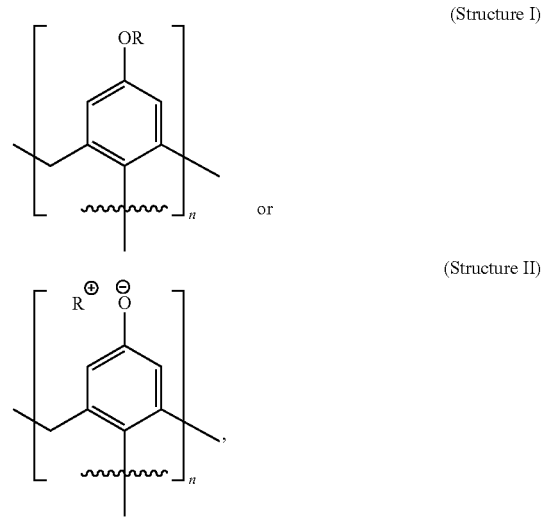

where R at each occurrence in the polymeric material is independently H, $Na^+$, $K^+$, $Cs^+$, $Li^+$, polyether group (e.g., hydroxyl terminated or sulfonic acid terminated polyether groups), polythioether group, or two R groups are linked by a polyether moiety, polythioether moiety or the like, and n=4, 6, or 8.

One or more phenyl ring of one or more calixarene moiety may be substituted with one or two substituents. Non-limiting examples of substituents include —Br, —$NO_2$, —$N_3$, -PhCHO, -$PhNH_2$, —$(CH_2)_n$SMe, and the like.

A polycalixarene can have all the same calixarene moieties or a combination of different moieties. A polycalixarene with a combination of different calixarene moieties can have calixarene moieties with different numbers of aryl moieties (e.g., phenyl units and the like) and/or different substituents (e.g., R groups and/or phenyl substitutions).

A polycalixarene can have various crosslinking moieties. In an example, a porous polymeric material comprises crosslinking moieties (e.g., fully conjugated moieties) having 5 to 40 carbons, including all carbon integer values and ranges therebetween, and comprises one or more $C_5$-$C_{30}$ aryl moiety (e.g., substituted and/or unsubstituted phenyl moieties, biphenyl moieties, and the like), including all carbon integer values and ranges therebetween. In another example, a polymeric material comprises crosslinking moieties (e.g., fully conjugated moieties) having 5 to 40 carbons, including all carbon values and ranges therebetween, and comprises one or more $C_5$-$C_{30}$ aryl moieties (e.g., substituted and/or unsubstituted phenyl moieties, biphenyl moieties, and the like), including all carbon integer values and ranges therebetween, and one or more $C_2$ alkynyl moiety.

A crosslinking moiety can have various aryl moieties. For example, a crosslinking moiety comprises one or more aryl moieties, each aryl moiety comprising one or more fused-ring moiety and/or one or more biaryl moiety.

In an example, a crosslinking moiety has the following structure: —Ar—$(R^2)_x$, where Ar is independently at each occurrence in the porous polymeric material comprises one or more $C_5$-$C_{30}$ aryl moiety (e.g., a $C_5$-$C_{20}$ aryl moiety) (e.g., substituted and/or unsubstituted phenyl moieties and biphenyl moieties), including all carbon integer values and ranges therebetween, $R^2$ are independently at each occurrence in the porous polymeric material a $C_2$ alkynyl moiety, and x is 2, 3, or 4. The Ar moiety can be substituted. Non-limiting examples of Ar substituents include halogens (e.g., —F), —OH, —O-alkyl, and —S-alkyl (e.g., —SCH$_2$CH$_3$ and SCH$_2$CH$_2$CH$_3$, and the like)

In an example, the crosslinking moiety has the following structure: —R$^1$—Ar—R$^2$—, where R$^1$ and R$^2$ are independently at each occurrence in the porous polymeric material a C$_2$ alkynyl moiety.

In an example, an Ar moiety further comprises one or more aryl linking moiety that is covalently bound to two or more aryl moieties. Non-limiting examples of aryl linking moieties include C$_1$-C$_6$ aliphatic moieties, including all carbon integer values and ranges therebetween, —S(O)—, phosphorous atom, nitrogen atom, C$_5$-C$_{30}$ aryl (e.g., C$_5$-C$_{20}$ aryl), including all carbon values and ranges therebetween, (e.g., substituted and/or unsubstituted phenyl moieties and the like, and biphenyl moieties and the like), heteroaryl moieties (e.g., substituted and/or unsubstituted pyridinium moieties, bipyridinium moieties, and the like), and combinations thereof.

In various examples, a crosslinking moiety has the following structure:

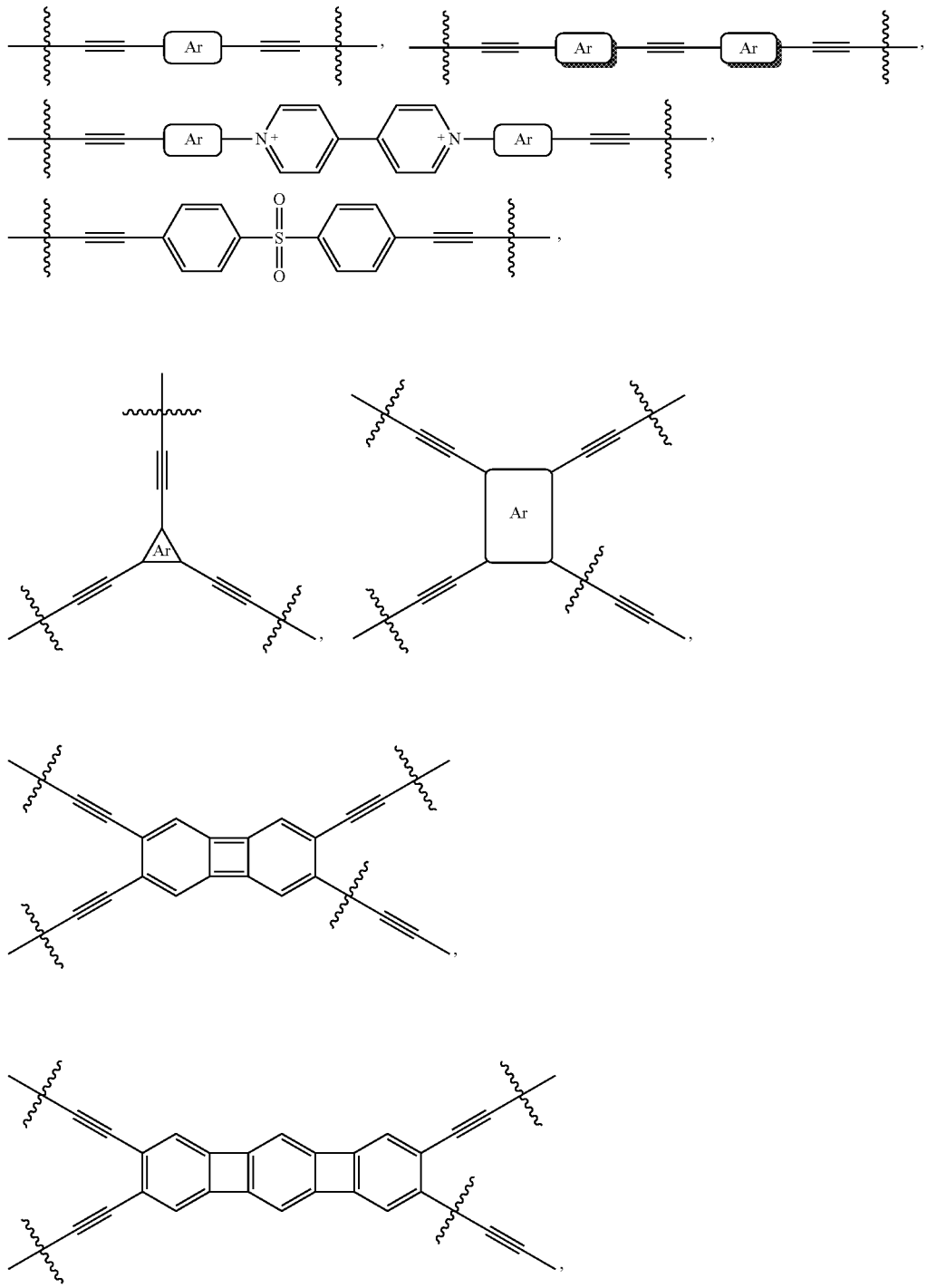

-continued
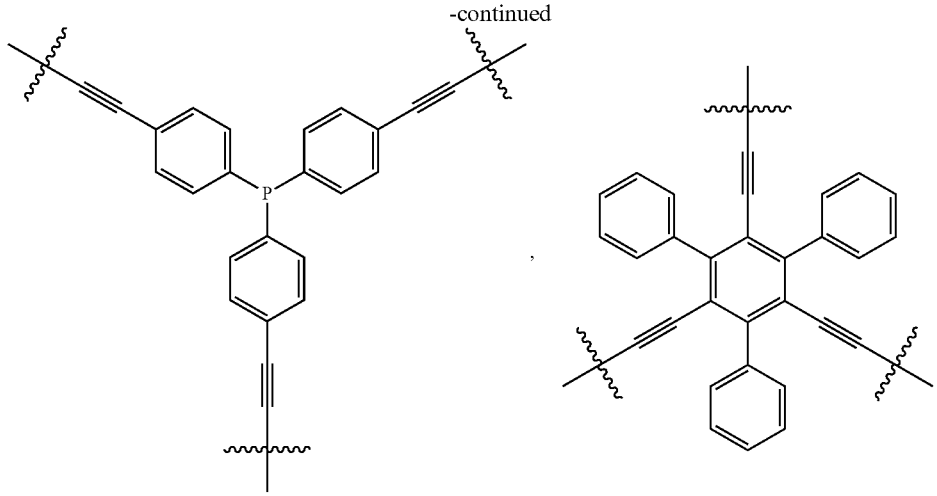
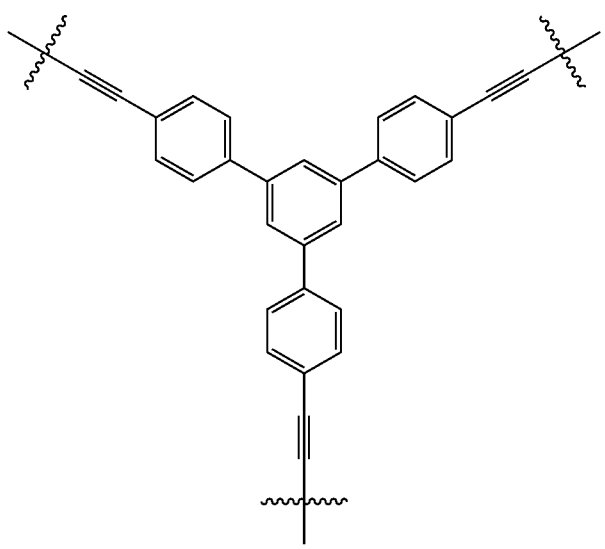, or
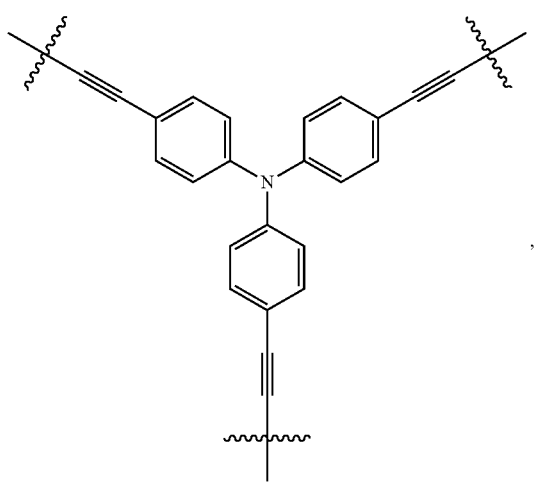
where Ar is as described herein. In various examples, a polycalixarene of the present disclosure comprises one or more of these examples of crosslinking moieties.

In various examples, a crosslinking moiety has the following structure:

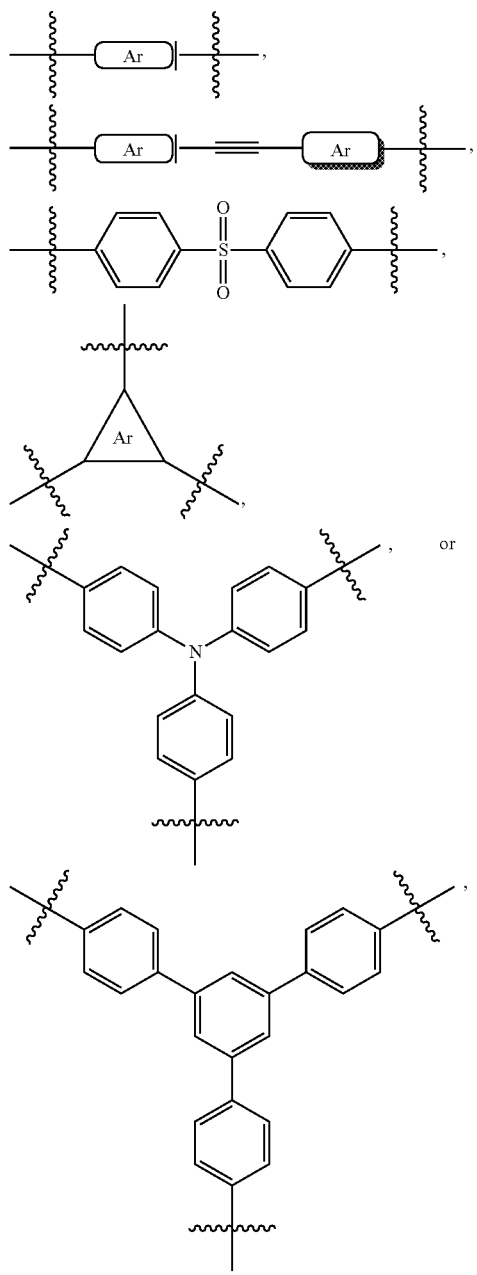

where Ar is as described herein. In various examples, a polycalixarene of the present disclosure comprises one or more of these examples of crosslinking moieties.

For example, the porous polymeric material can have various porosity (e.g., in terms of pore size, pore morphology, pore structure, or a combination thereof). The porous polymeric material of the present disclosure can have pores ranging in size (i.e., the longest dimension (e.g., diameter) of an orifice of a pore) from 1 nm to 50 nm, including all 0.1 nm values and ranges therebetween. In an example, the porous polymeric material is mesoporous and/or microporous. In various examples, 50% or more, 80% or more, 90% or more, 95% or more, 99% or more of the pores in the porous polymeric material are 1 nm to 50 nm in size.

For example, the porous polymeric material can have various amounts of surface area. For example, the porous polymeric material has a Brunauer-Emmett-Teller (BET) surface area of 100 $m^2/g$ to 5000 $m^2/g$, including all integer $m^2/g$ values and ranges therebetween. In another example, the porous polymeric material has a Brunauer-Emmett-Teller (BET) surface area of 100 $m^2/g$ to 2000 $m^2/g$, including all integer $m^2/g$ values and ranges therebetween.

For example, the porous polymeric material can have various morphologies. In various examples, the polymeric materials has nanosheet, capsule, sphere, nanorod, or the like morphology, or a combination thereof. For example, the porous polymeric material is amorphous and/or comprises nanosheets, capsules, spheres, nanorods or a combination thereof. In another example, the porous polymeric material has no observable specific morphology.

The porous polymeric materials are superhydrophobic. For example, the porous polymeric materials have a contact angle of 120 degrees to 180 degrees, including all 0.1 degree values and ranges therebetween. The polymer's hydrophobicity can be determined by methods known in the art (e.g., contact angle measurements). For example, water droplets (7.0 μL) can be placed onto manually ground calixarene polymer powder fixed on Scotch tape (it is desirable that powder provides a smooth surface) and the contact angle was measured using a suitable instrument, such as, for example, dataPhysics OCA 15EC Contact Angle (sessile drop, manual fitting) instrument.

The porous polymeric materials have very limited solubility in water and common organic solvents. In an example, the porous polymeric materials have no observable solubility in water and common organic solvents. Non-limiting examples of common organic solvents include ethanol, acetone, tetrahydrofuran, dimethylformamide (DMF), dimethylacetamide (DMA), chloroform, dichloromethane, 1,4-dioxane, and the like. Solubility can be determined by methods known in the art.

The porous polymeric materials exhibit chemical and/or thermal stability. For example, the porous polymeric material are stable in both acidic and basic conditions and/or are thermally stable at temperatures of 600° C. or greater (e.g., to the decomposition temperature).

In an aspect, the present disclosure provides methods of making porous polymeric materials. The methods are based on reaction of functionalized calixarenes and crosslinking compounds.

In an example, the crosslinking compound composes two or more groups that can react in a polymerizing reaction (e.g., the crosslinking compound comprises terminal alkyne groups and the polymerization is carried out using a Sonogashira-Hagihara reaction). The Sonogashira-Hagira reaction is a convenient means for cross-linking calixarenes having reactive groups (e.g., bromine groups). This method brings has the additional benefits of, such as, for example, alkyne functionality, which can endow materials desirable properties, such as, for example, high surface area, high absorption capacity, provide superhydrophobicity, or a combination thereof. In an example, the crosslinking compound comprises boronic acid groups and/or boronate ester groups and the polymerization is carried out using an adapted Suzuki coupling reaction.

In an embodiment, the porous polymeric materials of the present disclosure comprise calixarene moieties crosslinked by aryl moieties (e.g., multiple aryl moieties). In various embodiments, these polymers exhibit desirable chemical stability in acidic or basic aqueous solutions. In an embodiment, the number of linkers connected to the calixarene units were equal to number of brominated positions in the macrocycle.

In an example, a method of preparing a porous polymeric material of the present disclosure comprises reacting one or more calixarene compounds (e.g., calix[4]arene, calix[6]arene, calix[8]arene compounds, and/or the like) having a plurality of reactive groups (e.g., bromine groups (e.g., individually having 2, 3, 4, 5, 6, 7, or 8 bromo groups)), iodo groups (e.g., individually having 2, 3, 4, 5, 6, 7, or 8 iodo groups), triflate groups (e.g., individually having 2, 3, 4, 5, 6, 7, or 8 triflate groups), and the like) with one or more crosslinking compounds having i) at least two terminal alkyne groups or ii) at least two boronic acid groups and/or boronate ester groups in the presence of a metal catalyst, where the porous polymeric material is formed.

Various calixarene compounds can be used. The calixarene compounds have a plurality of reactive groups (e.g., bromo groups (e.g., 2, 3, 4, 5, 6, 7, or 8 bromo groups) on one or more benzene rings of the calixarene compounds. Examples of calixarene compounds include, but are not limited to, tetrabromo-calix[4]arene-tetrol (5,11,17,23-tetrabromo-25,26,27,28-tetrahydroxycalix[4]arene), hexabromo-calix[6]arene-hexol, octabromo-calix[8]arene-octol, p-sulfonatocalix[4,6,8]arenes, thia-crown-calix[4,6,8]arenes. Combinations of structurally distinct calixarenes can be used.

In various examples, a calixarene compound has the following structure:

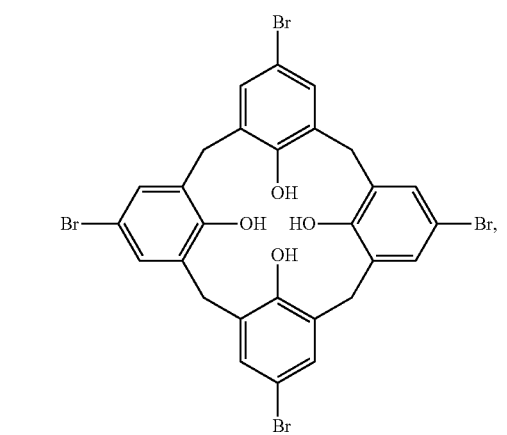

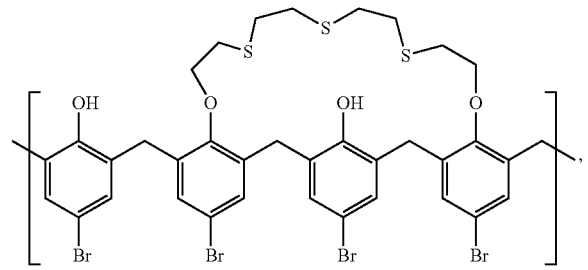

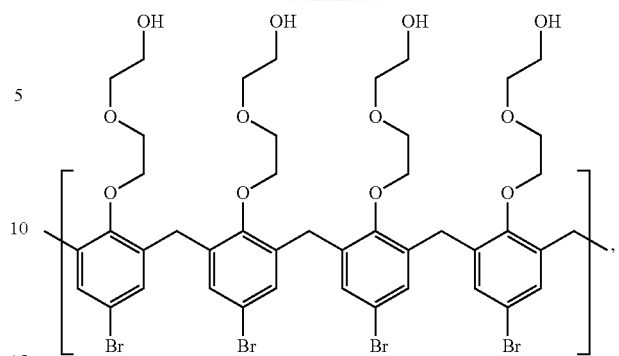

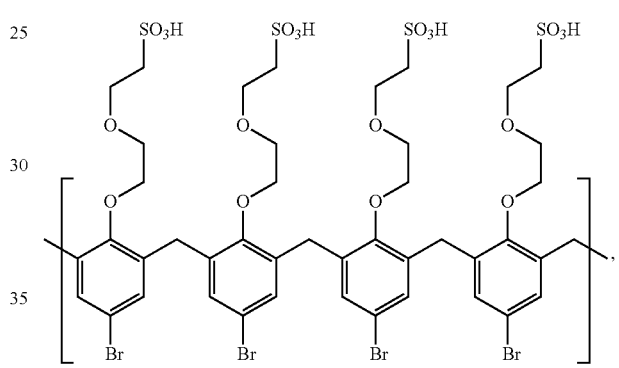

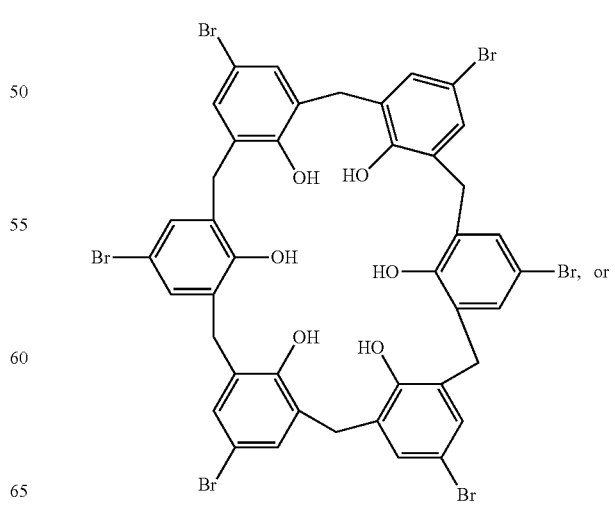

-continued

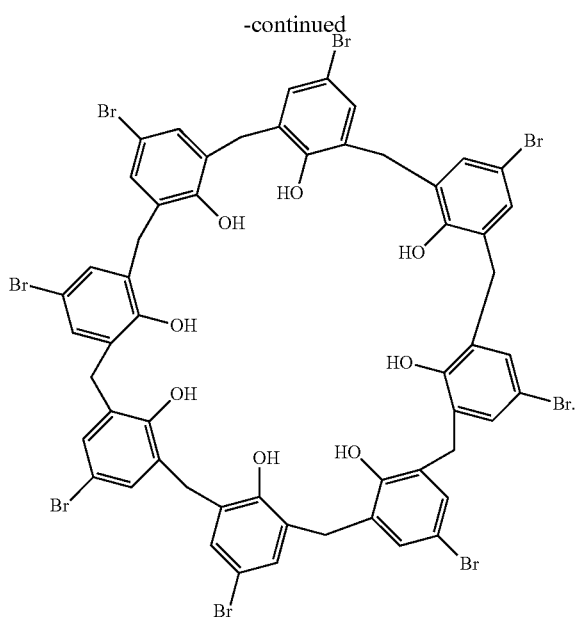

In various examples, these compounds are iodo or triflate analogs. Combinations of calixarene compounds can be used.

Various crosslinking compounds can be used. Combinations of crosslinking compounds can be used. In an example, the crosslinking compound provides a crosslinking moiety described herein. In another example, the crosslinking compounds are selected from the group consisting of 1,4-diethynylbenzene, 1,3,5-triethynylbenzene, 1,3,6,8-tetraethynylpyrene, di-, tri- and tetra-ethynyl derivatives of substituted and/or unsubstituted phenyl moieties, biphenyl moieties, or heteroaryl moieties, and combinations thereof.

In various examples, a crosslinking compound has one the following structures:

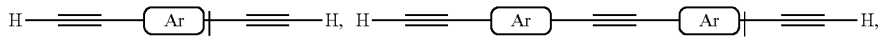

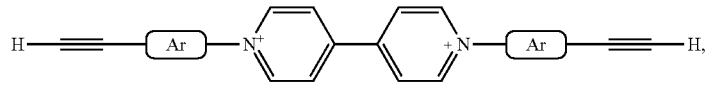

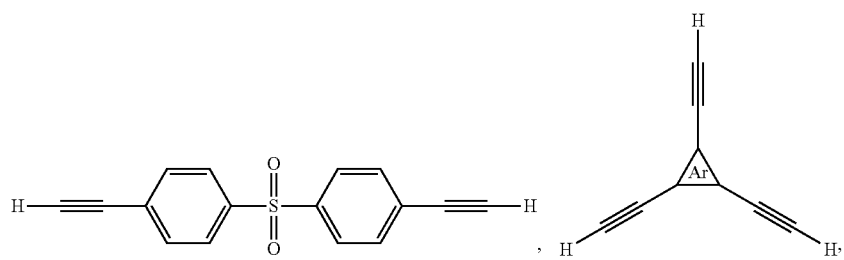

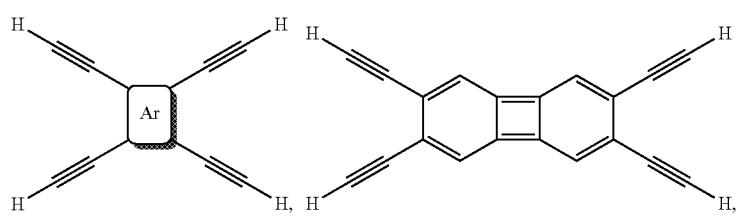

-continued
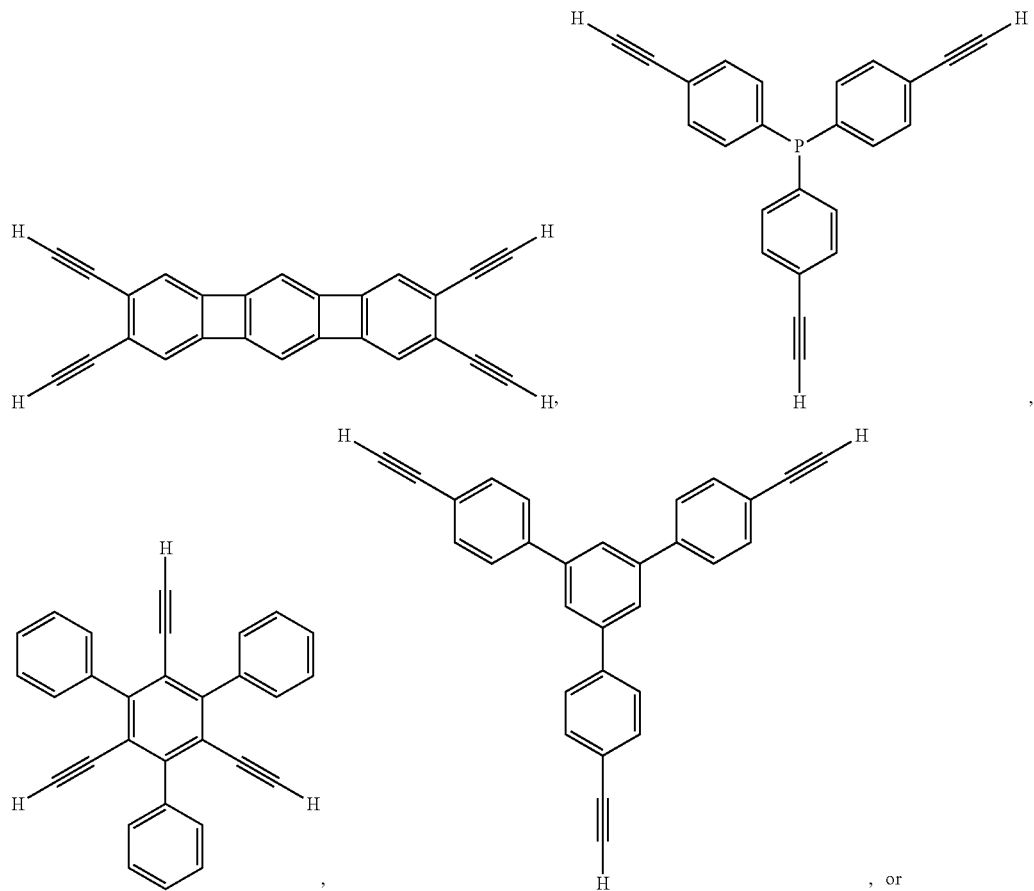
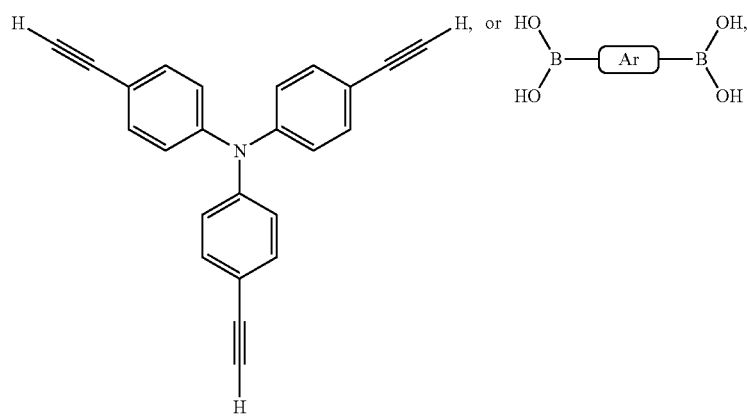
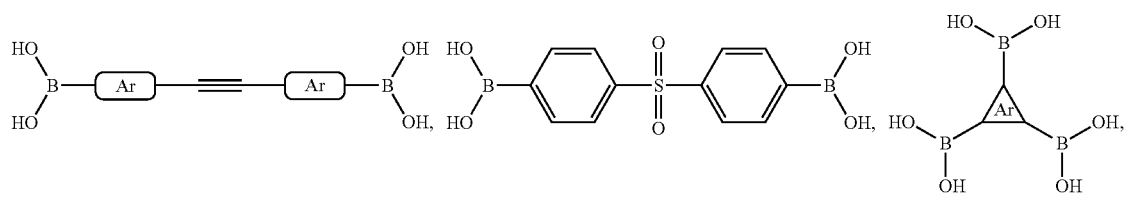

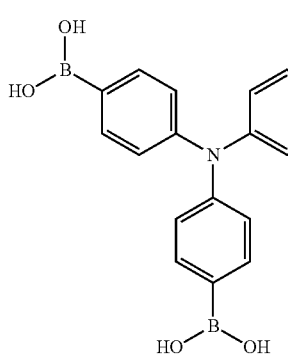 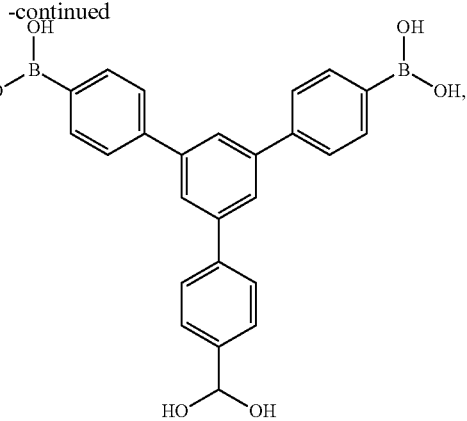

where Ar is as described herein. Combinations of crosslinking compounds can be used.

The stoichiometric ratio of calixarene compound(s) to crosslinking compound(s) can depend on the number of polymerizable reactive groups (e.g., —Br in case of calixarenes and alkyne in case of crosslinkers). It is desirable that the stoichiometric ratio of calixarene compound(s) to crosslinking compound(s) used is 1:1. In an example, the stoichiometric ratio of the bromo groups of the one or more calixarene compounds to crosslinking compounds is 1:1.

The amount of crosslinking compound(s) used can also vary depending on the specific crosslinking compound(s) used. Typically, the amount of crosslinking compound used is in the range of 1.4 mM to 2.8 mM.

The reacting can be carried out in various solvents. Mixtures of solvents can be used. Examples of suitable solvents include, but are not limited to, THF, 1,4-dioxane and the like.

A metalated (e.g., lithiated) porous polymeric material can be made. In an example, a porous polymeric material comprising a plurality of phenoxy groups (e.g., where R is H in polycalixarene Structure I or Structure II above) is contacted with an alkyl lithium compound (e.g., n-butyl lithium) or metal source (e.g., LiOH, KOH, NaOH, and combinations thereof), where a metalated porous polymeric material is formed. In an example, a method of the present disclosure further comprise this step.

Typically, the crosslinking reaction is complete. Typically, there are not any detectable free, unreacted alkyne groups or unreacted boric acid and/or boronate ester groups in the polymeric network. In various examples, the crosslinking reaction is carried out by methods described herein and/or by methods known in the art. The remaining amount (or absence thereof) of unreacted alkyne or unreacted boric acid and/or boronate ester can be detected by methods known in the art.

The polymers can have a pore size distribution mainly in the mesopore region, non-local density functional theory (NLDFT) average pore diameter is in the range of 62-97 Å, including all angstrom values and ranges therebetween, and a cumulative pore volume is in the range of 0.56-1.09 $cm^3g^{-1}$, including all 0.001 $cm^3g^{-1}$ values and ranges therebetween. For example, in an embodiment, the Brunauer-Emmett-Teller (BET) model gives a specific surface area in the range of 596-759 $m^2g^{-1}$, including all $m^2g^{-1}$ values and ranges therebetween. For example, porous polymeric materials of the present disclosure having the aforementioned properties may be superhydrophobic and may float in aqueous solutions.

Phenolic hydroxyl groups of a calixarene lower rim can be metallated (e.g., with metals such as, for example, Li, Na, K, Cs) under solvothermal conditions using relevant metal salts. In various examples, metallation significantly increases the $CO_2$ uptake by porous polymeric materials of the present disclosure.

In an aspect, the present disclosure provides compositions. The compositions comprise one or more porous polymeric material of the present disclosure.

In an aspect, the present disclosure provides articles of manufacture and devices. The articles of manufacture or device comprise one or more porous polymeric material of the present disclosure.

For example, the article of manufacture or device is used to carry out separations. In various examples, the article of manufacture is a column or filter cartridge. that comprises one or more porous polymeric material of the present disclosure and/or porous polymeric material made by a method of the present disclosure. In various examples, the devices comprises a column or filter cartridge that comprises one or more porous polymeric material of the present disclosure and/or porous polymeric material made by a method of the present disclosure.

In an aspect, the present disclosure provides methods. The methods are based on use of one or more porous polymeric material of the present disclosure. The methods can use an article of manufacture or device of the present disclosure. The methods are based on contacting a sample with one or more porous polymeric material to remove and optionally, isolate one or more components of the sample. The methods can be separation methods.

The methods can be methods of purifying a sample (e.g., a fluid sample or a vapor phase sample). In an example, a method of purifying a sample (e.g., a fluid sample) comprising one or more pollutants (e.g., petroleum products, organic solvents, textile dyes, iodine, organic micropollutants including, for example, Bisphenol A, perfluorinated chemicals (PFCs), toxic metals, and oxoanions). In an example, a method of purifying a sample (e.g., a fluid sample) comprises contacting the fluid sample with one or more porous polymeric material of the present disclosure, polymeric material of the present disclosure, article of manufacture of the present disclosure, or device of the present disclosure, whereby at least 80% by weight or mol % (e.g., at least 85% by weight or mol %, at least 90% by weight or mol %, at least 95% by weight or mol %, at least 99% by weight or mol %, at least 99.9% by weight or mol %, or 100% by weight or mol %) of the total amount of the one or more pollutants in the fluid sample is adsorbed by the porous polymeric material.

In an example, the method of using a porous polymeric material of the present disclosure comprises:

a) contacting the sample with a porous polymeric material, composition comprising a porous polymeric material, article of manufacture comprising a porous polymeric material, or device comprising a porous polymeric material of the present disclosure for an incubation period;

b) separating the porous polymeric material, composition comprising a porous polymeric material, article of manufacture comprising a porous polymeric material, or device comprising a porous polymeric material of the present disclosure from a) from the sample; and c) heating the porous polymeric material, composition comprising a porous polymeric material, article of manufacture comprising a porous polymeric material, or device comprising a porous polymeric material of the present disclosure from b) or contacting the porous polymeric material, composition comprising a porous polymeric material, article of manufacture comprising a porous polymeric material, or device comprising a porous polymeric material of the present disclosure from b) with a solvent such that at least a portion of the compounds are the released by the porous polymeric material, composition comprising a porous polymeric material, article of manufacture comprising a porous polymeric material, or device comprising a porous polymeric material of the present disclosure; and d) determining the presence or absence of any compounds, wherein the presence of one or more compounds correlates to the presence of the one or more compounds in the sample, or isolating the compounds.

The methods can further comprise one or more additional steps. Non-limiting examples of additional steps include, removing at least a portion or all of the pollutants adsorbed by the porous polymeric material and reusing the porous material from which at least part or all of the pollutants have been removed. The adsorbed compounds may be removed by washing procedures. For example, adsorbed polymer can be soaked in EtOH, MeOH, or acidic aqueous solution for different time intervals (ranging from min (minutes) to hrs (hours)) and centrifuged to remove the filtrate. The procedure can be repeated. For example, the procedure may be repeated at least 3 times to remove most of the adsorbed materials from the polymer. Post-washing polymers can be dried and re-used for adsorption.

A sample can be contacted with the porous polymeric material in various ways. In various examples, the sample flows across, around, or through the porous polymeric material.

A sample can be contacted with the porous polymeric material under dynamic conditions (e.g., stirring) for an incubation period and after an incubation period and, optionally, the sample is separated from the porous polymeric material.

Various samples can be used in the methods. Non-limiting examples of samples include, aqueous samples such as, for example, drinking water, wastewater, ground water, sea water, aqueous extract from contaminated soil, or landfill leachate, and vapor phase samples such as, for example, vapor phase sample comprising iodine vapor.

The methods can be methods of determining the presence or absence of compounds (e.g., petroleum products, organic solvents, textile dyes, organic micropollutants, iodine vapor) in a sample (e.g., a fluid sample). In an example, a method of determining the presence or absence of compounds in a sample comprises: contacting the sample with one or more porous polymeric material of the present disclosure, polymeric material of the present disclosure, article of manufacture of the present disclosure, or device of the present disclosure for an incubation period; separating the porous polymeric material from the sample; and heating the separated porous polymeric material or contacting the separated porous polymeric material with a solvent such that at least a portion of the compounds are the released by the porous polymeric material; and determining the presence or absence of any compounds, where the presence of one or more compounds correlates to the presence of the one or more compounds in the sample, and/or isolating the compounds.

Various samples can be used. The sample can be a fluid sample or gas (e.g., air) sample. For example, the sample comprises one or more volatile organic compounds and air. For example, the sample is in fluid and is UV-active (having absorption in the UV-visible range of the electromagnetic spectrum).

The compounds can be detected by methods known in the art. In various examples, the determining is carried out by UV-visible spectroscopy, gas chromatography, liquid chromatography, supercritical liquid chromatography, mass spectrometry, fluorimetry, ICP-MS, the like, or a combination thereof.

The methods can be methods for removing compounds (e.g., petroleum products, organic solvents, textile dyes, organic micropollutants, iodine vapor) from a sample (e.g., a fluid sample) comprising: contacting the sample with one or more porous polymeric material of the present disclosure, polymeric material of the present disclosure, article of manufacture of the present disclosure, or device of the present disclosure for an incubation period such that at least some of the compounds are sequestered in the polymeric material; separating the porous polymeric material with the sequestered compound(s) from the sample; heating the porous polymeric material or contacting the porous polymeric material from with a solvent such that at least part of the compounds are released by the porous polymeric material; and optionally, isolating at least a portion of the compounds; optionally, repeating steps a-d with the porous material from c) from which at least part of the compounds have been released.

Various samples can be used. The sample can be a fluid sample or gas (e.g., air) sample. For example, the sample comprises one or more volatile organic compounds and air. For example, the sample is in fluid and is UV-active.

In various examples, porous polymeric materials of the present disclosure may have high stability, a large surface area, the presence of ion-dipole interaction site, and highly unsaturated 7c-bond-rich nature, or a combination thereof that afford unique electron-donating characteristics to the porous polymeric material can be utilized to remove toxic pollutants from aqueous mixtures. The porous polymeric mixture can quickly absorb crude oil, engine oil, iodine, or organic solvent (e.g., toluene, EtOH, tetraethylene glycol) while repelling the water. In an embodiment, the uptake capacities range from 500 to 800 wt %. In various examples, it can absorb at least eight times its own weight of ethylene glycol and/or at least seven times its weight of used engine oil. In an example, a lithiated porous polymeric material can absorb over 300 wt % (e.g., 312% w/w). These uptake values are much higher than those reported for commercial activated carbon and other described porous materials. Complete absorption can occur in a short period of time (e.g., less then 10 mins or about five minutes) and absorbed oil can be washed from the polymer with a suitable solvent, such as, for example, diethyl ether. The polymer can be then dried and could be re-used at least up to three times with negligible decrease of its absorption capacity.

Porous polymeric materials can be used for effective removal of toxic dyes from water. For example, about 80% of Congo red, an anionic dye was adsorbed within the first five minutes and complete removal was observed within 15 minutes. The adsorption isotherm fitted by the Langmuir model gave a maximum adsorption capacity $Q_m$ of 673 mg g$^{-1}$, corresponding to complete monolayer coverage. The generality of porous polymeric materials to remove organic waste can be assessed, preliminarily, by testing other dyes with different physical properties, specifically, methylene blue and rhodamine B (RhB), both cationic dyes. For example, in the case of MB, ~95% was removed within 5 min whereas in the case of RhB removal efficiency was ~50% after the same amount of time and by the same amount of polymer. In both cases complete dye removal was achieved within 120 min. In an example, the maximum adsorption capacities of MB and RhB were 625 and 484 mg g$^{-1}$, respectively. Adsorbed MB and RhB can be easily removed by simply washing the porous polymeric materials with ethanol at a suitable temperature (such as 50° C.). The porous polymeric materials can be re-used for dye-adsorption with no loss of its original efficiency. The removal of CR can be achieved by treating the dye-loaded polymer with a 0.1 N HNO$_3$ solution at 50° C. In an example, after this acidic treatment, the adsorption capacity of the polymer remained intact.

Porous polymeric materials and their lithiated derivatives are utilized for I$_2$ enrichment both in the vapor phase and in solution. The I$_2$ vapor capture can be conducted under typical nuclear fuel reprocessing conditions (e.g., 75° C. and ambient pressure) (e.g., previously described nuclear fuel reprocessing conditions). The time required for the maximum uptake and the amount of I$_2$ adsorbed can vary with different porous polymeric materials. In an example, lithiated porous polymeric materials outperformed their pre-lithiated counter parts. The I$_2$ uptake efficiency was varied from 88 wt % to 312 wt % in the time range 30 min (minutes) to 8 h (hours). In an example, the sorption of I$_2$ by the porous polymeric materials was reversible. The captured I$_2$ can be easily removed by immersing the I$_2$-loaded porous polymeric materials in EtOH for a few hours (such as 12 h at room temperature). After the regeneration of the porous polymeric materials, it can be dried and re-used up to at least three times with negligible decrease of its absorption capacity. Also, the porous polymeric materials are capable of removing iodine from hexane solution. The rate of removal is faster for lithiated polymers compared to the corresponding non-lithiated polymers.

In examples, porous polymeric materials were used for the rapid removal of organic micropollutants from water. The adsorption of model pollutants that are relevant to pharmaceutical, pesticides, and plastic wastes by newly synthesized CalPn (n=2-4, e.g., 2, 3, or 4)) polymers was tested. The results were compared with AC, a well-known commercial adsorbent. Bisphenol A, a toxic component of plastics that can cause serious health problems, was tested and found that each porous polymeric material (e.g., CalP polymer) and AC removed most of the pollutant from a solution (3 mg of adsorbent for 10 mL of 0.1 mM aqueous pollutant solution). Importantly, CalP4 (i.e., a porous polymeric material) removed Bisphenol A with a faster rate than all other tested adsorbents (~70% removal within 30 sec) and reached equilibrium within 15 min. In contrast, CalP2 and CalP3 (i.e., porous polymeric materials) required 45 and 20 min to reach equilibrium, respectively, and removed 7 and 16% of the pollutant in first 15 sec of contact, respectively. Without intending to be bound by any particular theory, the faster efficiency of CalP4 over other adsorbents may be due to the high surface area (759 over 596 or 630m2g−1) and pi-bond rich network (for each structural units: 10 triple bonds and 20 phenyl rings for CalP4 compared to 6 or 8 triple bonds and 8 phenyl rings in case of CalP2 and CalP3) that endow hydrophobic interactions. The pseudo-second order rate constant ($k_{obs}$) of bisphenol A adsorption to CalP4 is 2.12 mg g$^{-1}$ min$^{-1}$, which is 33 times higher than to CalP2, 21 times higher than to CalP3, and 16 times higher than AC.

In addition, in an example, the ability of CalPn (n=2-4, (e.g., 2, 3, or 4)) (i.e., porous polymeric materials) to remove the other important pollutants with different physical properties, such as propranolol and simple aromatic compounds was evaluated. The simple aromatics compound included 1-naphthyl amine and 2-naphthol. We also evaluated propranolol, a beta-blocker used to treat hypertension, which is not removed efficiently by wastewater treatment protocols. Adsorption studies of each of these compounds were performed similarly to those for bisphenol A (0.1 mM adsorbate, 3 mg of polymer/10 mL of pollutant solution). Each pollutant is rapidly removed by the porous polymeric materials of the present disclosure, and the time-dependent adsorption curves are similar to that of bisphenol A.

The steps of the methods described in the various embodiments and examples disclosed herein are sufficient to produce the porous polymeric materials of the present disclosure and carry out the methods of using of the porous polymeric materials of the present disclosure. Thus, in various examples, a method of using the porous polymeric materials of the present disclosure consists essentially of a combination of the steps of the method disclosed herein. In another embodiment, the method consists of such steps.

In the following Statements, various examples of the methods and compositions, and methods of using the compositions of the present disclosure are described:

Statement 1. A porous polymeric material comprising a plurality of calixarene moieties (e.g., calix[4]arene, calix[6]arene, or calix[8]arene moieties) crosslinked by one or more crosslinking moieties (e.g., crosslinking moieties comprising an aryl moiety and, optionally, two or more alkynyl moieties).

Statement 2. A porous polymeric material according to Statement 1, where the calixarene has the following structure:

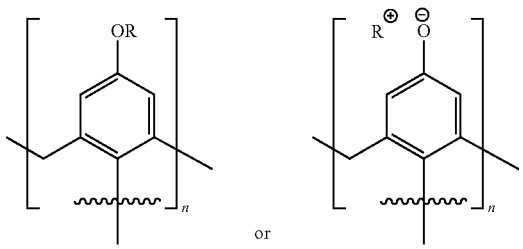

where

R is at each occurrence in the polymeric material is independently H, Na$^+$, K$^+$, Cs$^+$, Li$^+$, a polyether group (e.g., hydroxyl terminated or sulfonic acid terminated polyether groups), or polythioether group, or a combination thereof, two R groups are linked by a polyether moiety or polythioether moiety.

Statement 3. The porous polymeric material according to any one of the preceding Statements, where the one or more crosslinking moieties (e.g., a fully conjugated moiety) have 5 to 40 carbons and comprise one or more $C_5$-$C_{30}$ aromatic moiety (e.g., substituted and/or unsubstituted phenyl moieties, biphenyl moieties, and combinations thereof) and, optionally, one or more $C_2$ alkynyl moieties.

Statement 4. The porous polymeric material according to Statement 3, where the aromatic moiety comprises one or more fused-ring moiety and/or one or more bi-aryl moiety.

Statement 5. The porous polymeric material according to anyone of the preceding Statements, where the crosslinking moiety has the following structure:

—Ar—(R$^2$)$_x$, wherein

Ar is independently at each occurrence in the polymeric material comprises one or more $C_5$-$C_{20}$ aryl moiety (e.g., substituted and/or unsubstituted phenyl moieties, biphenyl moieties, and combinations thereof), R$^2$ are independently at each occurrence in the polymeric material a $C_2$ alkynyl moiety or —B(—(O)—)$_2$ moiety, and x is 2, 3, 4, 5, 6, 7, or 8.

Statement 6. The porous polymeric material according to Statement 5, where the crosslinking moiety has the following structure:

—R$^1$—Ar—R$^2$—, wherein

R$^1$ and R$^2$ are independently at each occurrence in the polymeric material a $C_2$ alkynyl moiety.

Statement 7. The porous polymeric material according to any one of the preceding Statements, where the crosslinking moiety further comprises one or more aryl moiety that is covalently bound to two or more aryl moieties.

Statement 8. The porous polymeric material according to Statement 7, where the crosslinking moiety (e.g., aryl linking moiety) is selected from:

$C_1$-$C_6$ aliphatic moieties, —S(O)—, phosphorous atom, nitrogen atom, $C_5$-$C_{20}$ aryl moieties (e.g., substituted and/or unsubstituted phenyl moieties, biphenyl moieties, and combinations thereof) or heteroaryl moieties (e.g., substituted and/or unsubstituted pyridinium moieties, bipyridinium moieties, and combinations thereof), and combinations thereof.

Statement 9. The porous polymeric material according to any one of the preceding Statements, where in the crosslinking moiety is selected from:

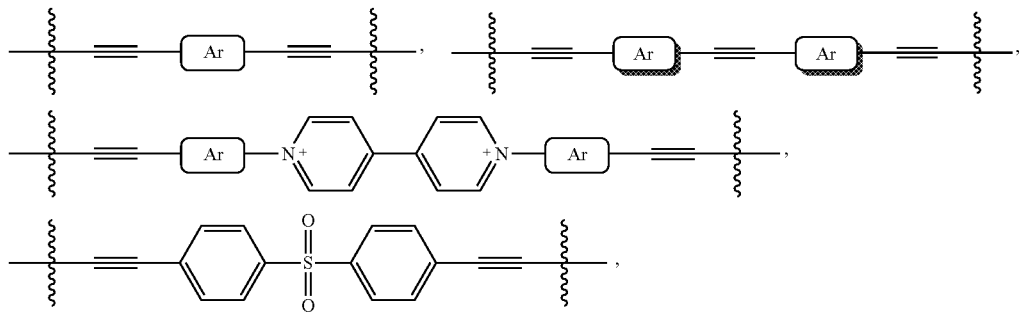

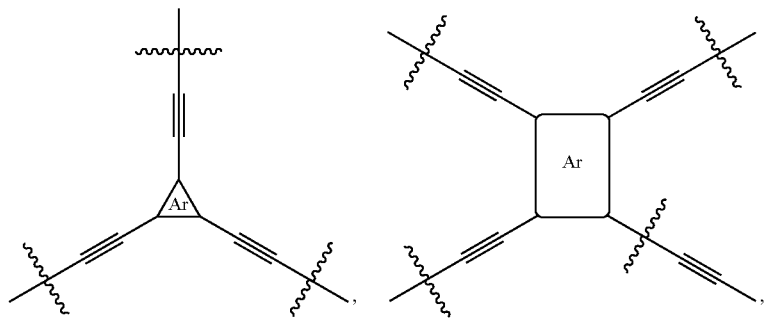

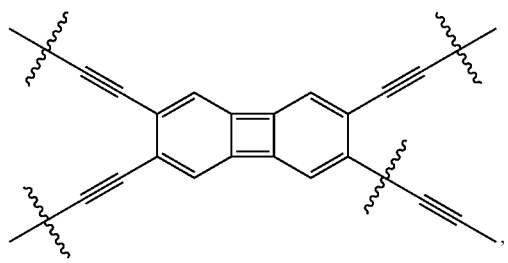

-continued
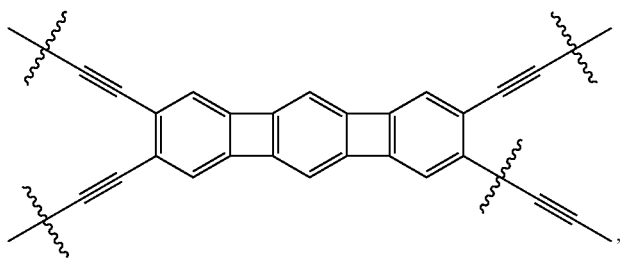
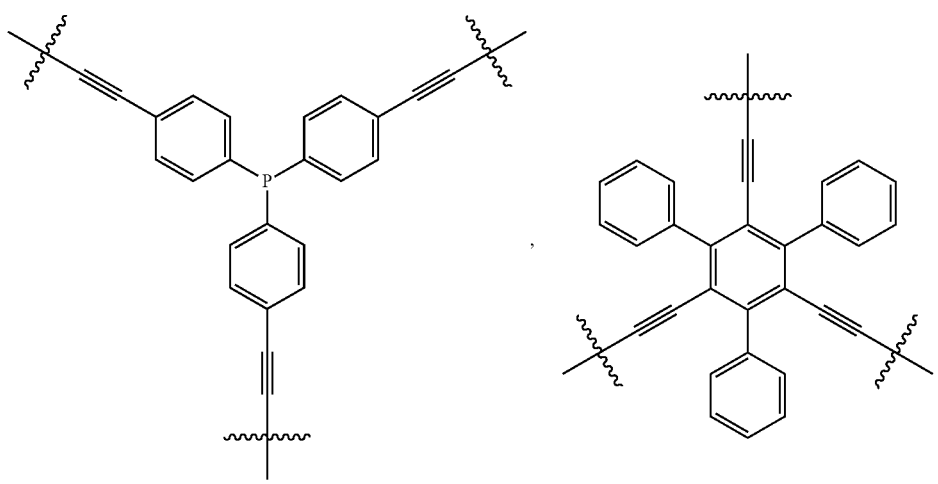
, or
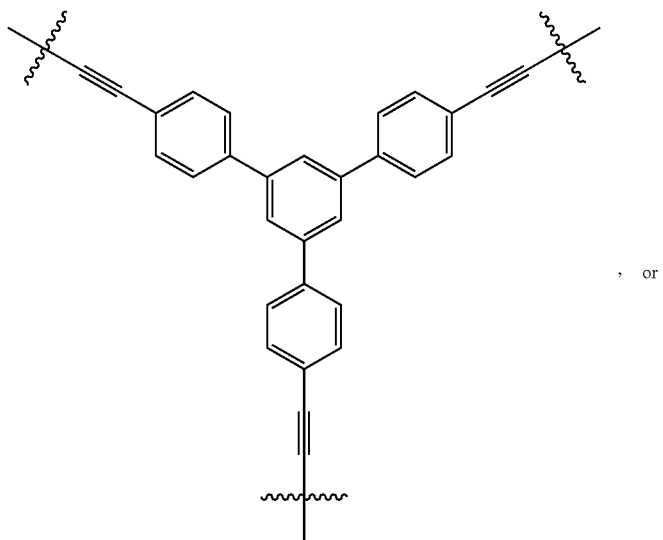

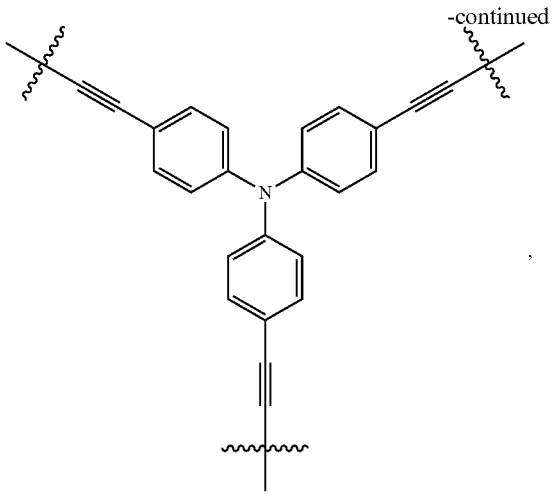

and combinations thereof, where Ar is independently at each occurrence in the porous polymeric material comprises one or more $C_5$-$C_{20}$ aryl moiety (e.g., substituted and/or unsubstituted phenyl moieties, and biphenyl moieties), including all carbon values and ranges therebetween; or

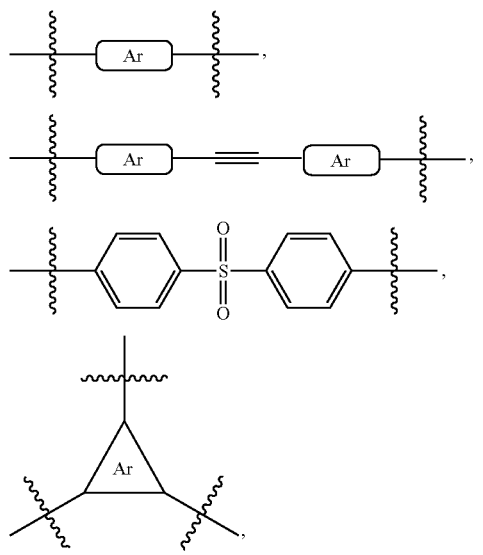

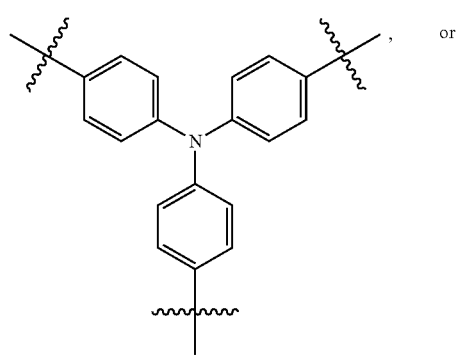

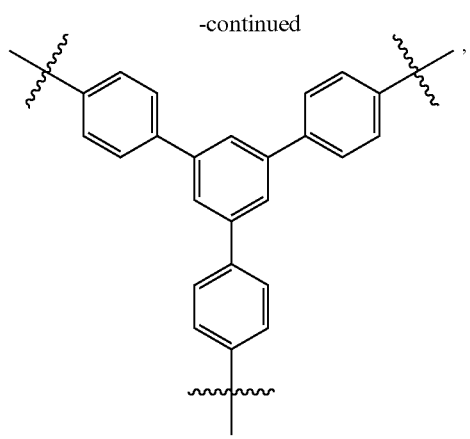

and combinations thereof.

Statement 10. The porous polymeric material according to any of the preceding Statements, where the porous polymeric material is mesoporous and/or microporous.

Statement 11. The porous polymeric material according to any one of the preceding Statements, where the porous polymeric material has a Brunauer-Emmett-Teller (BET) surface area of 100 m²/g to 5000 m²/g.

Statement 12. The porous polymeric material according to any one of the preceding Statements, where the porous polymeric material is amorphous.

Statement 13. The porous polymeric material according to any one of the preceding Statements, where the polymeric material exhibits a surface tension of 120 degrees to 180 degrees.

Statement 14. The porous polymeric material according to any one of the preceding Statements, where the polymeric materials are insoluble in aqueous solvents.

Statement 15. A method of preparing a porous polymeric material (e.g., a porous polymeric material of any one of the preceding claims), comprising reacting one or more calixarene compounds (e.g., calix[4]arene, calix[6]arene, or calix[8]arene compounds) having a plurality of bromo groups (e.g., 2, 3, 4, 5, 6, 7, or 8 bromo groups) with one or more crosslinking compounds comprising i) at least two terminal alkyne groups or ii) at least two boronic acid groups and/or boronate ester groups in the presence of a metal catalyst, where the porous polymeric material is formed.

Statement 16. The method according to Statement 15, where the one or more calixarene compounds are selected from the group consisting of tetrabromo-calix[4]arene-tetrol (5,11,17,23-tetrabromo-25,26,27,28-tetrahydroxycalix[4]arene), hexabromo-calix[6]arene-hexol, octabromo-calix[8]arene-octol, p-sulfonatocalix[4,6,8]arenes, thia-crown-calix[4,6,8]arenes, and combinations thereof.

Statement 17. The method according to any one of Statements 15-16, where the one or more crosslinking compounds are selected from the group consisting of 1,4-diethynylbenzene, 1,3,5-triethynylbenzene, 1,3,6,8-tetraethynylpyrene, di-, tri- and tetra-ethynyl derivatives of substituted and/or unsubstituted phenyl moieties, biphenyl moieties, heteroaryl moieties, and combinations thereof.

Statement 18. The method according to any one of Statements 15-17, where the stoichiometric ratio of the bromo groups of the one or more calixarene compounds and crosslinking compounds is 1:1.

Statement 19. The method according to any one of Statements 15-18, where the polymeric material comprises a plurality of phenoxy groups and the polymeric material is contacted with a lithium source (e.g., alkyl lithium compound (e.g., n-butyl lithium) and a lithiated polymeric material is formed or the polymeric material is contacted with a metal source (e.g., LiOH, KOH, and NaOH) and a metalated polymeric material is formed.

Statement 20. A composition comprising the porous polymeric material of according to any one of Statements 1-14 or a polymeric material made by a method according to any one of Statements 15-19.

Statement 21. An article of manufacture comprising the porous polymeric material of any one of Statements 1-14, a polymeric material made by the method according to any one of Statements 15-19, or the composition according to Statement 20.

Statement 22. The article of manufacture according to Statement 21, wherein the article of manufacture is a column or filter cartridge.

Statement 23. A method of purifying a sample (e.g., a fluid sample) comprising one or more pollutants (e.g., petroleum products, organic solvents, textile dyes, iodine, organic micropollutants including bisphenol A, perfluorinated chemicals (PFCs), toxic metals, and oxoanions), the method comprising contacting the fluid sample with the porous polymeric material according to any one of claims 1-14, a polymeric material made by the method according to any one of Statements 15-19, or the composition according to Statement 20, or the article of manufacture according to any one of Statements 21-22, whereby at least 80% of the total amount of the one or more pollutants in the fluid sample is adsorbed by the porous polymeric material, and optionally, reusing the porous material from which at least part of the pollutants have been removed.

Statement 24. The method according to Statement 23, where the sample flows across, around, or through the porous polymeric material.

Statement 25. The method according to any one of Statements 23-24, where the sample is contacted with the porous polymeric material (e.g., under dynamic conditions such as, for example, stirring) for an incubation period and after the incubation period the fluid sample is separated from the porous polymeric material.

Statement 26. The method according to any one of Statements 23-25, where the sample is drinking water, wastewater, ground water, aqueous extract from contaminated soil, or landfill leachate.

Statement 27. The method according to Statement 26, where the sample is in the vapor phase.

Statement 28. The method according to Statement 27, where the sample comprises one or more volatile compounds and air (e.g., iodine vapor).

Statement 29. A method of determining the presence or absence of compounds (e.g., petroleum products, organic solvents, textile dyes, organic micropollutants, iodine vapor) in a sample (e.g., a fluid sample) comprising:

a) contacting the sample with the porous polymeric material according to any one of Statements 1-14, a polymeric material made by the method according to any one of Statements 15-19, or the composition according to Statements 20, or the article of manufacture according to any one of Statements 21-22 for an incubation period;

b) separating the porous polymeric material from a) from the sample; and c) heating the porous polymeric material from b) or contacting the porous polymeric material from b) with a solvent such that at least a portion of the compounds are the released by the porous polymeric material; and d) determining the presence or absence of any compounds, where the presence of one or more compounds correlates to the presence of the one or more compounds in the sample, or isolating the compounds.

Statement 30. The method according to Statement 29, where the determining is carried out by UV-visible spectroscopy, gas chromatography (e.g., UV-visible spectroscopy gas chromatography), liquid chromatography, supercritical liquid chromatography, mass spectrometry, fluorimetry, or ICP-MS.

Statement 31. The method according to any one of Statements 29-30, where the sample is in fluid and UV-active.

Statement 32. The method according to any one of Statements 29-31, where the sample is in the vapor phase.

Statement 33. The method according to any one of Statements 29-32, where the sample comprises one or more volatile organic compounds and air.

Statement 34. A method for removing compounds (e.g., petroleum products, organic solvents, textile dyes, organic micropollutants, iodine vapor) from a sample (e.g., a fluid sample) comprising:

a) contacting the sample with the porous polymeric material according to any one of Statements 1-14, a polymeric material made by the method according to any one of Statements 15-20, or the composition according to Statement 20, or the article of manufacture according to any one of Statements 21-22 for an incubation period such that at least some of the compounds are sequestered in the polymer;

b) separating the porous polymeric material from a) from the sample;

c) heating the porous polymeric material from b) or contacting the porous polymeric material from b) with a solvent such that at least part of the compounds are released by the porous polymeric material; and d) optionally, isolating at least a portion of the compounds;

e) optionally, repeating steps a-d with the porous material from c) from which at least part of the compounds have been released.

Statement 35. The method according to Statement 34, where the sample is in fluid (or solution).

Statement 36. The method according to any one of Statements 34-35, where the sample is in the vapor phase.

Statement 37. The method according to any one of Statements 34-36, where the sample comprises one or more volatile organic compounds and air.

The following examples are presented to illustrate the present disclosure. They are not intended to limiting in any matter.

Example 1

This example provides a description of preparation, characterization and use of polycalixarenes of the present disclosure.

Figure 5:
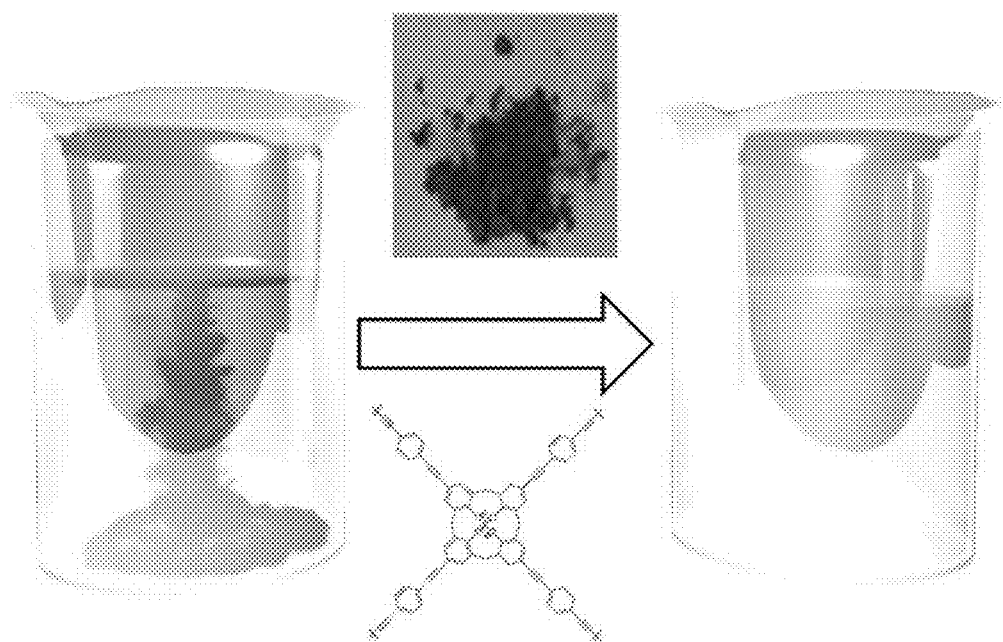
FIG. 5 shows a superhydrophobic porous covalent polymer containing calix[4]arene backbone was synthesized, and shows exceptional water cleaning ability by removing oil, organic solvents, and toxic dyes from aqueous mixture.

In this example, we describe the preparation of a porous covalent polycalixa[4]arene (CalP) and its use for the removal of organic solvents, oil and toxic dyes from aqueous mixtures. (FIG. 5).

Calix[n]arenes (n=4, 6, 8) are cyclic phenolic oligomers. They possess a hydrophobic cavity that has both polar and non-polar rims for guest recognition. Also, they can be selectively modified to provide analyte-selectivity or to facilitate incorporation into larger structures. Disclosed is attaching calixarenes on the backbone of a polymeric network to an absorbant material.

The Sonogashira-Hagira reaction was chosen as a convenient means for crosslinking brominated calixarenes. This method brought with it the additional benefits of, such as, for example, alkyne functionality. Alkynes are known to endow materials with, such as, for example, high surface area. They also increase absorption capacity and provide superhydrophobicity, which facilitated recovery of saturated polymer samples from water. The prepared polymer does show desirable sorption properties for oils and other organic pollutants, likely as the result of i) dipolar interactions, including H-bonding, that involves the hydrophilic rim of the calixarene and ii) nonpolar interactions involving the hydrophobic rim of the calixarene and the polymer's constituent aromatic rings and alkynes. To the best of our knowledge, CalP is the first example of a porous calixarane-based covalent polymer, though we believe this architecture has a more general potential to serve as a platform for the development of materials for sorption, toxic contaminant removal, and hydrocarbon separations.

Figure 6:
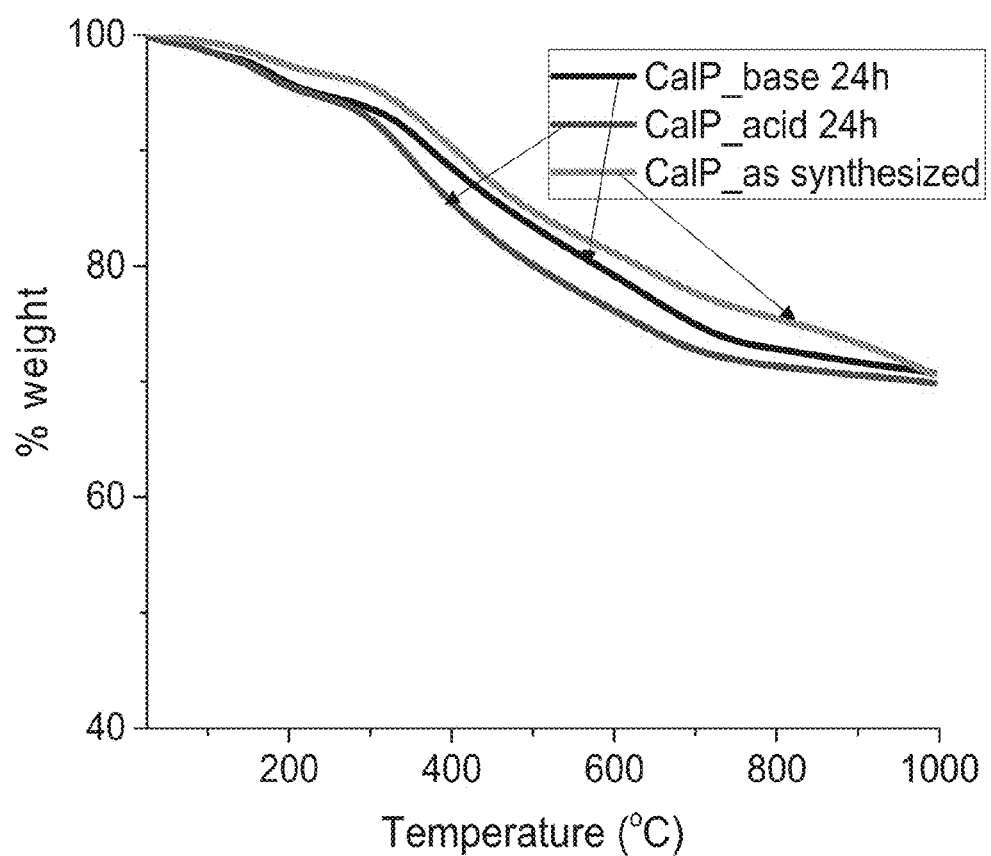
FIG. 6 shows TGA plots for CalP (green) after the treatment with 1 M $HNO_3$ solution (red) and 1 N NaOH solution (black).

The synthesis of CalP was accomplished by a palladium catalyzed Sonogashira-Hagihara cross-coupling of 1,4-diethynylbenzene and tetrabromo-calix[4]arene-tetrol (FIG. 1). The latter compound was synthesized by following a previously reported literature procedure. The reaction was carried-out in dry THF at 65° C. for 60 h. After centrifugation and multiple washings of the reaction precipitate, the polymer was obtained as a brown powder that was completely insoluble in all organic solvents tested, including THF, acetone, $CHCl_3$, DMF and DMSO, indicating the formation of a covalently crosslinked, reticular structure. Maintaining the optimum dilution of the reaction mixture was critical for obtaining a high-porosity polymer in good chemical yield (60 mol % versus the brominated precursor). The resulting polymer, CalP, exhibited chemical stability in acidic or basic aqueous solutions, as indicated by a lack of dissolution or decomposition (FIG. 6).

Figure 2:
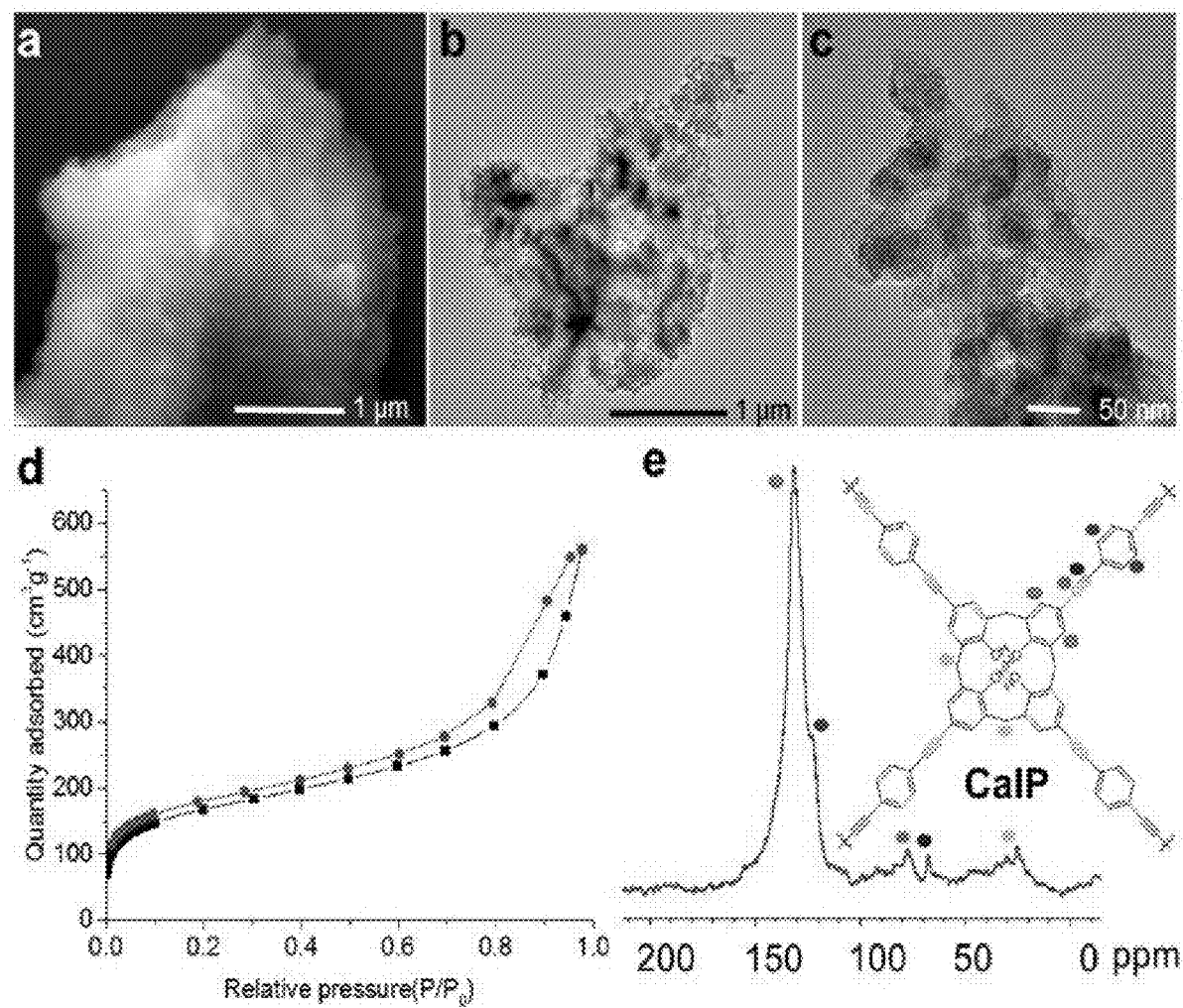
FIG. 2 shows (a) magnified SEM image showing hints of porous structure; scale bar=1 μm. (b) Low-magnification TEM image; scale bar=1 (c) High-resolution TEM image hints the presence of pores in the polymer; scale bar=50 nm. (d) $N_2$ uptake isotherms at 197 K (black squares and red circles represent absorption and desorption, respectively); calculated surface area=596 $m^2g^{-1}$. (e) $^{13}C$ CP/MAS NMR spectrum with corresponding peak assignments indicated by colored dots.
Figure 7:
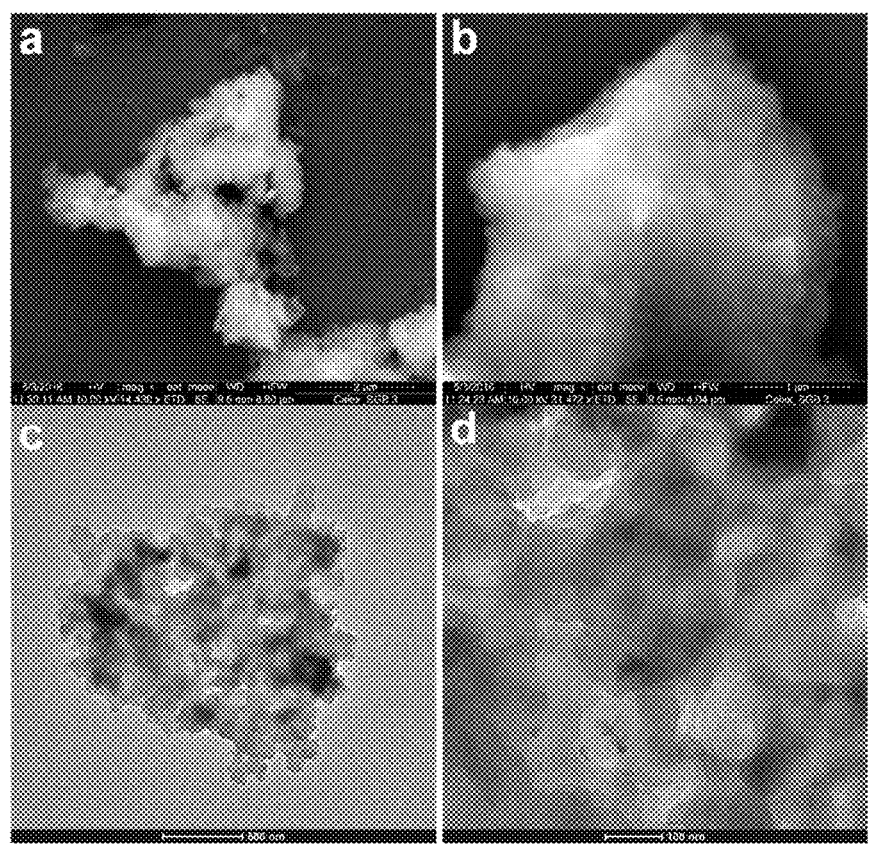
FIG. 7 shows (a) low-magnification SEM image; scale bar=2 μm. (b) Magnified SEM image showing hints of porous structure; scale bar=1 μm. (c, d) High-resolution TEM image hints the presence of pores in the polymer; scale bar=500 and 100 nm, respectively.
Figure 8:
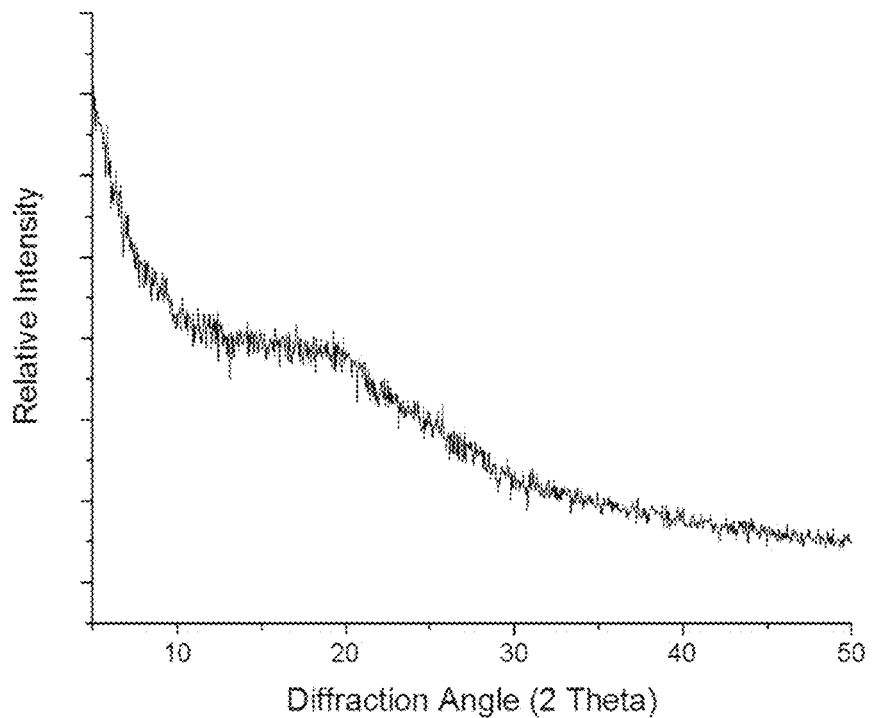
FIG. 8 shows powder X-ray diffraction (PXRD) pattern of CalP.
Figure 9:
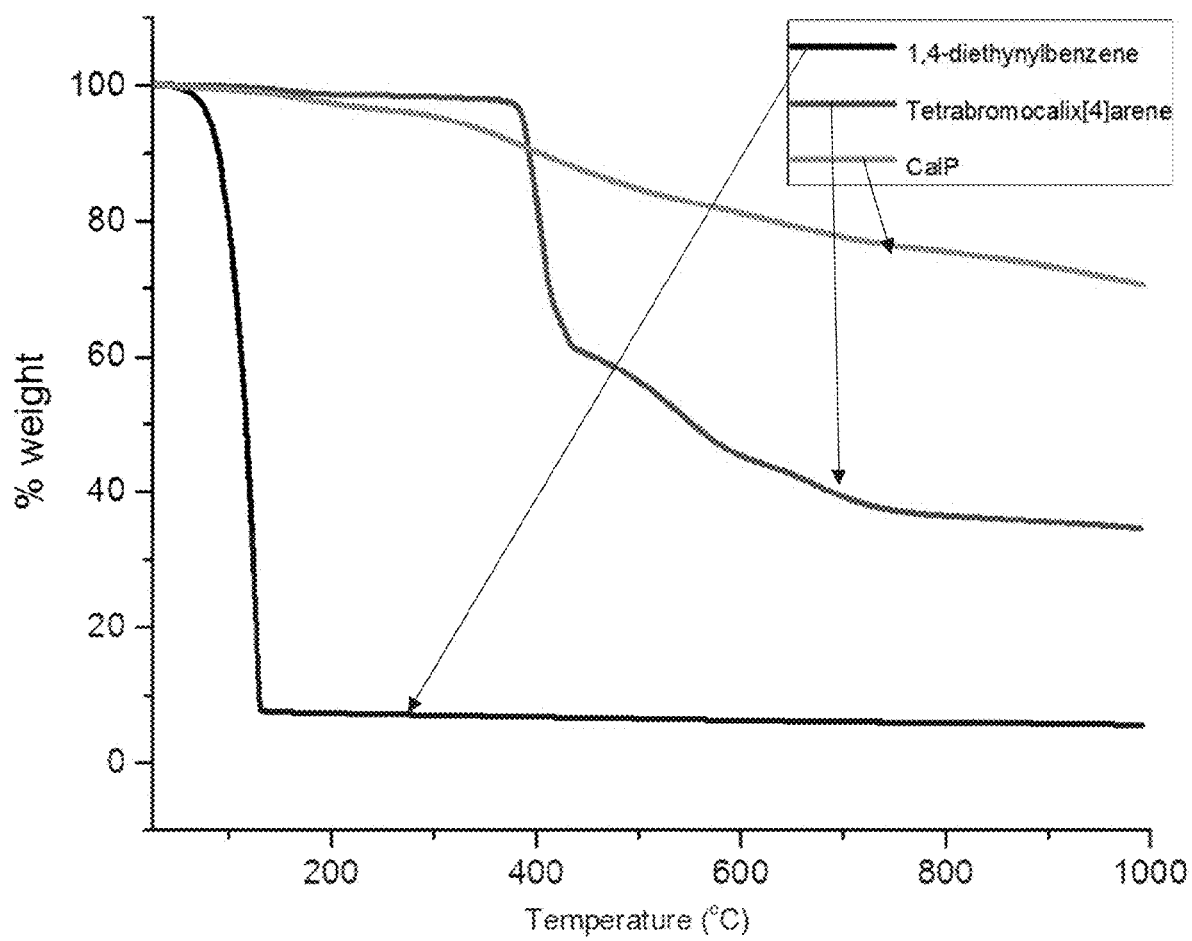
FIG. 9 shows TGA plots for CalP (green) and monomers 1,4-diethynlebenzene (black) and tetrabromocalix[4]arene (red).
Figure 10:
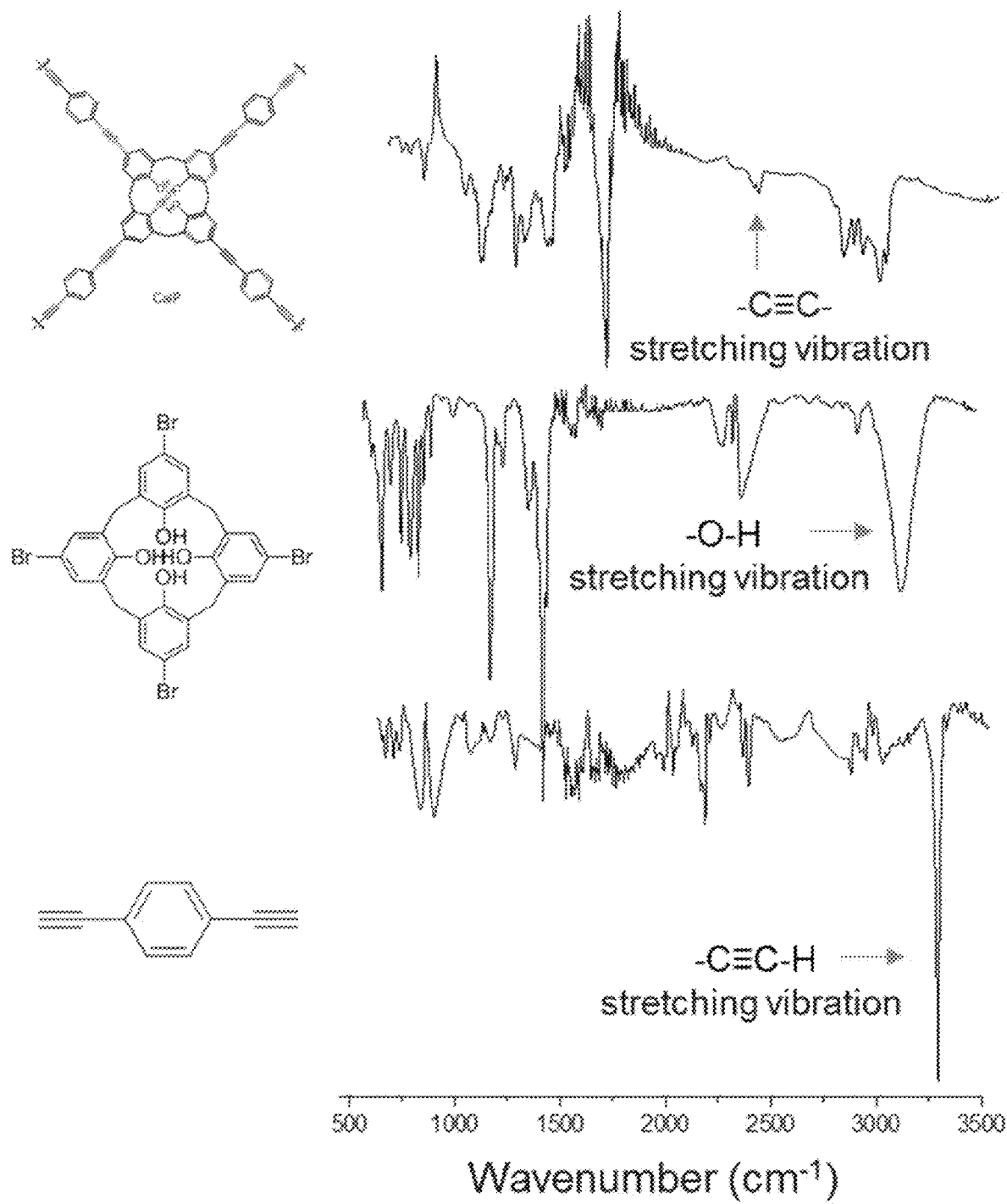
FIG. 10 shows FTIR spectra of CalP and corresponding monomers.
Figure 11:
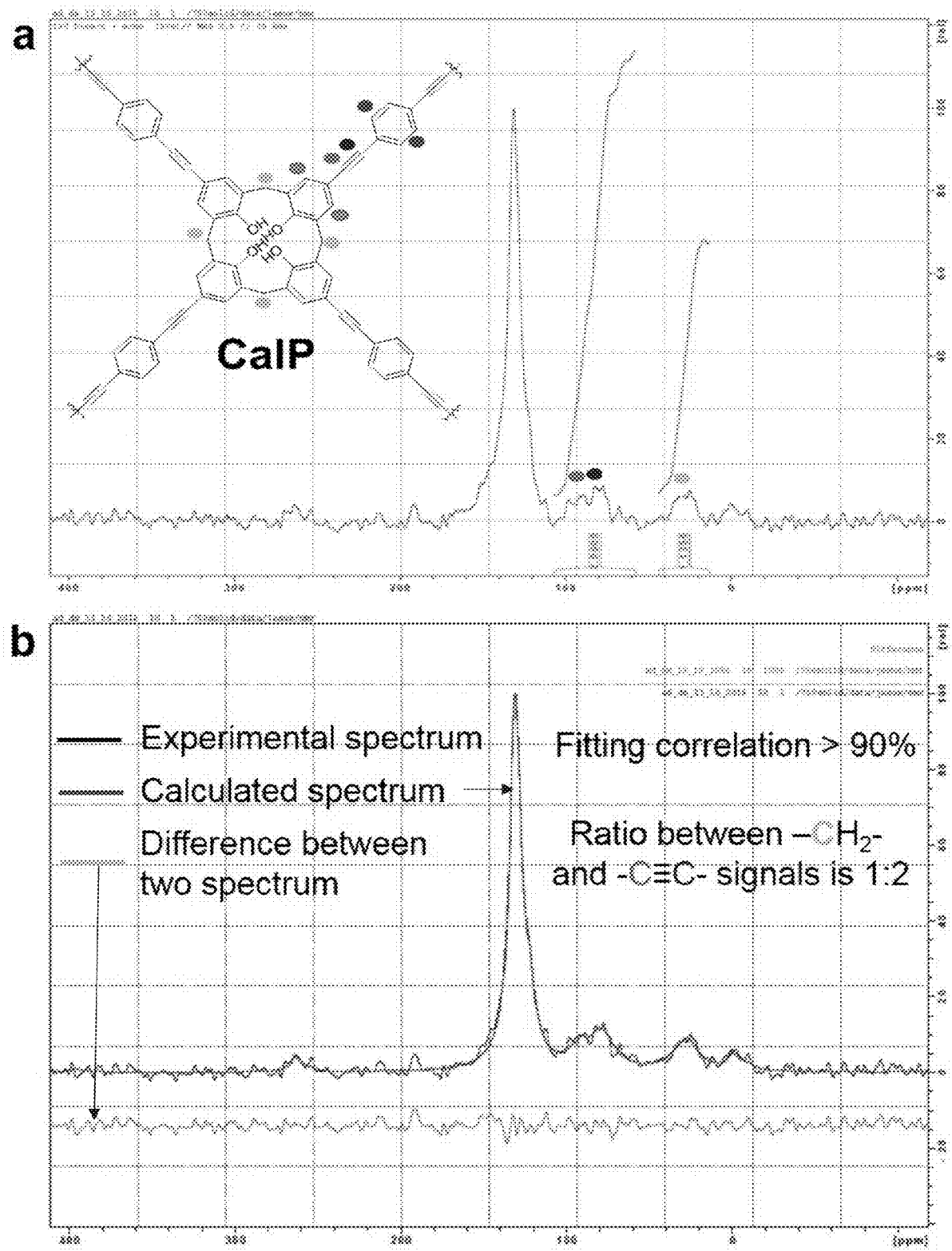
FIG. 11 shows a $^{13}C$ DP/MAS NMR spectrum of CalP. (a) Experimental spectrum with corresponding peak assignments indicated by color and also shows the integration of peaks of interest. (b) Fitting with solid-state NMR parameters that shows over 90% overlap during the interpretation of NMR signals.

In order to investigate the bulk morphology of CalP, scanning electron microscopy (SEM) and transmission electron microscopy (TEM) analyses were performed. SEM images show that CalP is composed of fused amorphous clumps (FIG. 2a and FIG. 7). TEM images reveal the same morphology, as well as the presence of pores (FIGS. 2b and 2c). The powder X-ray diffraction (PXRD) pattern of CalP (FIG. 8) shows a broad signal that is consistent with an amorphous nature. Thermogravimetric analysis (TGA) of the polymer indicates excellent thermal stability over 600° C. (FIG. 9). Molecular-level characterization of the porous polymer was achieved by FTIR spectroscopy and solid state NMR spectroscopy. An absorption band near 3300 $cm^{-1}$, consistent with the terminal alkyne —C—H stretching vibration of the 1,4-diethynylbenzene monomer, is conspicuously absent from the spectrum of the polymer (FIG. 10), whereas broad bands near 3000 $cm^{-1}$, which indicate calixarene tetrol functionality, are prominent. Furthermore, a new peak near 2200 $cm^{-1}$, consistent with an asymmetric —C≡C— stretching vibration, is apparent. A solid-state cross-polarization magic angle spinning (CP/MAS)$^{13}$C NMR spectrum is shown in FIG. 2e. The chemical shift values in the range of 120-140 ppm correspond to the aromatic carbons of the phenylene groups that constitute the polymeric framework. The broad peak at 25 ppm is associated with the aliphatic methylene moieties (—$CH_2$—) of the calix[4]arene macrocycle. The resonance of ethylene (—C≡C—) carbons appears near 90 ppm. We also tried to quantify the number of alkyne linkers connected to each calix[4]arene units by solid state direct polarization magic angle spinning (DP/MAS)$^{13}$C NMR analysis of the polymer. The NMR signal integration ratio between methylene carbon of the macrocycle and ethylene carbons of the linker is found to be 1:2 (FIG. 11). This ratio confirms the presence of four conjugated ethylene linkers to each calix[4]arene units and in turn the formation of the hyperconjugated network. Overall, all of these data clearly demonstrate the successful formation of the porous covalent calixa[4]arene polymer depicted in FIG. 1.

Figure 12:
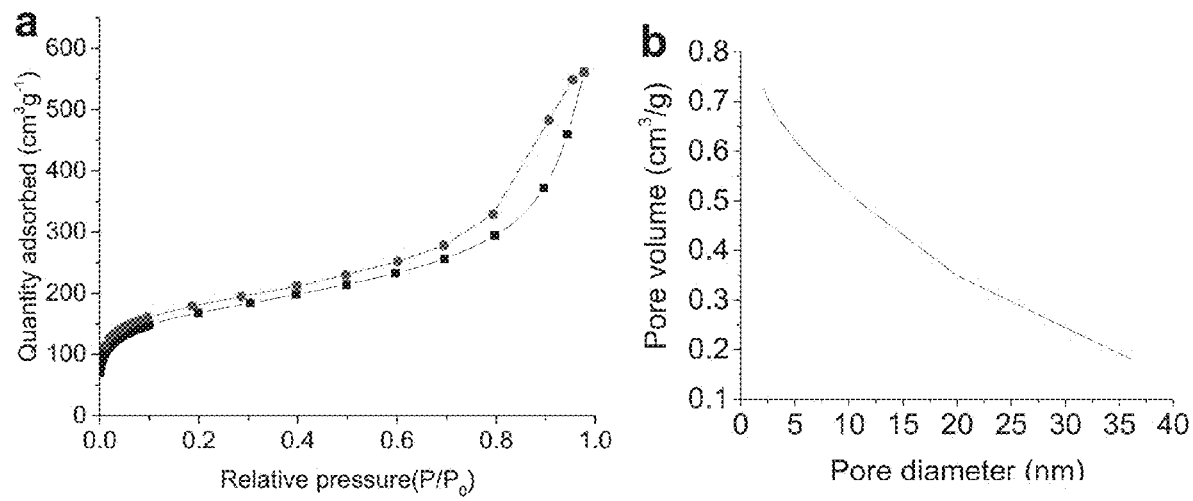
FIG. 12 shows (a) $N_2$ uptake isotherms at 197 K (black squares and red circles represent adsorption and desorption values, respectively); calculated surface area=596 $m^2$ $g^{-1}$. (b) BJH pore size distribution.
Figure 13:
FIG. 13 shows superhydrophobic behavior of the CalP-coated surface. A sessile water droplet (7.0 μL) sitting on a CalP surface has a contact angle of 155.4±4.01°.
Figure 13:
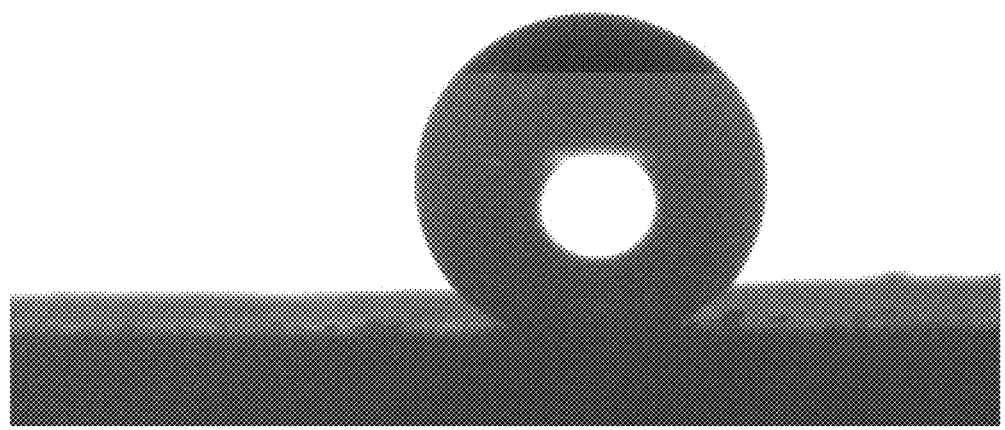

The porosity of CalP was characterized by $N_2$ adsorption/desorption measurements. To remove solvent and trapped gas, the polymer was activated at 358 K for 24 h prior to the measurements. Based on the IUPAC classification system, the observed $N_2$ sorption isotherm (FIG. 2d) can be categorized as type II with a $H_4$ type hysteresis loop corresponding to desorption. The data suggest a complex polymeric network that contains both micropores and mesopores and swells with gas intake. The polymer has a pore size distribution mainly in the mesopore region, a Barett-Joyner-Halenda (BJH) average pore diameter of 95 Å and a cumulative pore volume of 0.73 cm3 $g^{-1}$ (FIG. 12). Calculation using the Brunauer-Emmett-Teller (BET) model gives a specific surface area of 596 m2 $g^{-1}$. This high value is likely due to the accessibility of both the calixarene cavities and inter-molecular spaces. Notably, CalP was found to be superhydrophobic and to float in aqueous solutions. The polymer's hydrophobicity was investigated by contact angle measurements. Manually ground CalP powder fixed on Scotch tape had an average contact angle of 155.4±4.01 degrees (FIG. 13). The polymer's hydrophobicity is consistent with the hydrophobic character of its constituent aromatic rings and alkyne-rich backbone. To our knowledge, CalP is the first porous calixarene-based covalent polymer to be reported, and its high surface area suggests that further investigation of calixarene-based polymers is desirable.

Figure 3:
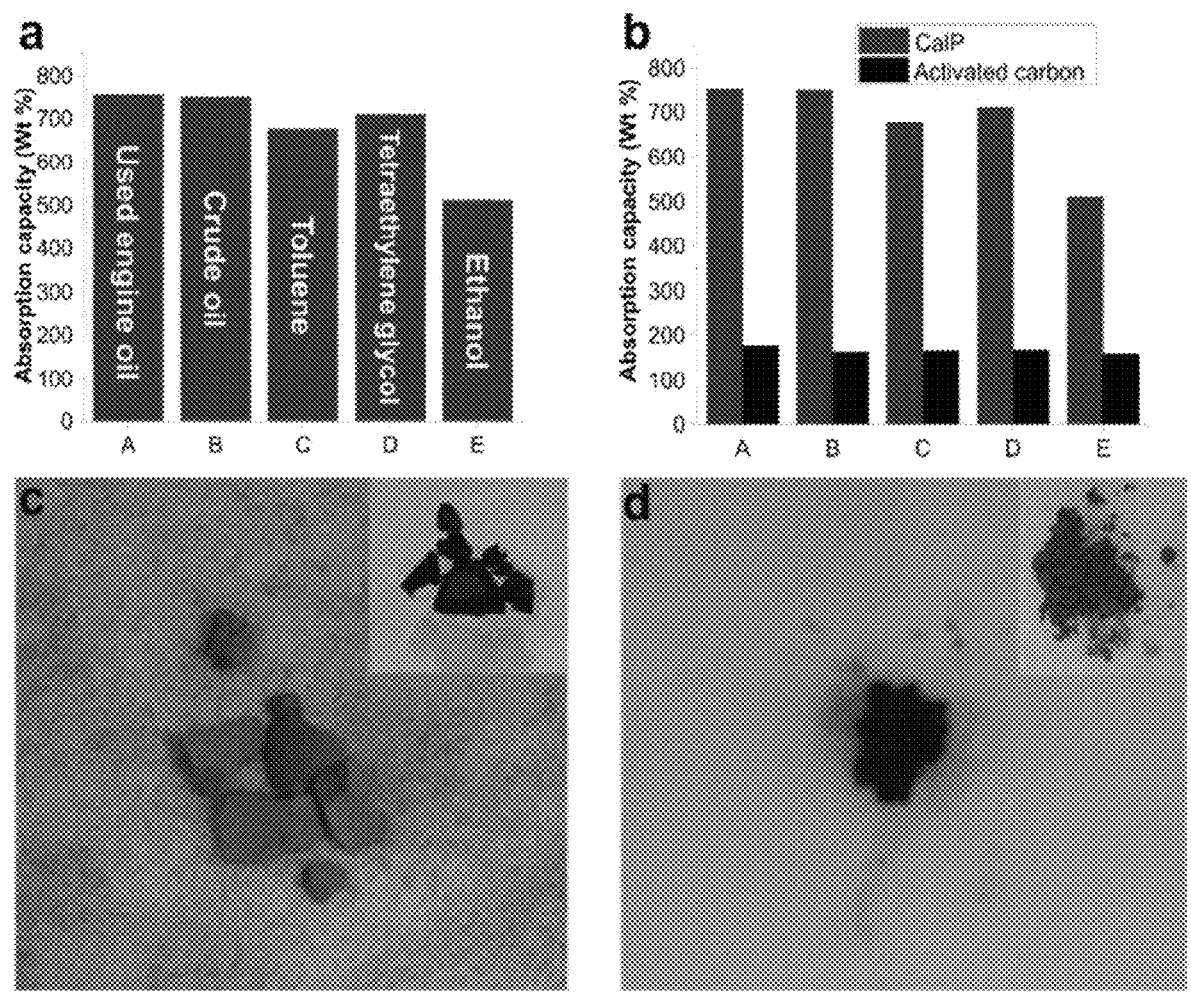
FIG. 3 shows (a) gravimetric absorption capacities of CalP for crude oil, used engine oil, and different organic solvents. (b) Comparison of the absorption capacities of CalP with those of commercial activated carbon. (c) Photograph of as-synthesized CalP; inset shows CalP after soaking in used engine oil for three minutes. (d) Photograph of porous CalP after five minutes of soaking in used engine oil; inset shows the polymer recovered after diethyl ether washes and drying.
Figure 14:
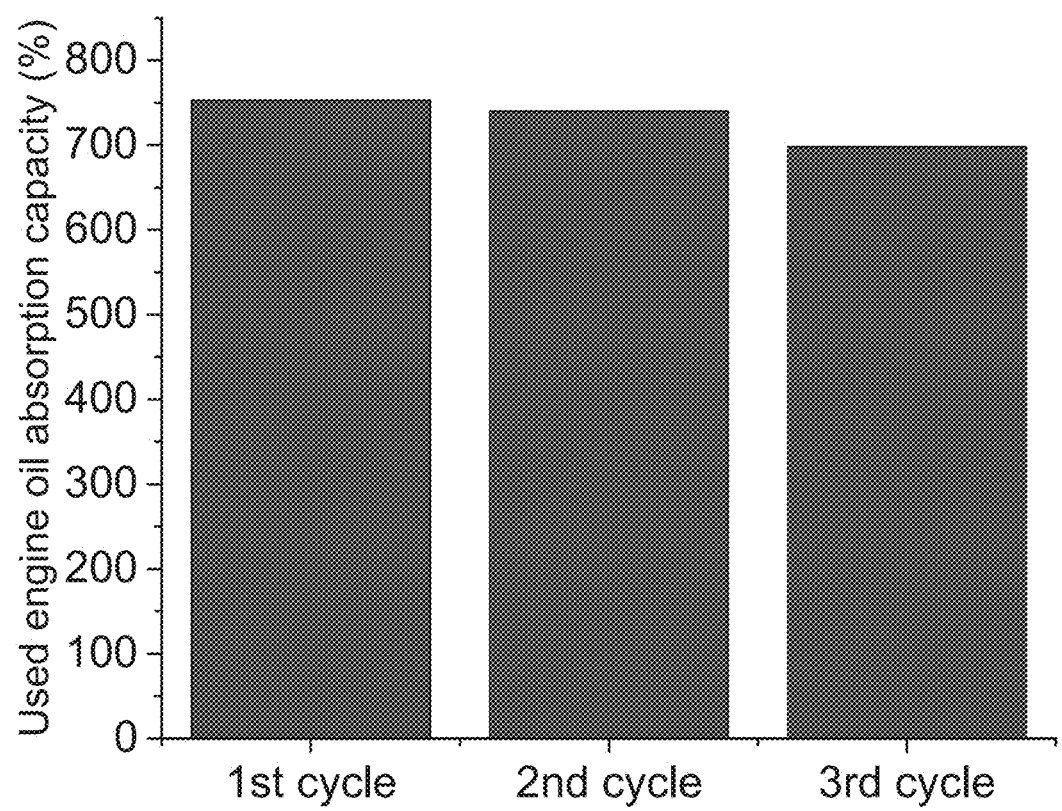
FIG. 14 shows variation of the absorption capacity for used engine oil; oil can be absorbed at least 3 times with only a slight decrease in uptake capacity.

The synthesized polymer, with its superhydrophobicity and relatively high surface area compared to other polymeric adsorbant materials having a macrocyclic backbone (for example; previous cyclodetrin polymers with $S_{BET}$=263 $m^2$ $g^{-1}$ and pillarene based polymers with $S_{BET}$=400 $m^2$ $g^{-1}$), demonstrated a pronounced ability to absorb and remove toxic pollutants from aqueous mixtures. CalP was added to oil/water or organic solvent/water mixtures in a Petri dish and allowed to absorb. The polymer quickly absorbed the crude oil, engine oil, or organic solvent (e.g., toluene, EtOH, tetraethylene glycol) while repelling the water. The polymer was weighed before and after absorption in order to determine uptake capacity. As shown in FIG. 3, CalP shows high uptake capacities ranging from 500 to 780 wt %. It can absorb up to eight times its own weight of ethylene glycol and seven times its weight of used engine oil. These uptake values are much higher than those reported for commercial activated carbon (FIG. 3b) and previous porous materials. Two types of oil were tested: used engine oil and commercial crude oil (ATSM D5307). After being placed on the top of an oil-water mixture, the light brown polymer quickly absorbed the oil and turned dark brown (FIGS. 3c and 3d). Complete absorption occurred in about five minutes, at which point the floating, saturated polymer was removed from the water surface. Absorbed oil was washed (2 times, 5 min each) from the polymer with diethyl ether (FIG. 3d). The polymer was then dried and could be re-used up to three times with negligible decrease of its absorption capacity (FIG. 14), a very practical result considering the ease of the recovery process.

Figure 4:
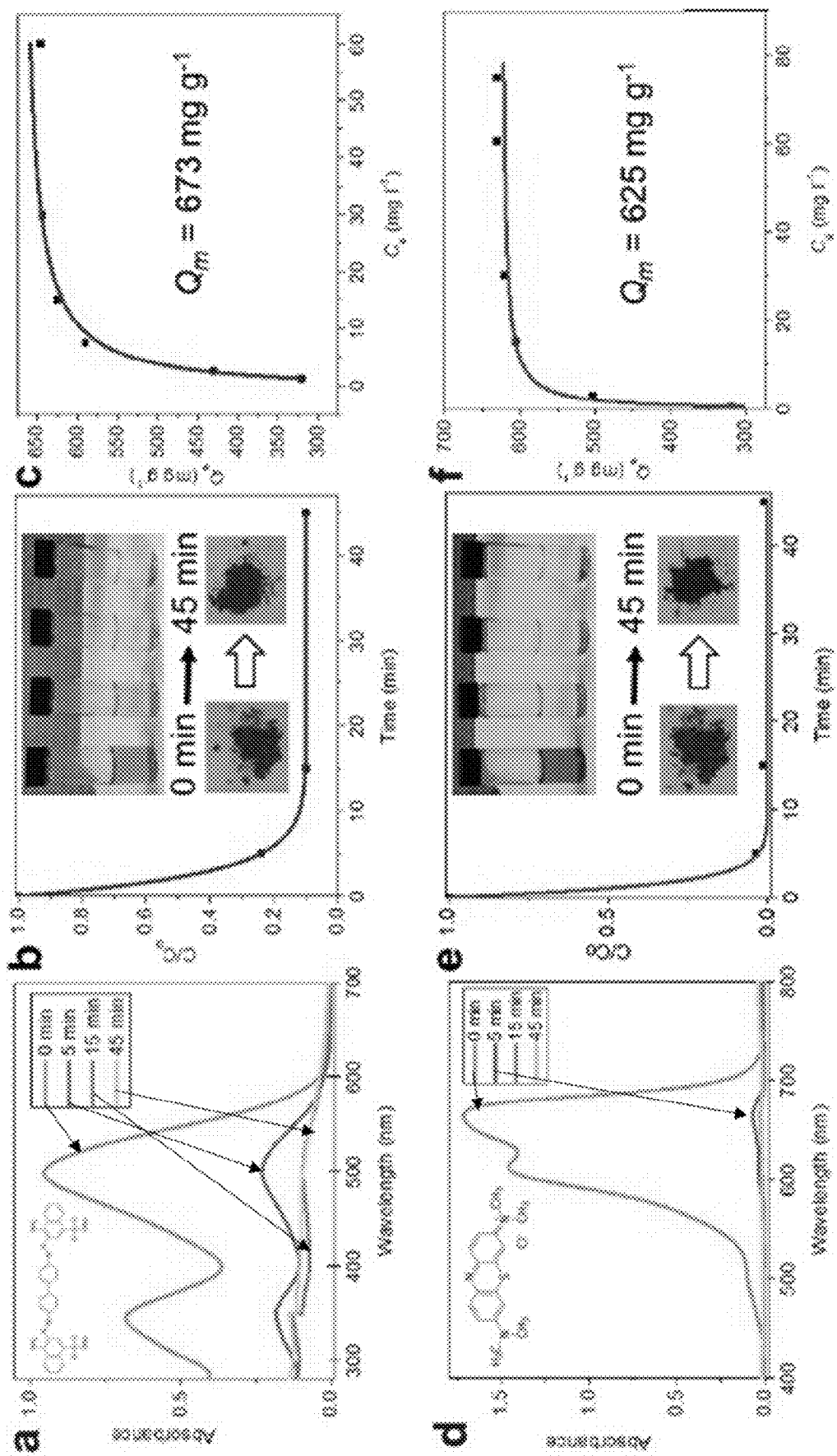
FIG. 4 shows (a, d) UV-Vis absorption spectra of aqueous solutions of, respectively, CR (348 mg/L, 10 ml) and MB (160 mg/L, 10 ml) in the presence of CalP and after increasing absorption times. Insets (left) show the molecular structures of the dyes. Legends (right) show absorption times. (b, e) Plots of the decreases in concentration of, respectively, CR and MB due to the removal of the dyes from solution by CalP. Insets (top) show the fading colors of the solutions that are produced as the dyes are absorbed. Insets (bottom) show CalP before and after absorption of the corresponding dyes. (c, f) Adsorption isotherms of CR and MB on CalP, respectively. $Q_e$ (mg/g) is the amount of dyes adsorbed at equilibrium, $C_e$ (mg/L) is the equilibrium solute concentration.
Figure 15:
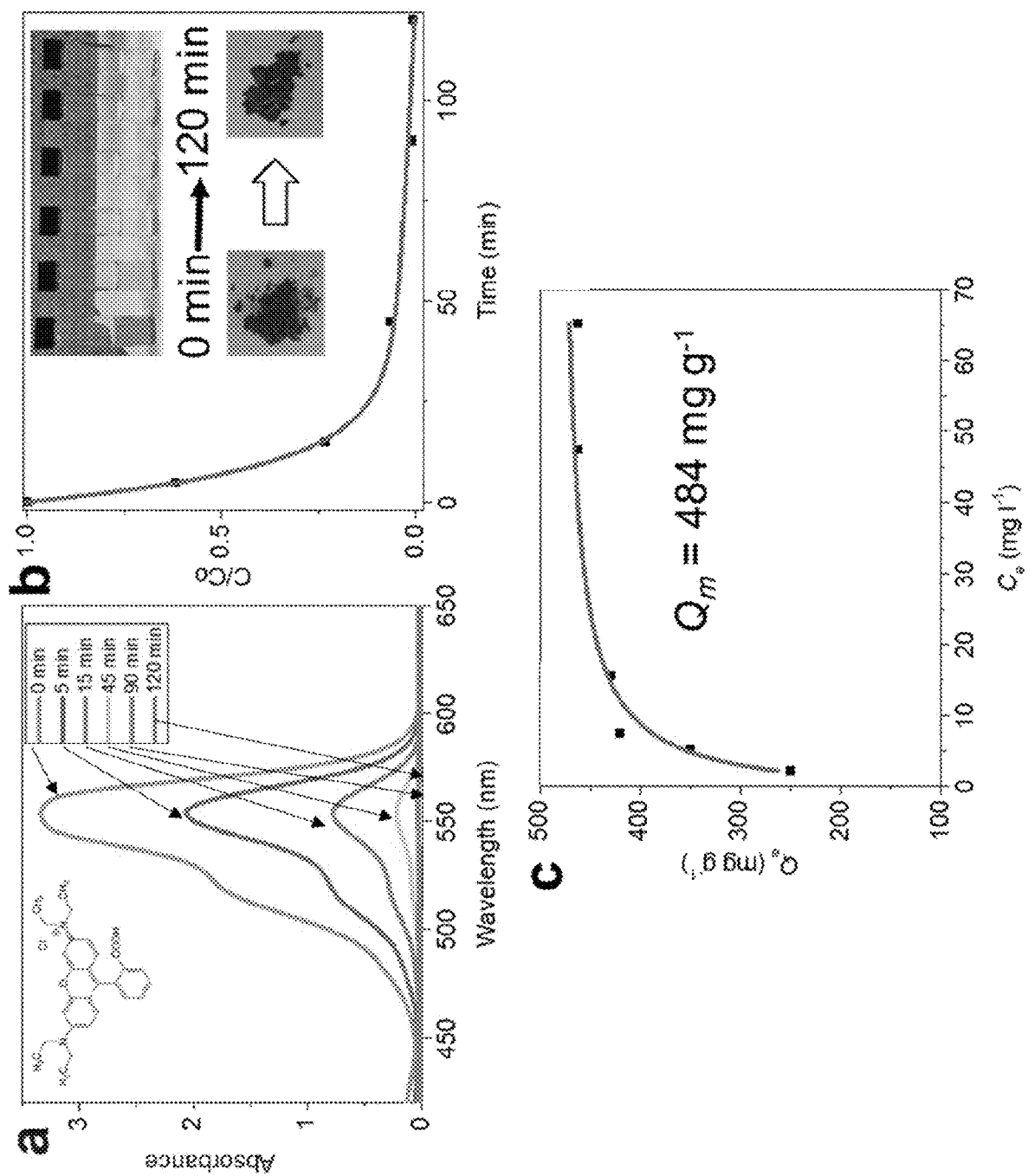
FIG. 15 shows (a) UV-Vis absorption spectra of an aqueous solution of RhB (239 mg/L, 10 ml) in the presence of CalP over time. Inset (left) shows the molecular structure of the dye. Legend (right) correlates spectrum color with time. (b) Plot of the decrease in concentration of RhB due to the removal of the dye from solution by CalP. Inset (top) shows the fading color of the solution as the dye is absorbed. Inset (bottom) shows CalP before and after absorption of RhB. (c) Isotherm corresponding to the absorption of RhB on CalP. $Q_e$ (mg $g^{-1}$) is the amount of dye absorbed at equilibrium, $C_e$ (mg $l^{-1}$) is the equilibrium solute concentration.
Figure 16:
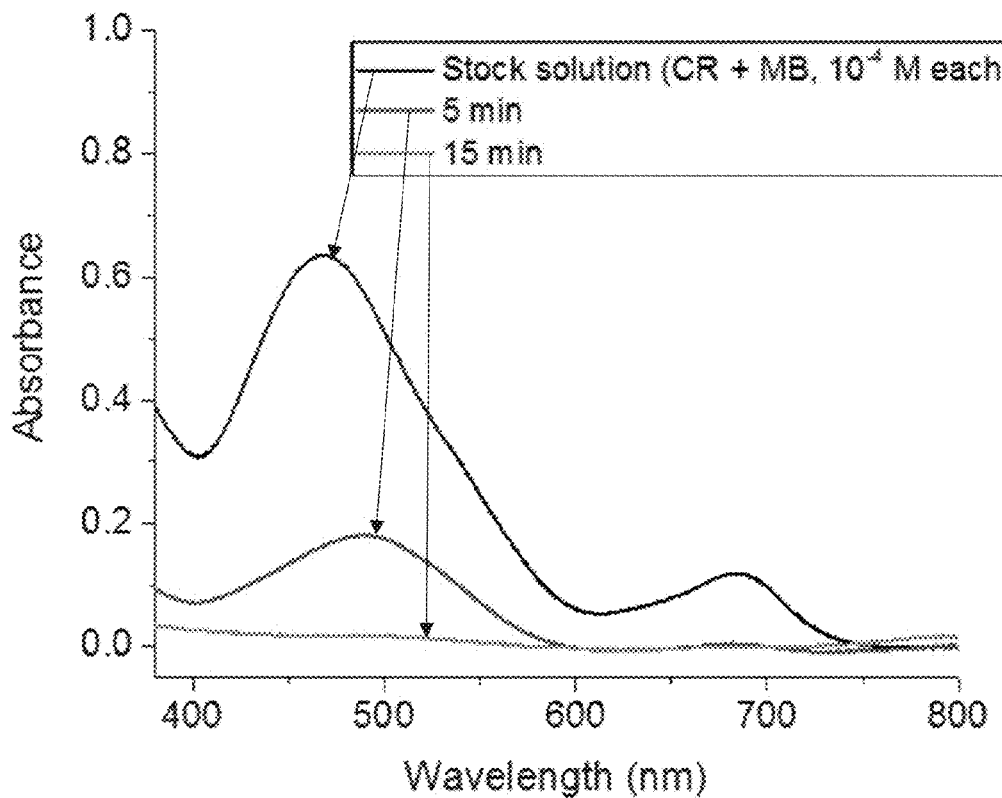
FIG. 16 shows UV-Vis absorption spectra of MB and CR ($0.25 \times 10^{-4}$ M each, 10 ml) solution (in 1N NaCl) in the presence of CalP (5 mg) over time.
Figure 17:
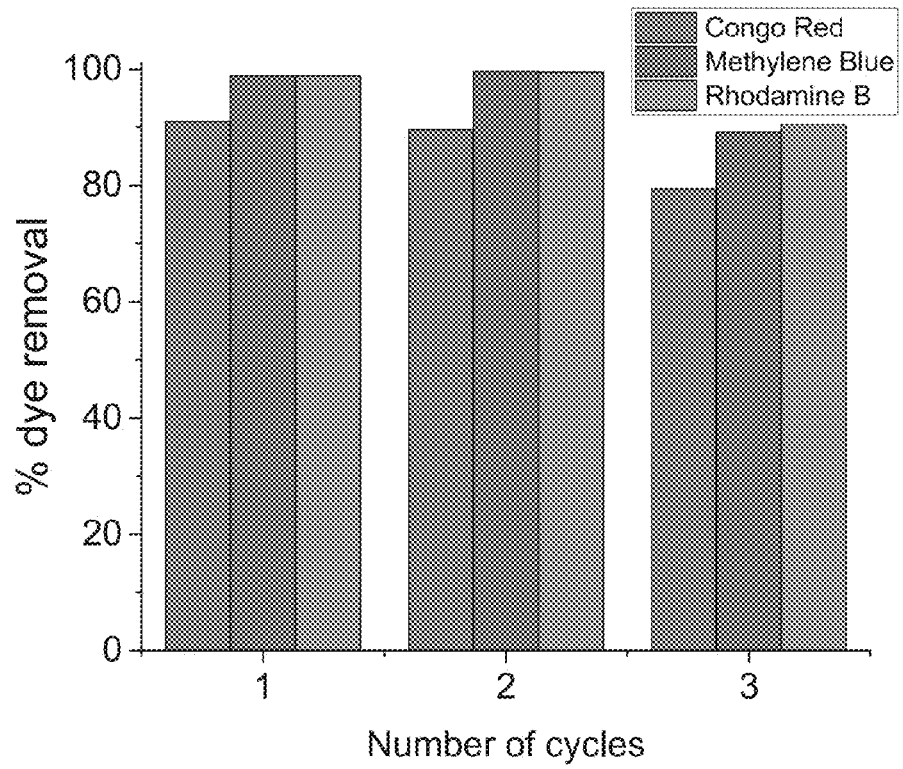
FIG. 17 shows recycling of CalP for toxic dye absorption; dyes (Congo red, methylene blue and rhodamine B) could be removed three times with only a slight decrease in absorption capacity. For each set of bars, from left to right the bars are: Congo red, methylene blue and rhodamine B.

Because of their ability to adsorb large quantities of pollutants with high efficiency, porous materials with high specific surface areas are used for wastewater treatment. To demonstrate the potential of CalP to be effective for such purposes, we determined the polymer's ability to remove Congo red (CR), methylene blue (MB) and rhodamine B (RB) from water. Congo red, an anionic dye, is toxic and considered to be a primary pollutant of water resources. Ultra-violet/Visible (UV/Vis) absorption spectroscopy was used to estimate the rate of the dye's adsorption to CalP in an aqueous solution. A 5 mg sample of CalP was suspended in 10 mL of a 0.5 mM aqueous solution of Congo red, and the decrease in the absorbance of 496 nm light was monitored over time (FIGS. 4a-b). About 80% of the dye was adsorbed within the first five minutes and complete removal was observed within 15 minutes. The adsorption isotherm fitted by the Langmuir model gives a maximum adsorption capacity $Q_m$ of 673 mg $g^{-1}$, corresponding to complete monolayer coverage (FIG. 4c). This capacity is significantly higher than those from numerous adsorbent materials reported previously. The generality of porous CalP's ability to remove organic waste was assessed, preliminarily, by testing other dyes with different physical properties commonly used in the textile industry, specifically, methylene blue and rhodamine B (RhB), both cationic dyes. In the case of MB ($H_2O$, 0.5 mM), ~95% was removed within 5 min whereas in the case of RhB ($H_2O$, 0.5 mM) removal efficiency was ~50% after the same amount of time (FIGS. 4e-f and FIG. 15) and by the same amount of polymer (5 mg). In both cases complete dye removal was achieved within 120 min, indicating very fast dye adsorption kinetics. The maximum adsorption capacities of MB and RhB are 625 and 484 mg respectively. These values are greater than those of numerous previous adsorbent materials reported. In addition, we carried out the adsoption of mixture of dyes (CR and MB) in 1 N NaCl solution and found that CalP is an equally effective (FIG. 16) in real practical situation. The high efficiency and fast kinetics of the absorption of both anionic and cationic dyes are likely due to several phenomena including (i) hydrophobic interactions (between the aromatic cores of the dyes and hydrophobic surface of the polymer), (ii) monopole-dipole interactions (between the quaternary ammonium groups of the dyes and the polymer's hydroxyl groups), (iii) amorphous nature of the polymer that can facilitate swelling of the polymeric network, and (iv) capillary effects due to the polymer's pores. Furthermore, both MB and RhB were easily removed by simply washing the polymer with ethanol at 50° C. for 3 hours. Again, the polymer could re-used for dye-adsorption with no loss of its original efficiency. On the other hand, removal of CR failed with both polar and non-polar organic solvent rinses but was finally achieved by treating the dye-loaded polymer with a 0.1 N $HNO_3$ solution at 50° C. for 6 hours. After this acidic treatment, the adsorption capacity of the polymer remained intact. We observed an unusually strong interaction between CR and CalP (FIG. 17).

In this disclosure, we have successfully synthesized an alkyne-rich, calix[4]arene-containing polymer that is chemically and thermally stable, superhydrophobic and highly porous. It displays high absorption capacity for organic solvents, oils and dyes and can be used for removing these contaminants from water. We believe that the macrocycles of the polymer, as well as its alkynes, serve as effective sorption sites. Furthermore, the polymer can be easily regenerated upon treatment with organic solvents or slightly acidic aqueous solutions and reused many times. The high efficiency and ease of implementation of the polymer as an adsorbent demonstrate the advantages of incorporating the calixarene moiety within a functional material. The calixarene-based materials can be used for water purification, separations and other applications.

Methods:

General. All the chemicals and solvents were purchased from Sigma-Aldrich and used without further purification. Deionized water was used from Millipore Gradient Milli-Q water purification system. Routine nuclear magnetic resonance (NMR) spectra were recorded at 25° C. on a Bruker Avance spectrometer, with working frequencies of 500 MHz for $^1H$, and 125.7 MHz for $^{13}C$ nuclei, respectively. All chemical shifts are reported in ppm relative to the signals corresponding to the residual non-deuterated solvent (DMSO-$d_6$: δ=2.50 ppm).

Materials characterization. FTIR studies were carried out on Agilent 670-IR spectrometer. TGA experiments were performed on TA SDT Q600. SEM images were obtained from FEI Quanta 450FEG. TEM images were obtained from FEI-Titan 300. Solid-state cross-polarization magic angle spinning (CP/MAS)$^{13}C$ NMR spectra of the polymer were recorded on a Bruker Avance 500 Wide Bore (500 MHz) NMR spectrometer at ambient temperature with a magic angle spinning rate of 18.0 kHz. UV-Vis studies were carried out on Cary 5000 UV-Vis-NIR spectrophotometer. All UV-Vis spectra were recorded at room temperature using a quartz cell with 10 mm or 1 mm path length over the range 200-800 nm and corrected against an appropriate background spectrum. Surface area measurements were conducted on a Micromeritics 3Flex gas sorption analyzer. Samples (30-80 mg) were degassed at 85° C. for 24 h and then backfilled with $N_2$. Adsorption isotherms were generated by incremental exposure to ultrahigh-purity nitrogen up to 1 atm in a liquid nitrogen bath, and surface parameters were determined using BET adsorption models included in the instrument software (Micromeritics ASAP 2020 V4.00). The contact angles were measured using dataPhysics OCA 15EC Contact Angle (sessile drop, manual fitting) instrument.

Synthesis of 5,11,17,23-Tetrabromo-25,26,27,28-tetrahydroxycalix[4]arene

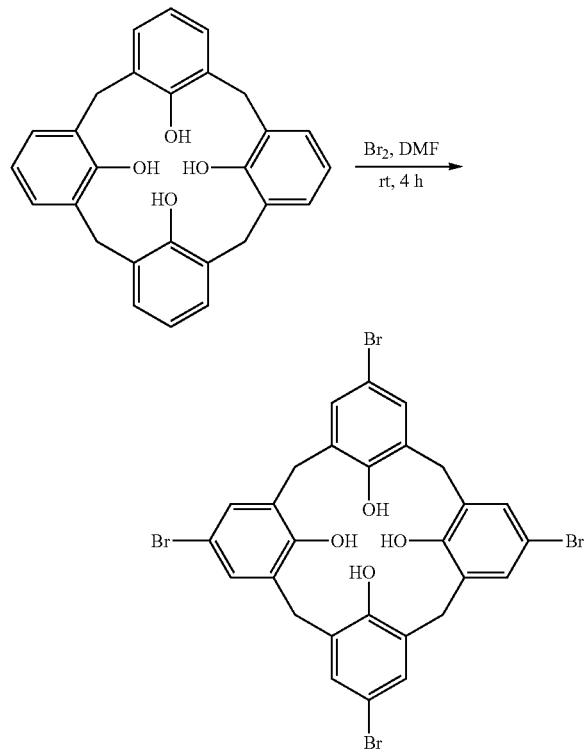

Bromine (0.4 mL, 7.84 mol) in DMF (5 mL) was added dropwise with stirring to a solution of calix[4]arene (0.5 g, 1.18 mmol) in DMF (20 mL). The solution was stirred for 4 h. A precipitate began to form after about 0.5 h. After the 4 h of reaction, methanol (20 mL) was added, and the mixture was left to stir for an additional 0.5 h. The precipitate was filtered off and washed with methanol to yield the brominated product (0.75 g, 87%) as a white solid. $^1$H NMR ([D6]DMSO, 25° C., 500 MHz): δ=7.34 (s, 8H, ArH), 3.81 ppm (br s, 8H, ArCH$_2$Ar). $^{13}$C NMR ([D6]DMSO, 25° C., 125.7 MHz): δ$_c$=151.8, 131.98, 131.08, 110.89, 30.94.

Synthesis of polymer. A solution of 5,11,17,23-Tetrabromo-25,26,27,28-tetrahydroxycalix[4]arene (0.300 g, 0.408 mmol), bis(triphenylphosphine)palladium(II) chloride (0.086 g, 0.122 mmol), and copper(I) iodide (0.086 g, 0.201 mmol) in anhydrous tetrahydrofuran (30 mL) were placed in a 100 mL two-neck round-bottom flask equipped with a condenser. Diisopropylamine (1.6 mL, 1.63 mmol) and 1,4-diethynylbenzene (0.102 g, 0.816 mmol) were loaded into a separate 50 mL flask. Both solutions were sparged with N$_2$ for at least 15 min. The diethynylbenzene solution was then added dropwise over 5 min to the calixarene solution with stirring to afford a dark brown reaction mixture after 5 min. The reaction was heated at 65° C. under N$_2$ for 60 h. After cooling to room temperature, the solid product was centrifuged and washed with excess (cold and hot) tetrahydrofuran, chloroform, acetone, and (cold and hot) water to remove any unreacted monomers and metal catalyst residues. The final products were dried under a vacuum for 16 h at 60° C. to give CalP as a brown powder in 60 mol % yield versus the bromo-precursor.

Oil and organic solvent removal. Absorption of the following neat organic solvents and oils by CalP was measured: ethanol, toluene, tetraethylene glycol, used engine oil, and commercial crude oil (ATSM D5307). Dry, porous CalP was fully submerged in each solvent or oil for six hours to ensure complete saturation. Saturated CalP was removed and weighed quickly to avoid evaporation of the organic liquid. Absorption capacity values, W (wt/wt) %, were calculated by subtracting the mass of the dry porous CalP sample from the mass of the corresponding saturated polymer. The absorption capacity of activated carbon was tested with the same solvents and oils by following the same procedure.

Toxic dye removal. Solutions of Congo red, methylene blue and rhodamine B were prepared by dissolving each dye in deionized water. In a typical absorption test, 5 mg of CalP was added to 10 ml of dye solution (0.5 mM) with stirring. To monitor the absorption process, UV-Vis absorption spectra were recorded at the absorption maximum of the corresponding dye at different time intervals. The adsorption isotherms were obtained by varying the initial concentration of the dyes. The adsorption isotherms were fitted (correlation coefficients, $R^2$>0.98) by using the Langmuir adsorption model.

$$Q_e = Q_m b C_e / (1 + b C_e) \qquad (1)$$

where $Q_e$ (mg g$^{-1}$) is the amount of dye adsorbed at equilibrium, $C_e$ (mg l$^{-1}$) is the equilibrium solute concentration, $Q_m$ is the maximum adsorption capacity corresponding to complete monolayer coverage, and b is the equilibrium constant (1 mg$^{-1}$).

Example 2

This example provides a description of preparation, characterization of polycalixarenes, and their use for ultrafast removal of organic micropollutants from water.

A series of calix[4]arene-based porous materials (CalPn's, n=2, 3, and 4) were synthesized and used as an efficient adsorbents to remove organic micropollutants from water. These materials exhibit excellent adsorption efficiencies and fast adsorption kinetics for range of micropollutants through multiple sorption sites. CalP4, one of the materials developed in current study removed Bisphenol A with the fastest rate than all other tested adsorbents with ~70% removal within 30 sec and reached equilibrium within 15 min with a removal efficiency of ~80%. It also removed ~82% of propranolol within 30 sec of contact and reached equilibrium in 20 min with a removal efficiency of ~91%. The adsorption rate constant ($k_{obs}$) for bisphenol A adsorption is 2.12 mg g$^{-1}$ min$^{-1}$ and for propranolol adsorption is 1.75 mg g$^{-1}$ min$^{-1}$: these values are highest for all reported materials. The maximum adsorption capacity ($q_m$) at equilibrium was found to be 403 mg g$^{-1}$ for bisphenol A and 257 mg g$^{-1}$ for propranolol, higher than any previously reported value. These results show that our material outperformed both the best performed reported materials and commercial adsorbents. In addition, the polymer can be regenerated several times using a simple washing procedure and reused while maintaining the adsorption performance. The high efficiency and ease of implementation of the polymer as an adsorbent demonstrate the advantages of calixarene-based materials for water purification and other applications.

In this example, we describe the design and synthesis of a series of hypercorsslinked π-bond-rich porous covalent organic polymers based on calix[4]arenes (CalP2, CalP3, and CalP4). We determined if fixing calixarenes within the backbone of the polymeric network would create an adsorbent material that possesses arene-rich aromatic character and guest recognition properties. We selected enriching the polymer with alkyne functionalities, to provide materials with a high surface areas. These materials exhibit excellent adsorption efficiencies and fast adsorption kinetics for range of micropollutants as a result of combine three effective sorption sites: dipolar interactions that involve the calixarene rim, nonpolar interactions involving the hydrophobic cavity of the calixarene and the polymer's constituent aromatic rings and alkynes. These results show that our material outperformed other reported materials and commercial adsorbents. In addition, the polymer can be regenerated several times using a simple washing procedure and reused while maintaining the adsorption performance. These findings demonstrate the promise of porous calix[4]arene-based polymers for efficient water treatment and development of economical adsorbent materials.

Figure 26:
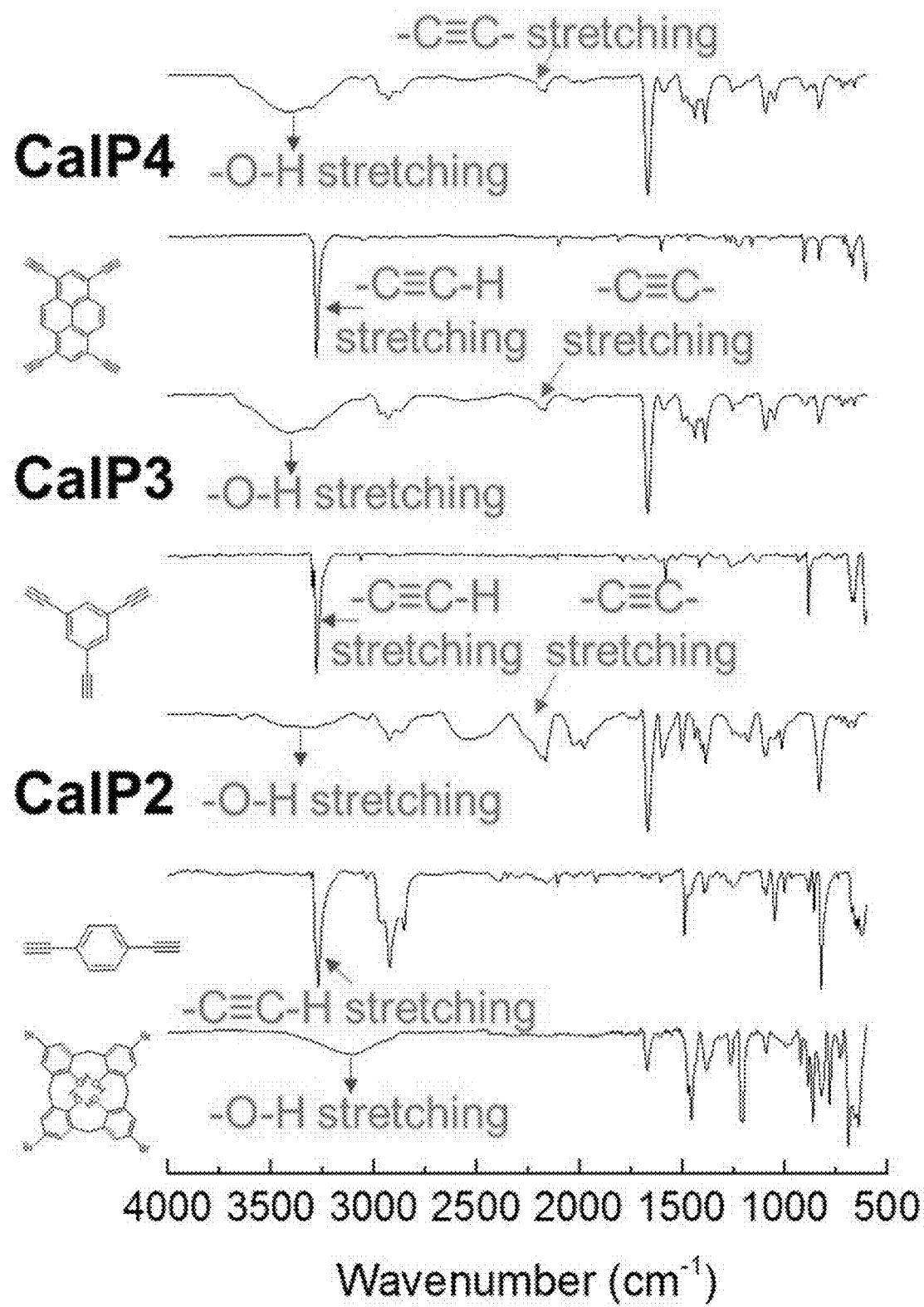
FIG. 26 shows FTIR spectra of CalP2, CalP3, CalP4, and corresponding monomers. This illustrates the completion of the cross-coupling reactions: all polymers do not exhibit the terminal alkyne —C—H stretching vibration from monomers and —C—Br vibration stretching of bromocalix[4]arene derivative. Moreover, all polymers exhibit FTIR signal correspond to both alkyne —C≡C— stretching vibration mode and calix[O]arene phenolic —O—H stretching vibrations.

The polymers were synthesized from tetrabromoderivative of calix[4]arene (1) and three different acetylene linkers (2, 3, and 4) by palladium catalyzed Sonogashira-Hagihara cross-coupling polycondensation reaction in dry THF at 65° C. for 60 h (FIG. 24). After centrifugation and multiple washings of the reaction precipitates, the polymer obtained was completely insoluble in water and all organic solvents tested, including THF, acetone, $CHCl_3$, DMF and DMA, indicating the formation of a stable polymers. FTIR spectra (FIG. 26) of polymers do not exhibit the terminal alkyne —C—H stretching vibration of the acetylene monomers near 3300 $cm^{-1}$ and C—Br vibration stretching of bromocalix[4]arene near ~650 $cm^{-1}$, which indicate the completion of the cross-coupling reactions. Importantly, these polymers exhibit an absorption band near 2250 $cm^{-1}$ and a broad band near 3320 $cm^{-1}$, which correspond to the alkyne —C≡C— stretching vibration mode and calix[4]arene phenolic —OH stretching vibrations, respectively.

Figure 18:
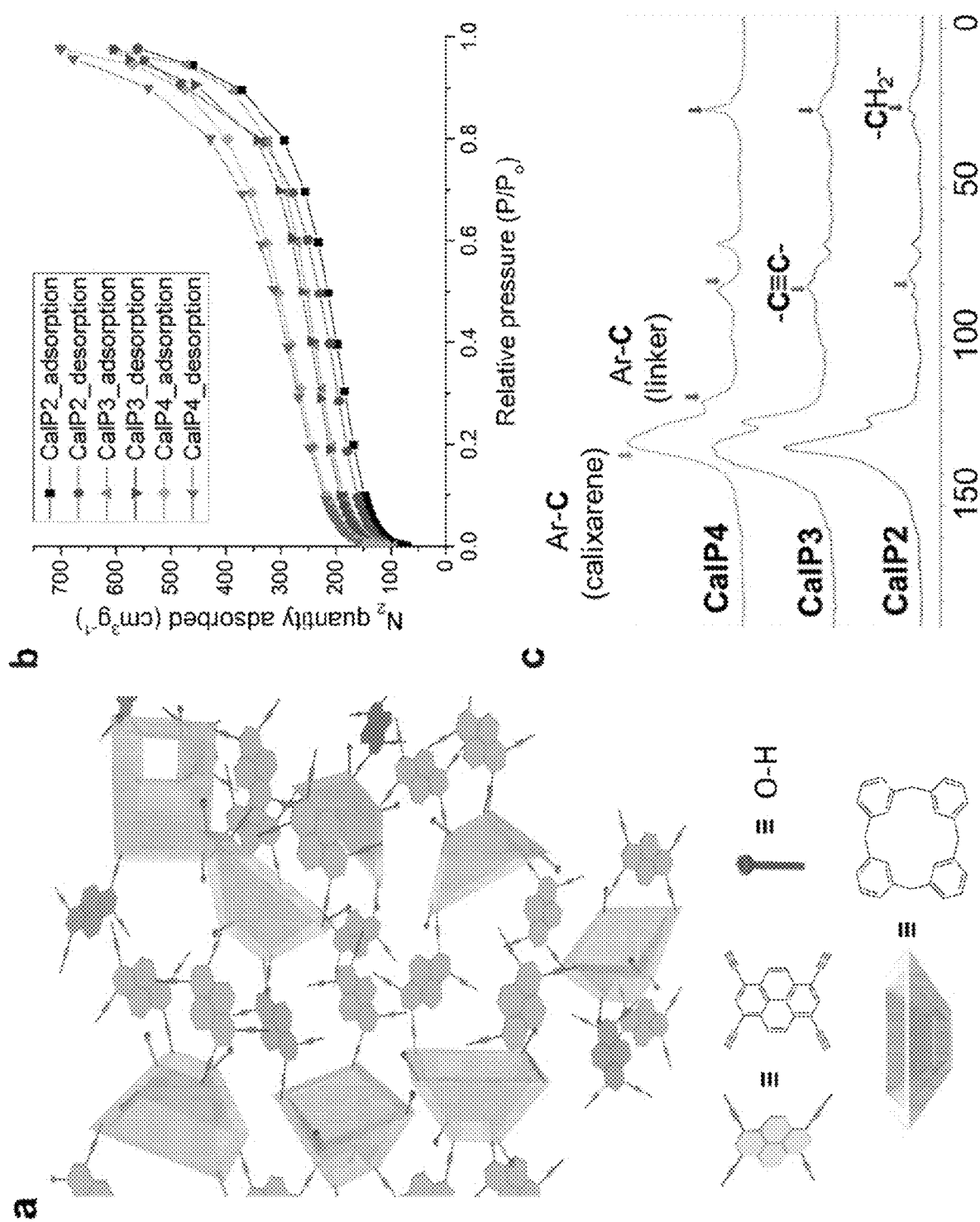
FIG. 18 shows characterization and $N_2$ adsorption studies of CalPn (n=2-4). (a) Schematic network structure of the best performing calix[4]arene polymer, CalP4. (b) $N_2$ uptake isotherms at 197 K; calculated surface areas were 596, 630, and 759 $m^2$ $g^{-1}$ for CalP2, CalP3, and CalP4, respectively. (c) $^{13}C$ CP/MAS NMR spectra for CalPn with corresponding peak assignments.
Figure 27:
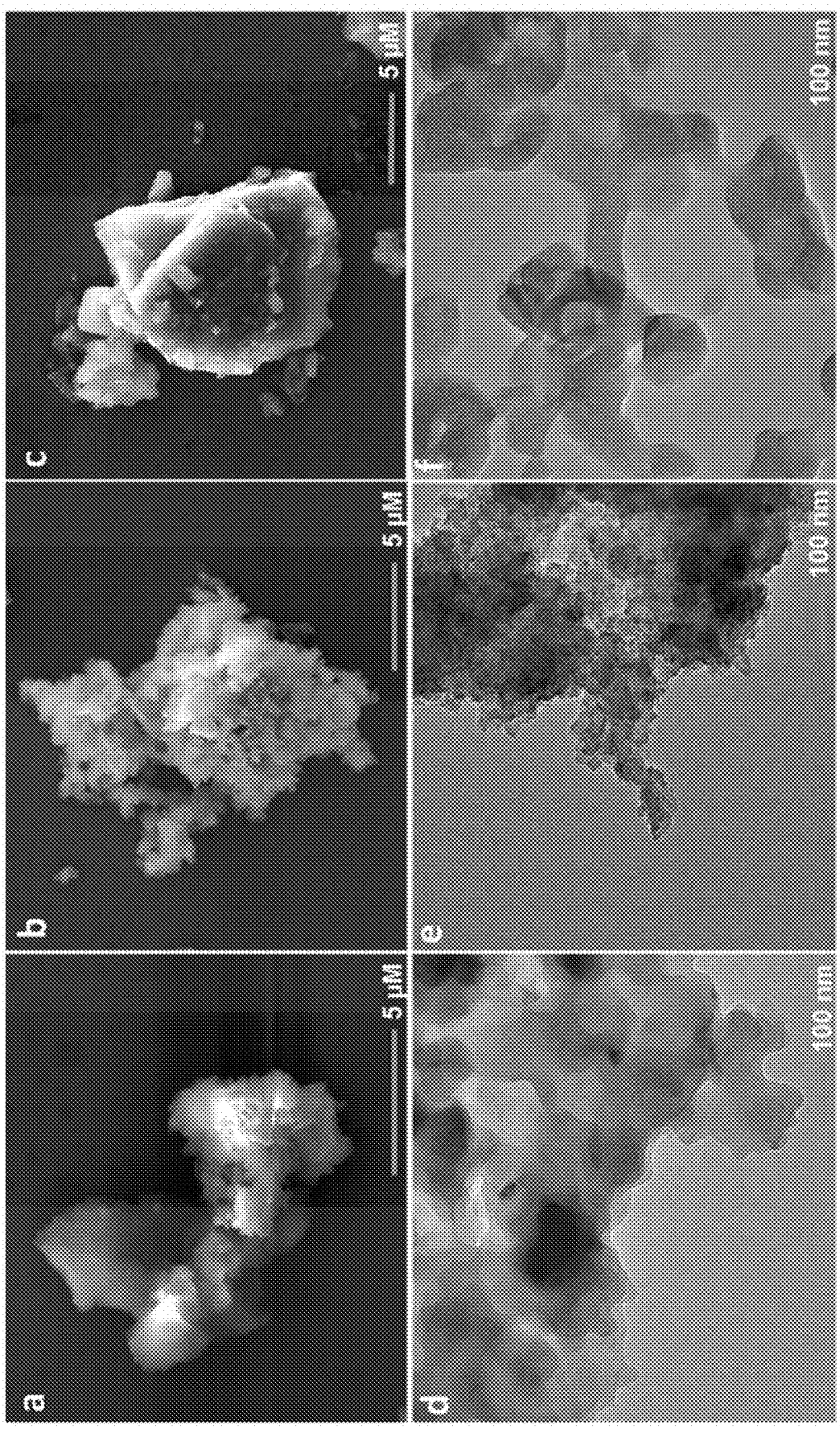
FIG. 27 shows low-magnification SEM images of CalP2 (a), CalP3 (b), and CalP4 (c); scale bar=5 μm. High-resolution TEM images of CalP2 (d), CalP3 (e), and CalP4 (f) that hints at the presence of pores in the polymers; scale bar=100 nm.
Figure 28:
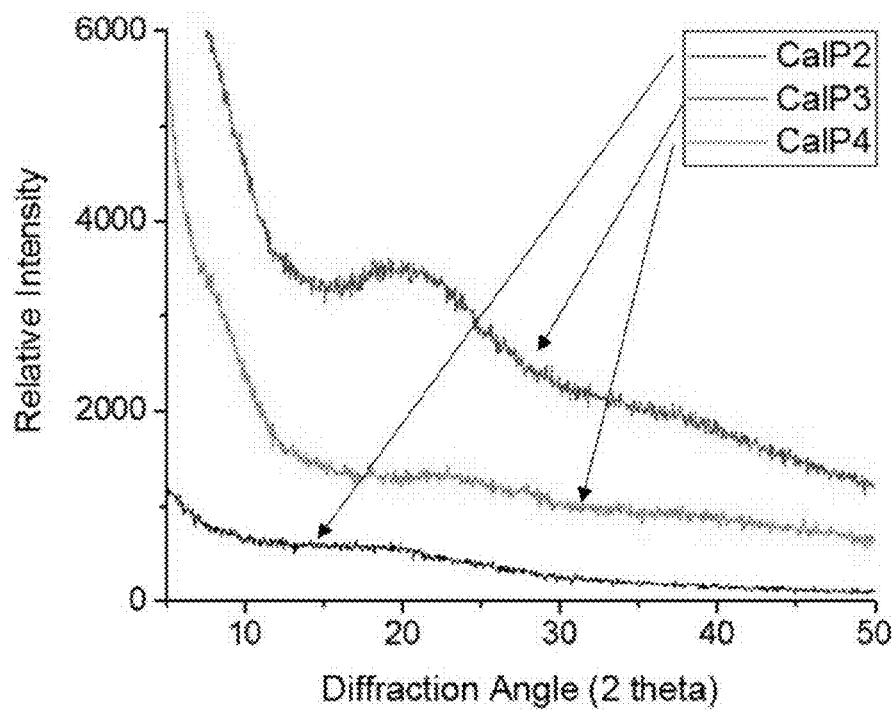
FIG. 28 shows powder X-ray diffraction (PXRD) pattern of CalP2 (black), CalP3 (red), and CalP4 (green).
Figure 29:
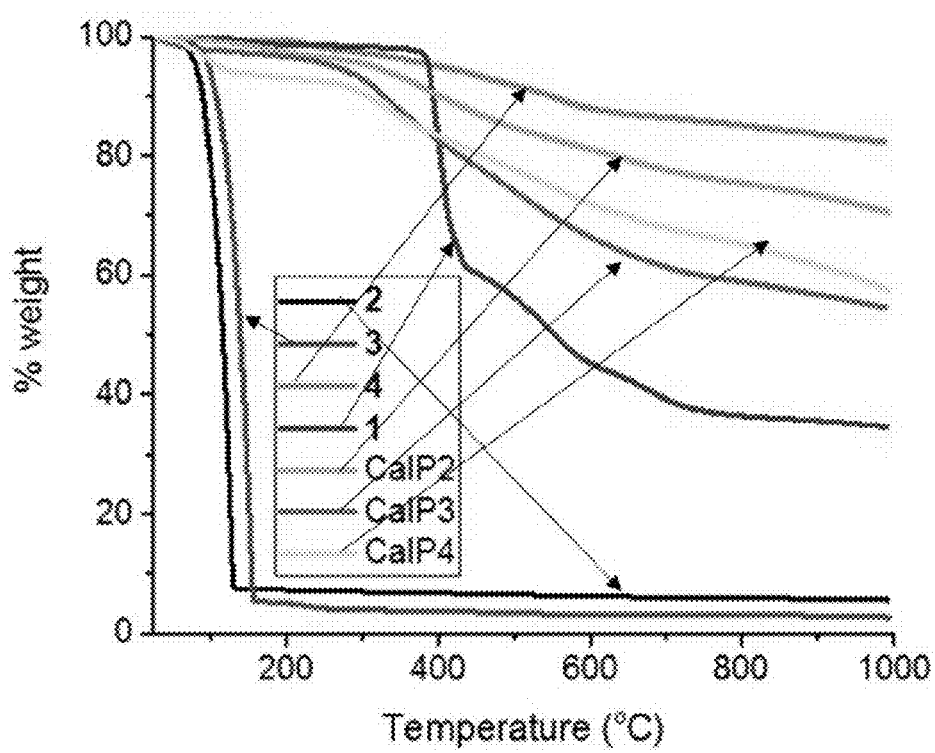
FIG. 29 shows TGA plots for CalP2 (green), CalP3 (pink), CalP4 (yellow), 1,4-diethynlebenzene (2, black), 1, 3, 5-triethynylbenzene (3, red), 1,3,6,8-Tetraethynylpyrene (4, green) and tetrabromocalix[4]arene (1, blue).

To ascertain the molecular structures of CalPn (n=2-4), the polymers were characterized by solid-state cross-polarization magic angle spinning (CP/MAS)$^{13}$C NMR (FIG. 18c). The chemical shift peaks observed in the range of 135-160 ppm are ascribed to the aromatic carbons of the phenylene groups of the macrocycle whereas the resonance peaks around 130 ppm correspond to phenylene carbons of the linkers. The resonance peak of the ethylene (—C≡C—) carbons appears near 90 ppm. The broad resonance peak at around 25 ppm is associated with the aliphatic methylene moieties (—$CH_2$—) of the macrocycle. These observations suggest the successful formation of covalently crosslinked polymers. The microstructure and morphology of these polymers were characterized by scanning electron microscopy (SEM) and transmission electron microscopy (TEM) analyses. Both SEM and TEM images show fused amorphous clumps, however, TEM images hint the presence of pores (FIG. 27). Powder X-ray diffraction (PXRD) patterns of these polymers (FIG. 28) show a characteristic broad peak that suggest their amorphous nature. Thermogravimetric analysis (TGA) of the polymers indicate excellent thermal stability over 500° C. (FIG. 29).

Figure 30:
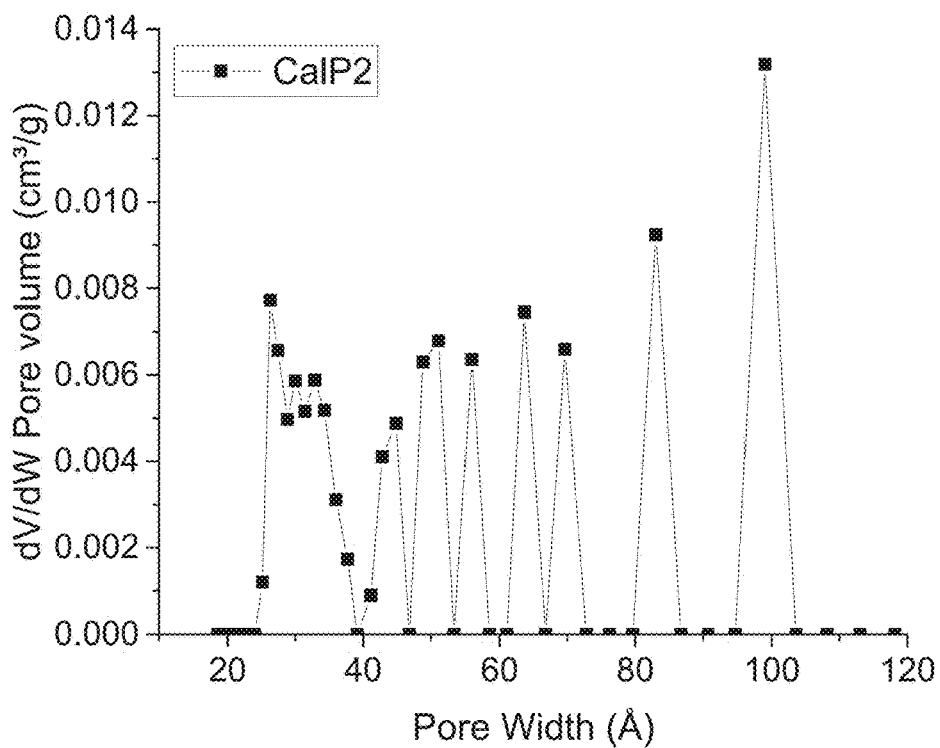
FIG. 30 shows NLDFT pore size distribution for CalP2 determined from $N_2$ adsorption/desorption isotherms.
Figure 31:
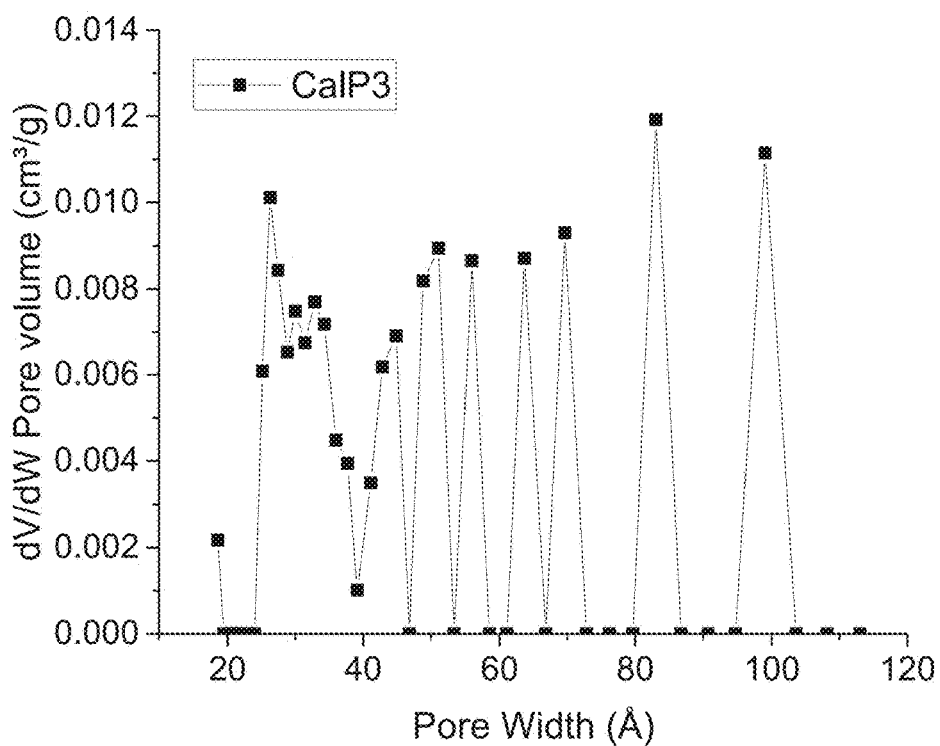
FIG. 31 shows NLDFT pore size distribution for CalP3 determined from $N_2$ adsorption/desorption isotherms.
Figure 32:
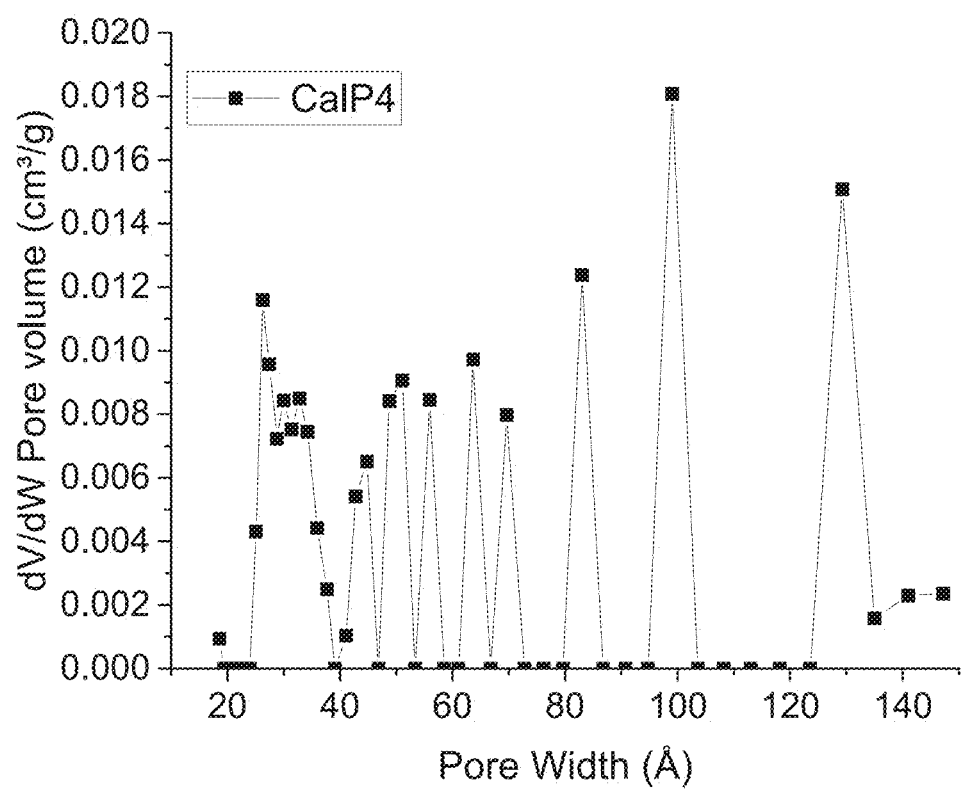
FIG. 32 shows NLDFT pore size distribution for CalP3 determined from $N_2$ adsorption/desorption isotherms.

The porosities of the polymers were evaluated by $N_2$ gas adsorption/desorption experiments. The polymers were activated at 358 K for 24 h prior to the measurements to remove solvent and trapped gas molecules. Based on the IUPAC classification system, the observed $N_2$ sorption isotherm (FIG. 18a) can be categorized as type II with a H4 type hysteresis loop corresponding to desorption. The polymers have a pore size distribution mainly in the mesopore region, NLDFT average pore diameter is in the range of 62-97 Å and a cumulative pore volume in the range of 0.56-1.09 $cm^3g^{-1}$ (FIG. 30-32). These data suggest a complex polymeric network that contains both micropores and mesopores and swells with gas intake. The specific surface areas calculated using the Brunauer-Emmett-Teller (BET) equation were found to be 596, 630, and 759 $m^2g^{-1}$ for CalP2, CalP3, and CalP4, respectively. These values depend on the linker molecule; surface area increase with the increase in number of acetylene groups.

Figure 19:
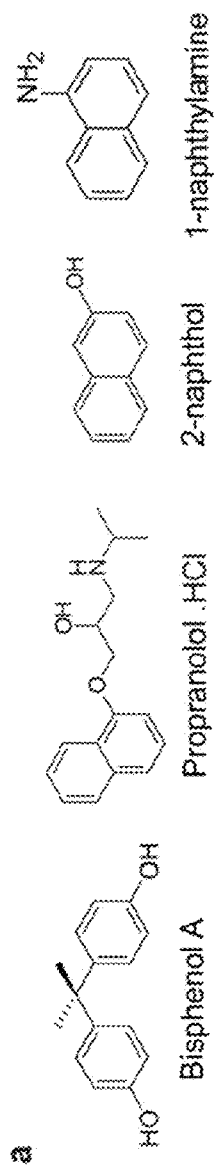
FIG. 19 shows the rate of various micropollutants removal by different adsorbents. (a) Structures of each tested emerging organic micropollutant. (b-e) Time-dependent adsorption of each pollutant (0.1 mM) by different adsorbents (0.5 mg $ml^{-1}$); bisphenol A (b), Propranolol.HCl (c), 1-naphthylamine (d), and 2-naphthol (e). All adsorption studies were compared with commercial activated carbon (AC) performance.
Figure 19:
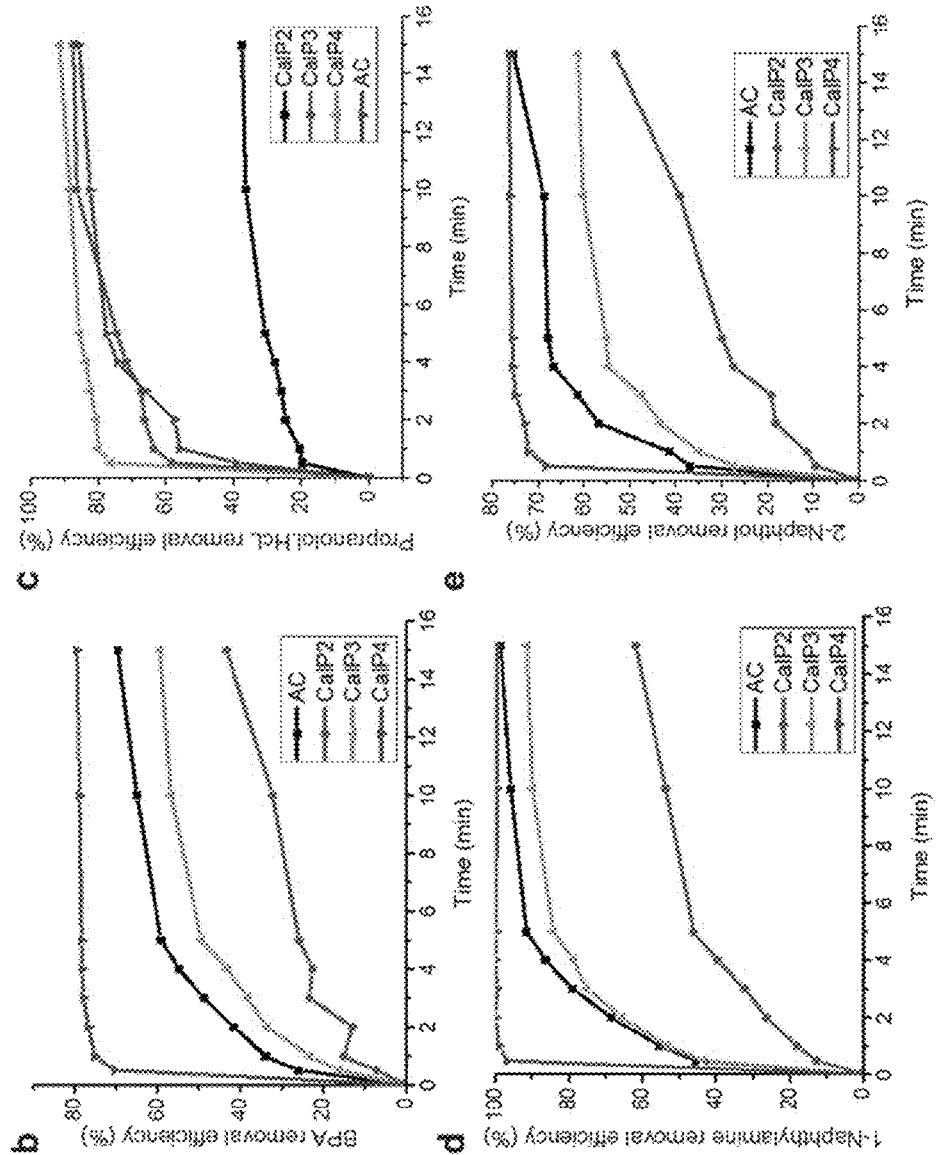
Figure 20:
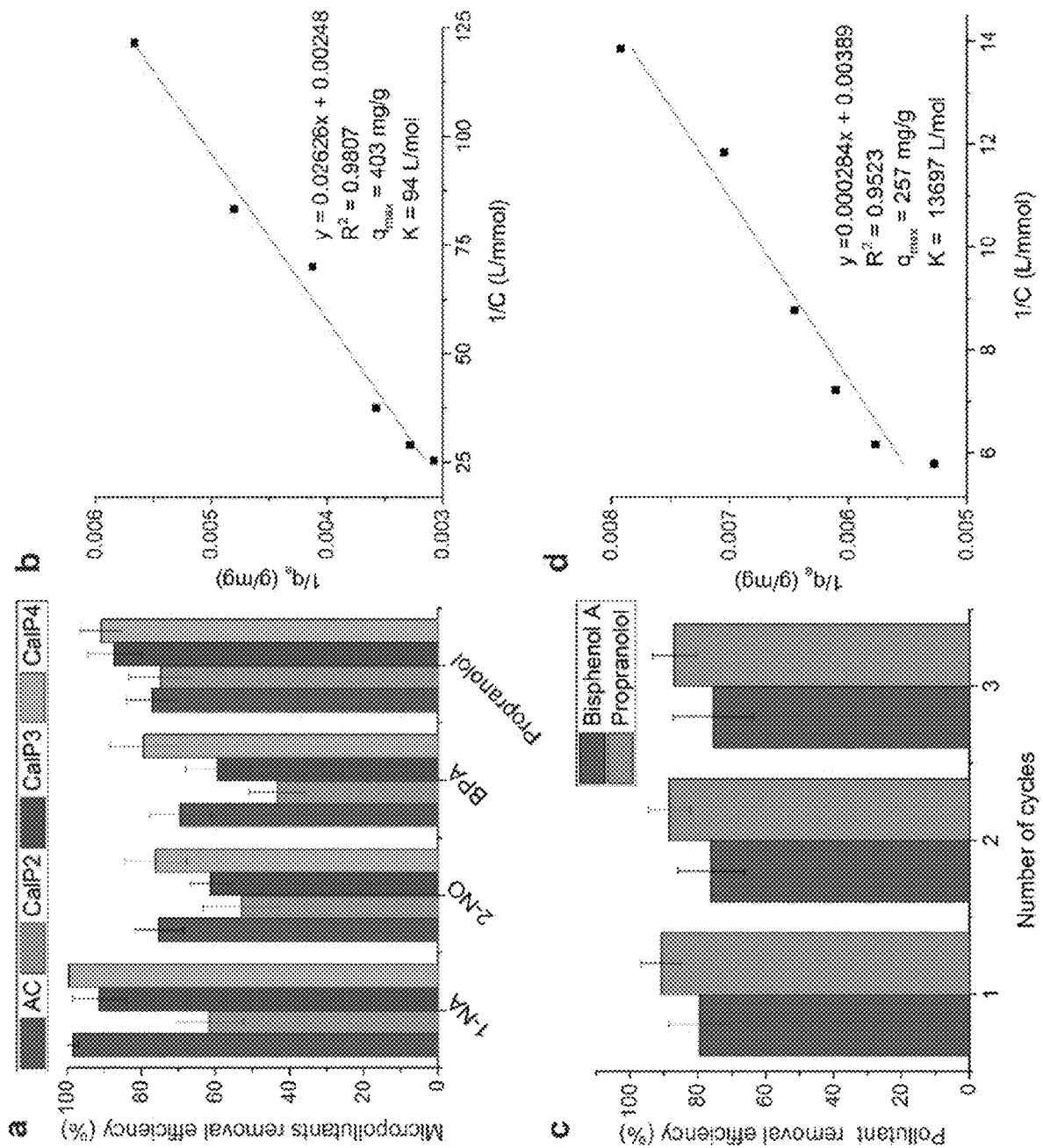
FIG. 20 shows overall adsorption efficiency of tested adsorbents, thermodynamic and regeneration studies. (a) Percentage removal efficiency of each pollutant at equilibrium by different adsorbents. (b) Langmuir isotherm of bisphenol A adsorption by CalP4. Langmuir model fitting resulted in an association constant (K) of 94 L $mol^{-1}$ and an 403 mg $g^{-1}$ maximum adsorption capacity ($q_{max}$) at higher pollutant concentration (up to 1 mM). (c) The percentage of bisphenol A and propranolol removed by CalP4 after three consecutive regeneration cycles. (d) Langmuir isotherm of propranolol adsorption by CalP4. Langmuir model fitting resulted in an association constant (K) of 13697 L $mol^{-1}$ and an 257 mg $g^{-1}$ maximum adsorption capacity ($q_{max}$) at higher pollutant concentration (up to 1 mM).
Figure 21:
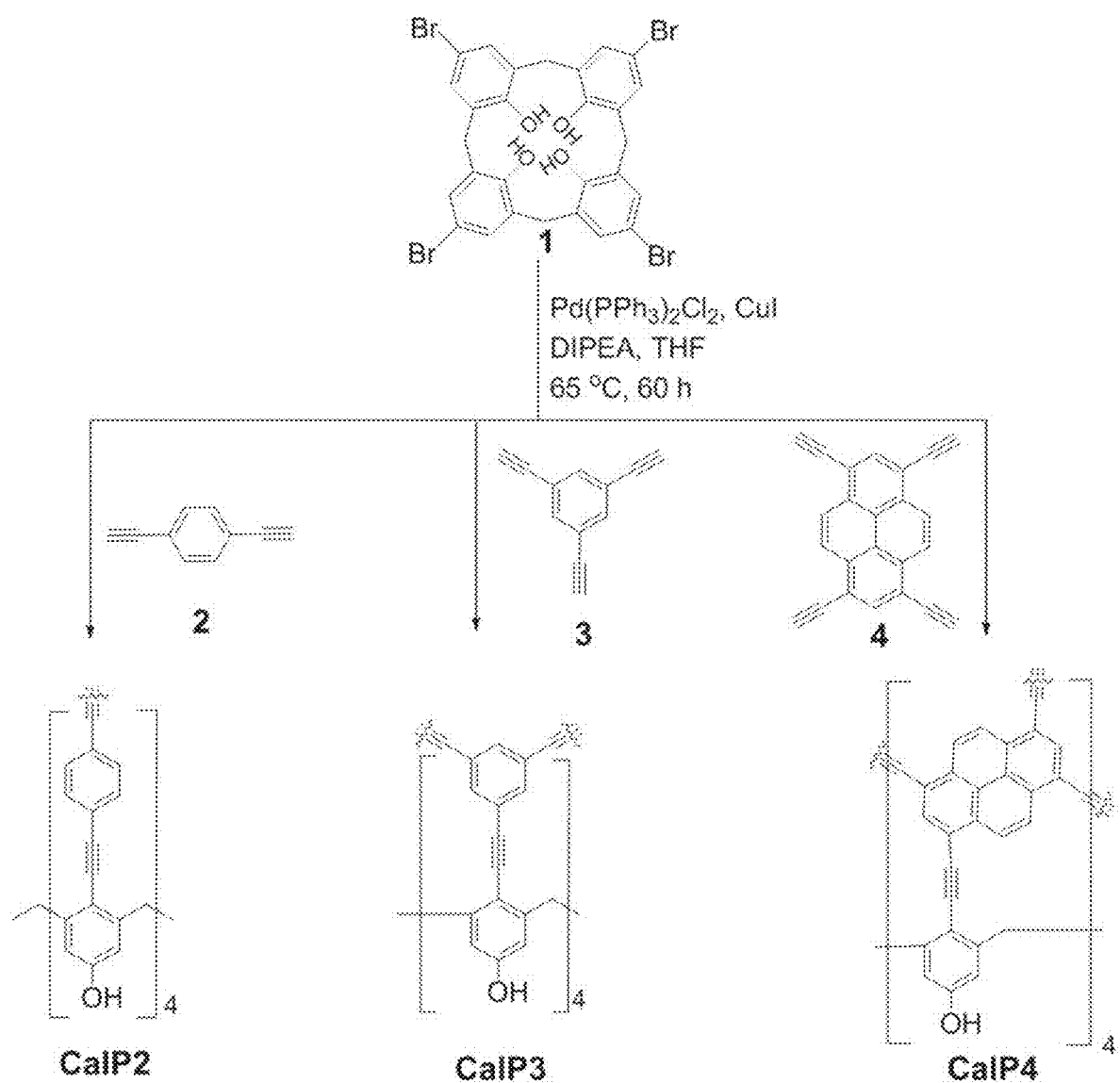
FIG. 21 shows a synthetic route to porous calix[4]arene polymers CalPn (n=2-4) by Sonogashira-Hagihara cross-coupling.
Figure 33:
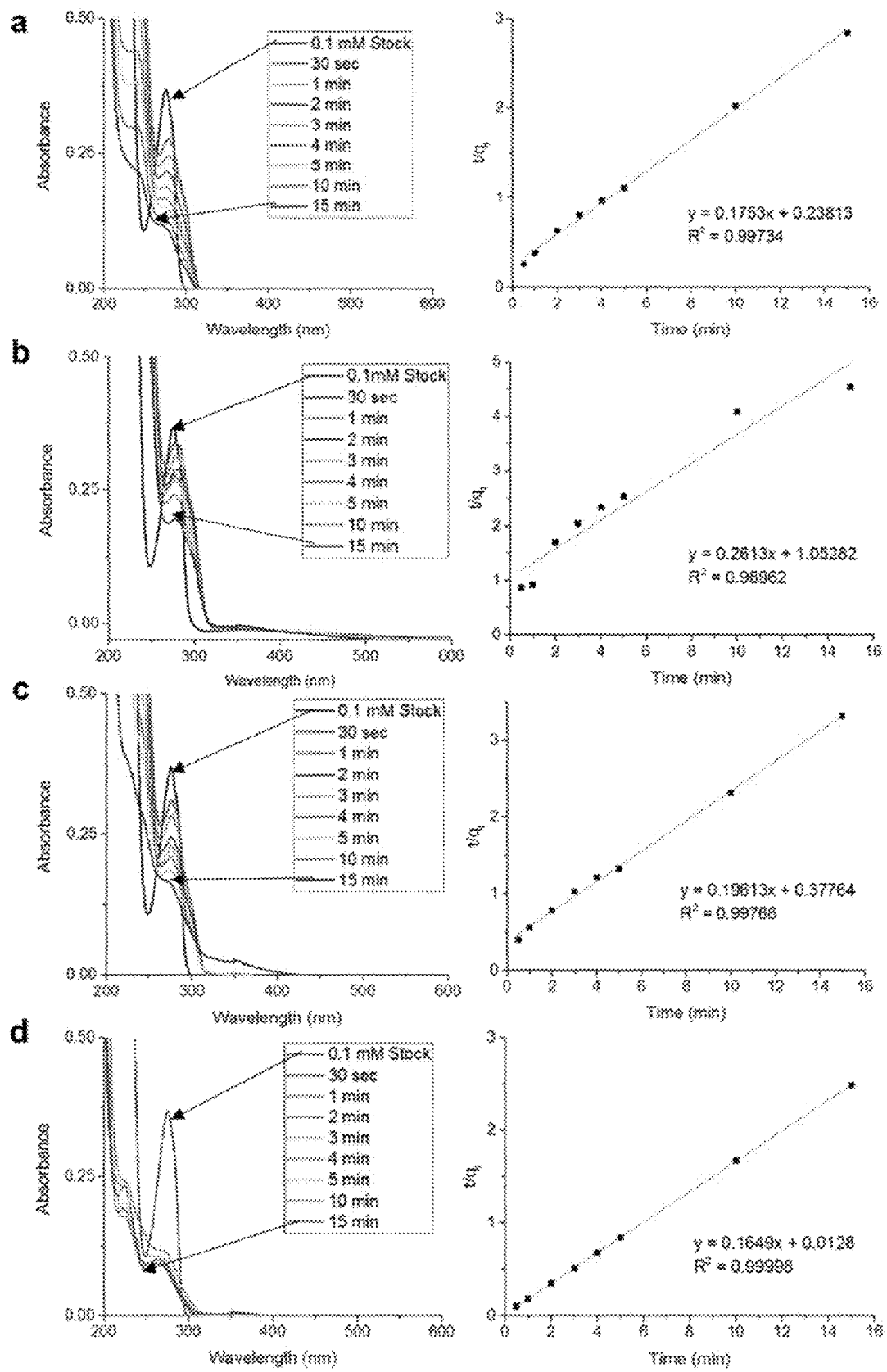
FIG. 33 shows characterization of the rate of bisphenol A uptake by each adsorbent. UV-vis spectra recorded at different contact times (colored traces; left column) and pseudo-second-order plots (right column) for AC (a), CalP2 (b), CalP3 (c), and CalP4 (d). t (in min) is the contact time of bisphenol A solution with the adsorbent, and $q_t$ (in mg g-1) is the amount of bisphenol A adsorbed per gram of adsorbent at time t.
Figure 34:
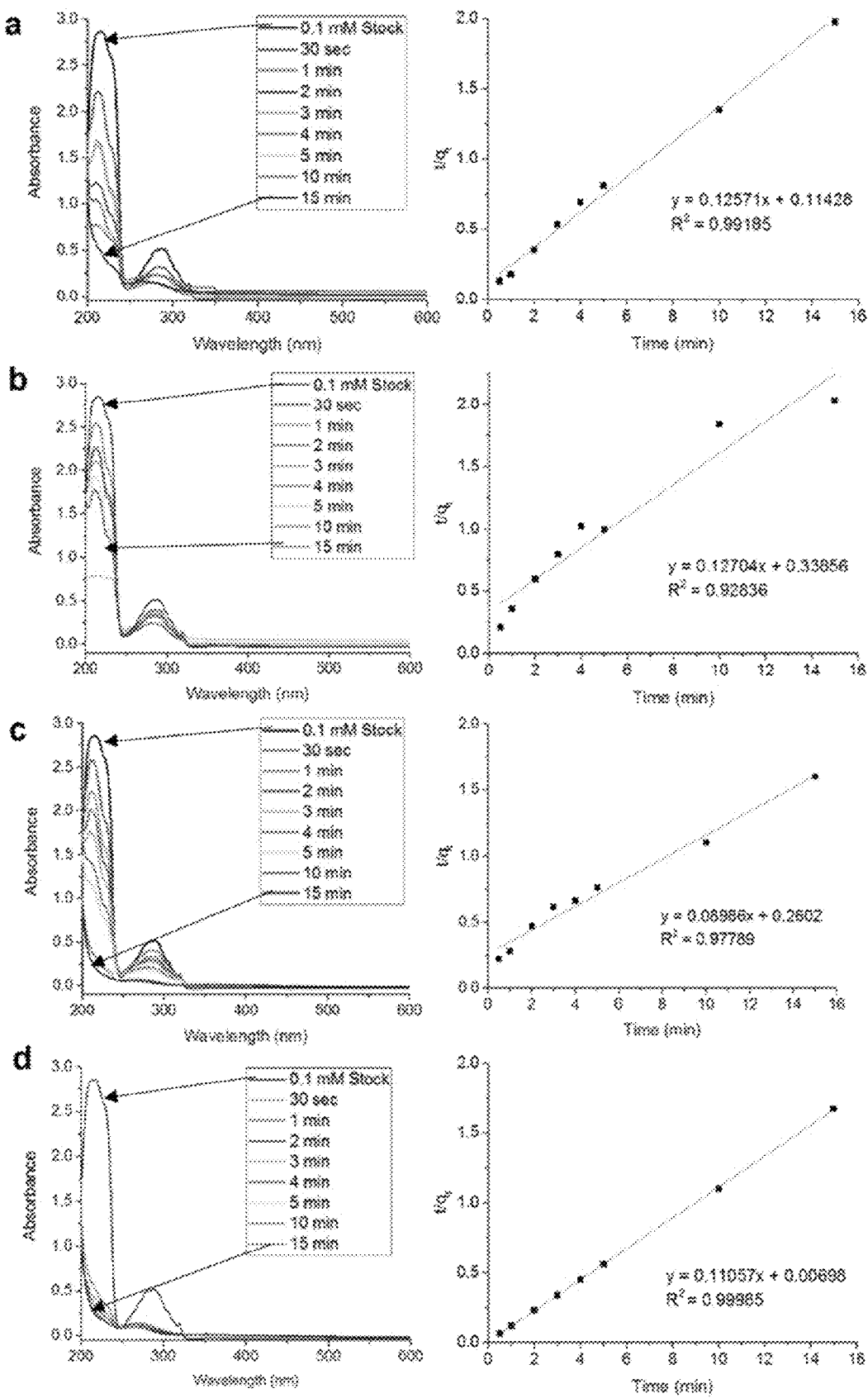
FIG. 34 shows characterization of the rate of propranolol.HCl uptake by each adsorbent. UV-vis spectra recorded at different contact times (colored traces; left column) and pseudo-second-order plots (right column) for AC (a), CalP2 (b), CalP3 (c), and CalP4 (d). t (in min) is the contact time of propranolol solution with the adsorbent, and $q_t$ (in mg g-1) is the amount of pollutant adsorbed per gram of adsorbent at time t.
Figure 35:
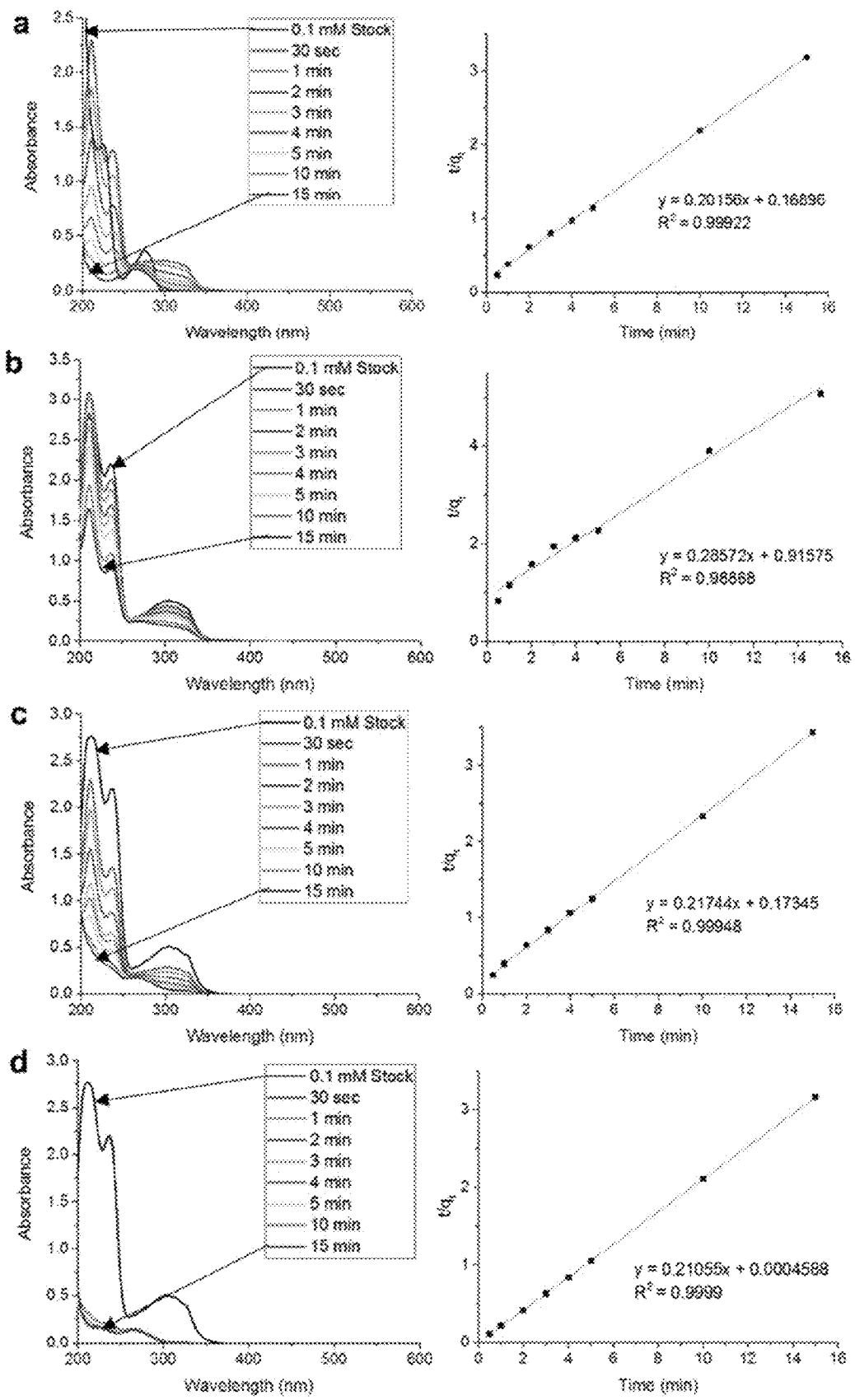
FIG. 35 shows characterization of the 1-naphthylamine uptake rate by each adsorbent. UV-vis spectra recorded at different contact times (colored traces; left column) and pseudo-second-order plots (right column) for AC (a), CalP2 (b), CalP3 (c), and CalP4 (d). t (in min) is the contact time of 1-naphthylamine solution with the adsorbent, and $q_t$ (in mg g-1) is the amount of pollutant adsorbed per gram of adsorbent at time t.
Figure 36:
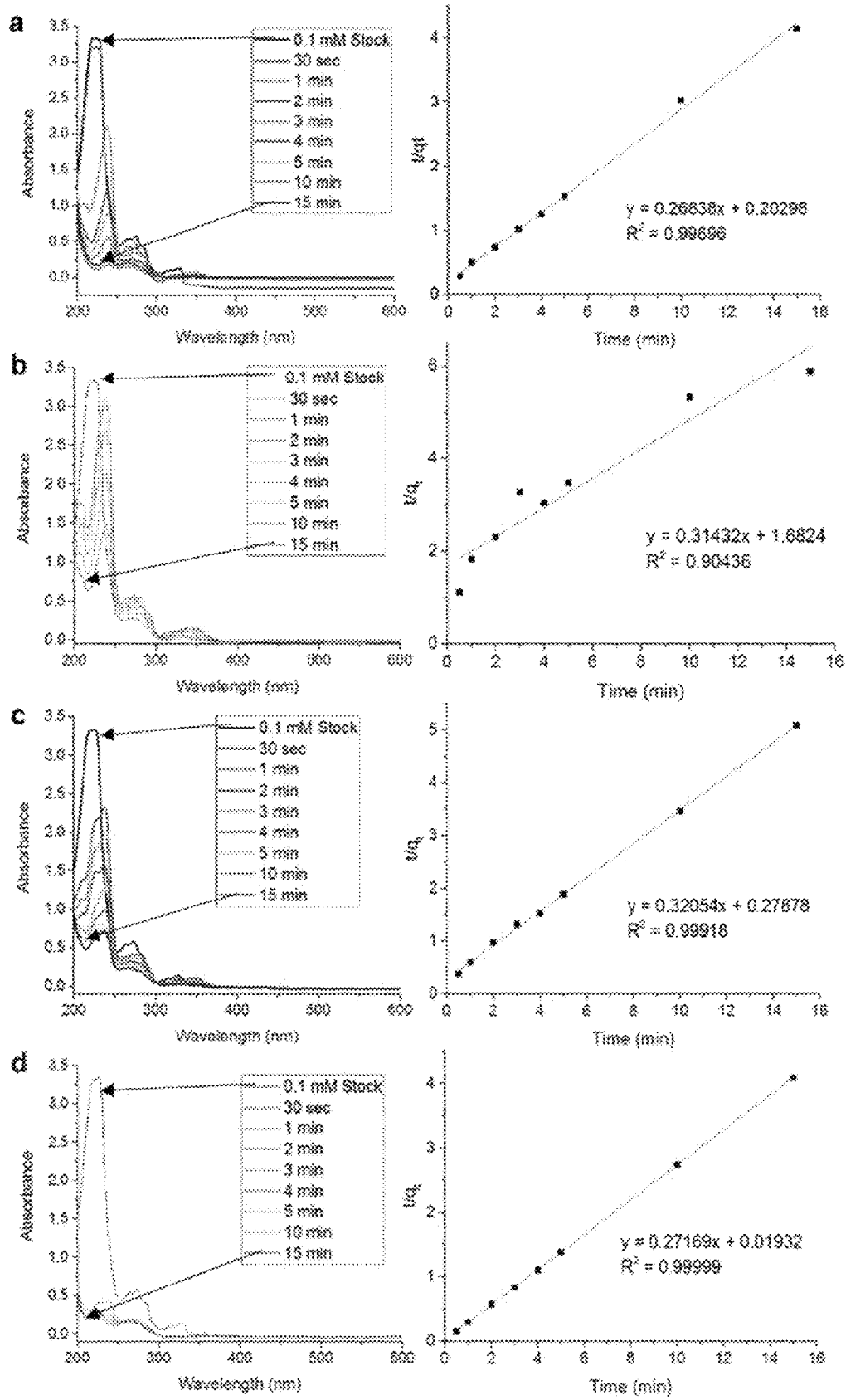
FIG. 36 shows characterization of the rate of 2-naphthol uptake by each adsorbent. UV-vis spectra recorded at different contact times (colored traces; left column) and pseudo-second-order plots (right column) for AC (a), CalP2 (b), CalP3 (c), and CalP4 (d). t (in min) is the contact time of 2-naphthol solution with the adsorbent, and $q_t$ (in mg g-1) is the amount of pollutant adsorbed per gram of adsorbent at time t.

The high stability, large surface area, permanent porosity, guest recognition backbone, presence of ion-dipole interaction site, and highly unsaturated π-bond-rich nature of the networks that afford unique electron-donating characteristics to the material, prompted us to use these polymers for the removal of four organic micropollutants from water. Chosen micropollutants are representative of different classes and are very relevant to pharmaceutical, pesticides, and plastic wastes by newly synthesized CalPn (n=2-4) polymers. To get a better perspective on the performance of our newly synthesized polymers, we compared the result with AC, a well-known commercial adsorbent. In the beginning we tested the removal of Bisphenol A, a toxic component of plastics that can cause serious health problems and found that each CalP polymer removed most of the pollutant from a solution (5 mg of adsorbent for 10 mL of 0.1 mM aqueous pollutant solution). Importantly, CalP4 removed Bisphenol A with the fastest rate than all other tested adsorbents with ~70% removal within 30 sec and reached equilibrium within 15 min with a removal efficiency of ~80% (FIGS. 19b and 20a). In contrast, CalP2 and CalP3 required 45 and 20 min, respectively to reach equilibrium and removed 7 and 16% of the pollutant in the first 30 sec of contact, respectively. The ultrafast efficiency of CalP4 over other adsorbents is possibly related to the high surface area (759 compared to 596 for CalP2 and 630 $m^2 g^{-1}$ for CalP3) and pi-bond rich network (for each structural units: 10 triple bonds and 20 phenyl rings for CalP4 compared to 6 or 8 triple bonds and 8 phenyl rings in case of CalP2 and CalP3) that endow hydrophobic interactions. The removal efficiency of CalP4 is better compared to AC (Norit® row 0.8 supra, ~25% removal in 30 sec and >60 min required to reach equilibrium) and similar to highly efficient cyclodextrin-based porous polymer P-CDP (~90% removal in 30 sec and 10 min to reach equilibrium). The batch-adsorption kinetic measurements resulted in a pseudo-second order rate constant ($k_{obs}$) of bisphenol A to CalP4 is 2.12 mg $g^{-1}$ $min^{-1}$, which is 33 times higher than that of CalP2 and 21 times higher than that of CalP3 (FIGS. 22 and 33). The performance is 16 times higher than AC and 1.4 times higher than the best performed material previously reported (P-CDP with $k_{obs}$=1.5 mg $g^{-1}$ $min^{-1}$). The adsorption isotherm fitted by the Langmuir model gives a formation constant (K) of 94 $M^{-1}$ (FIG. 20b). We assume that one of the phenolic group of bisphenol A forms inclusion complex with calixarene cavity. Also, the maximum adsorption capacity ($q_m$) at equilibrium was found to be 403 mg $g^{-1}$ for CalP4, corresponding to complete monolayer coverage (FIG. 20b). This capacity is significantly higher than those from numerous efficient adsorbent materials reported previously. The high capacity is presumably resulting from the binding of bisphenol A even outside of the calixarene cavity or through other interactions.

We observed similar high performance of CalP4 in removal of propranolol, a beta-blocker used to treat hypertension, which is not removed efficiently by wastewater treatment protocols. CalP4 removed ~82% of propranolol within 30 sec of contact and reached equilibrium in 20 min with a removal efficiency of ~91% (FIGS. 19b and 20a).

These values are much higher than those of CalP2 (~28% in 30 sec), CalP3 (~36% in 30 sec), and AC (~58% in 30 sec) under the same experimental conditions. The batch-adsorption kinetic measurements of pollutant removal shows that the rate of adsorption is the highest for CalP4 ($k_{obs}$=1.75 g $mg^{-1}$ $min^{-1}$) compared to all other tested polymers and AC (FIG. 23 and Table S2). The observed rate constant is 16 times more than AC and significantly higher than other reported polymers. Through Langmuir adsorption isotherm we found K of 13697 $M^{-1}$, (FIG. 20d). Therefore, we assume that napthalene group of the propranolol interacts with calixarene cavity to form a inclusion complex. Furthermore, these studies gives $q_m$ of 257 mg $g^{-1}$ for CalP4, which is much higher than any previously reported value.

The regeneration ability of CalP4 was achieved by washing the polymer with ethanol at room temperature after bisphenol A and proparnolol adsorption, which is more practical compared to the energy intensive regeneration process of AC's. After ethanol washing, the polymer could be re-used multiple times for pollutant-adsorption with no significant loss of its original efficiency (FIG. 20c). The generality of calixarane polymers ability to remove organic micropollutants was further assessed, preliminarily, by testing other pollutants with different physical properties. We evaluated the ability of CalPn (n=2 to 4) to remove the simple aromatic compounds including 1-naphthyl amine (1-NA), an azo dye precursor and known carcinogen, and 2-naphthol (2-NO), a model for various naphthol pollutants. Adsorption studies of these compounds were performed similarly to those for bisphenol A and propranolol (5 mg of polymer/10 mL of 0.1 mM pollutant solution). Each pollutant is rapidly removed by our calixarene-based polymers and the time-dependent adsorption curves show an excellent performance of CalP4 (~97% removal for 1-NA and ~68% removal for 2-NO in 30 sec) over other tested adsorbents (FIGS. 19c, 19d and 20a). The adsorption equilibrium was attained in 10 min for 1-NA whereas it took 45 min for 2-NO. The pseudo-second order rate constant ($k_{obs}$) of 1-NA and 2-NO to CalP4 are 9.66 and 3.82 $gmg^{-1}min^{-1}$, respectively (FIGS. 24, 25, 35, and 36). These values are 40 and 24 times higher compared to the performance of AC to 1-NA and 2-NO, respectively.

A series of calix[4]arene-based porous materials was described and their potential utility to remove various organic micropollutannts from water was tested. Among all, CalP4 contructed from pyrene tetraalkyne and tetrabromocalix[4]arene has performed extremely well and showed ultrafast adsorption kinetics and high adsorption efficiency. This performance is the best among the reported materials and we believe that the macrocycles of the polymer, as well as II-electron rich network, serve as effective sorption sites. Furthermore, the polymer can be easily regenerated upon treatment with ethanol at room temperature and reused many times, a very practical result considering the ease of the recovery process. The high efficiency and ease of implementation of the polymer as an adsorbent demonstrate the advantages of incorporating the calixarene moiety within a functional material and bode well for the development of calixarene-based materials for water purification and other applications.

Methods:

General. All chemicals and solvents were purchased from Sigma-Aldrich and used without further purification. Deionized water was used from Millipore Gradient Milli-Q water purification system. Thin-layer chromatography (TLC) was performed on silica gel 60 F254 (E. Merck). The plates were inspected with UV light. Column chromatography was performed on silica gel 60F (Merck 9385, 0.040-0.063 mm). Routine nuclear magnetic resonance (NMR) spectra were recorded at 25° C. on a Bruker Avance spectrometer, with working frequencies of 500 MHz for $^1H$, and 125.7 MHz for $^{13}C$ nuclei, respectively. All chemical shifts are reported in ppm relative to the signals corresponding to the residual non-deuterated solvent (DMSO-$d_6$: δ=2.50 ppm). Norit RO 0.8 activated carbon (AC) was purchased from Sigma Aldrich.

Materials characterization and instrumentation. FTIR studies were carried out on Agilent 670-IR spectrometer. TGA experiments were performed on a TA SDT Q600. SEM images were obtained from FEI Quanta 450FEG. TEM images were obtained from a FEI-Titan 300. Solid-state cross-polarization magic angle spinning (CP/MAS) $^{13}C$ NMR spectra of the polymers were recorded on a Bruker Avance 500 Wide Bore (500 MHz) NMR spectrometer at ambient temperature with a magic angle spinning rate of 18.0 kHz. Solid-state magic angle spinning $^7Li$-MAS NMR spectra of the polymers were recorded on a Bruker Avance-I (300 MHz) NMR spectrometer at resonance frequency 107.7 MHz. We used a MAS double resonance probe designed for 4 mm o.d. zirconia spinners, and all the sample were spun at 10 kHz, at room temperature. The powder X-ray diffraction (PXRD) patterns of the samples were collected using an X-ray Panalytical Empyrean diffractometer. UV-Vis studies were carried out on Cary 5000 UV-Vis-NIR spectrophotometer. All UV-Vis spectra were recorded at room temperature using a quartz cell with 10 mm or 1 mm path length over the range 200-800 nm and corrected against an appropriate background spectrum. Surface area measurements were conducted on a Micromeritics 3Flex gas sorption analyzer. Samples (50-150 mg) were degassed at 85° C. for 24 h and then backfilled with $N_2$. Adsorption isotherms were generated by incremental exposure to ultrahigh-purity nitrogen up to 1 atm in a liquid nitrogen bath, and surface parameters were determined using BET adsorption models included in the instrument software (Micromeritics ASAP 2020 V4.00). Pollutant removal experiments were performed at 25° C., solution were solicited (30 sec to mins) right after the addition of adsorbents.

Synthesis of 5,11,17,23-Tetrabromo-25,26,27,28-tetrahydroxycalix[4]arene (1)

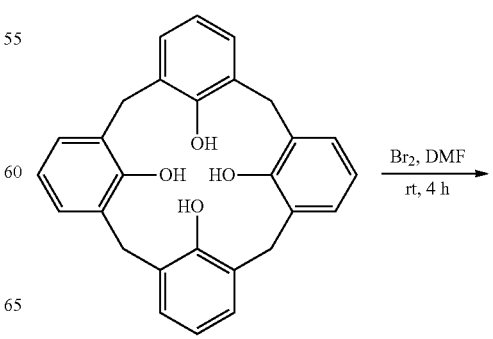

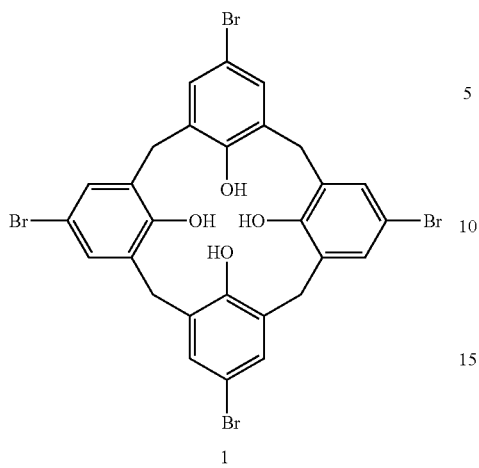

Bromine (0.4 mL, 7.84 mol) in DMF (5 mL) was added dropwise with stirring to a solution of calix[4]arene (0.5 g, 1.18 mmol) in DMF (20 mL). The solution was stirred for 4 h. A precipitate began to form after about 0.5 h. After the 4 h of reaction, methanol (20 mL) was added, and the mixture was left to stir for an additional 0.5 h. The precipitate was filtered off and washed with methanol to yield the brominated product, 1 (0.75 g, 87%) as a white solid. $^1$H NMR ([D6]DMSO, 25° C., 500 MHz): δ=7.34 (s, 8H), 3.81 ppm (br s, 8H). $^{13}$C NMR ([D6]DMSO, 25° C., 125.7 MHz): δ$_c$=151.8, 131.98, 131.08, 110.89, 30.94.

Synthesis of Tetra-Alkyne Linker

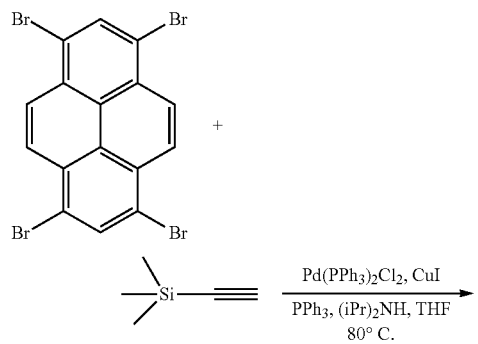

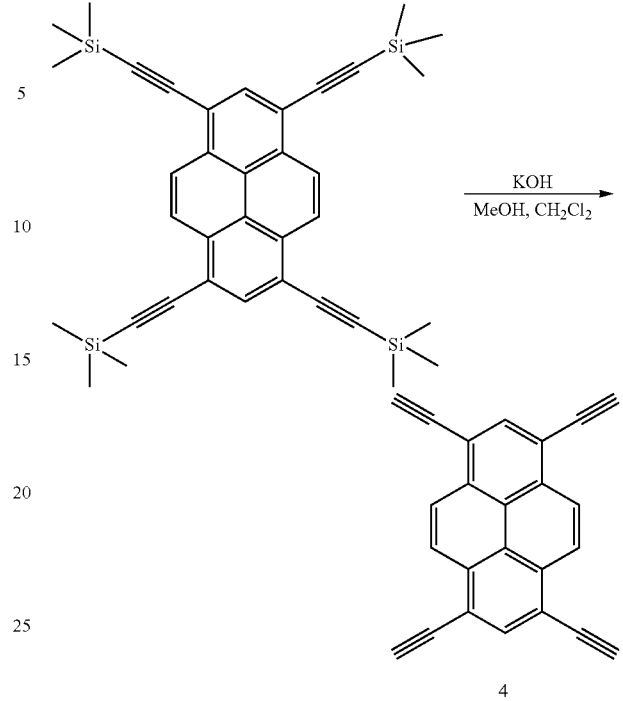

1,3,6,8-Tetrakis(trimethylsilylethynyl)pyrene. Compound 1,3,6,8-Tetrabromopyrene (1.0 g, 1.93 mmol), [PdCl$_2$(PPh$_3$)$_2$] (67 mg, 0.096 mmol), CuI (18 mg, 0.096 mmol), PPh$_3$ (50 mg, 0.193 mmol), and the trimethylsilylacetylene (11.6 mmol) were added to a degassed solution of diisopropylamine (20 mL) and THF (20 mL) under argon. The resulting mixture was stirred at 70° C. for 48 h. The reaction mixture was then cooled to room temperature and solvent was removed to give the crude reaction mixture. Column chromatographic purification of the crude product on silica gel with hexane as the eluent yielded a red orange solid (0.72 g, 66%). $^1$H NMR (CDCl$_3$, 25° C., 500 MHz): δ=8.51 (s, 4H), 8.26 (s, 2H), 0.37 (s, 36H) ppm. $^{13}$C NMR (CDCl$_3$, 25° C., 125.7 MHz): δ=134.5, 131.9, 126.8, 123.4, 118.5, 102.8, 101.3, 0.1 ppm.

1,3,6,8-Tetraethynylpyrene (4). To remove the silyl-protection groups, the filtrate was dissolved in ethanol (500 mL) in the presence of KOH (5 g), and stirred overnight. Two-thirds of solvent was removed by evaporation, and gradual addition of water gave a pale brownish precipitate that was extracted using methylene chloride several times. Removal of the solvent gave the product 1 $^1$H NMR ([D8]THF, 25° C., 500 MHz): δ=8.68 (s, 4H), 8.34 (s, 2H), 4.28 (s, 4H) ppm. $^{13}$C NMR ([D8]THF, 25° C., 125.7 MHz): δ=135.7, 132.6, 127.3, 123.5, 119.1, 86.3, 81.9 ppm.

General Procedure for the Synthesis of Polymer.

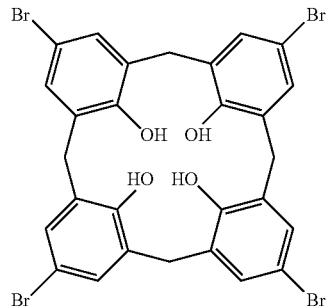

-continued

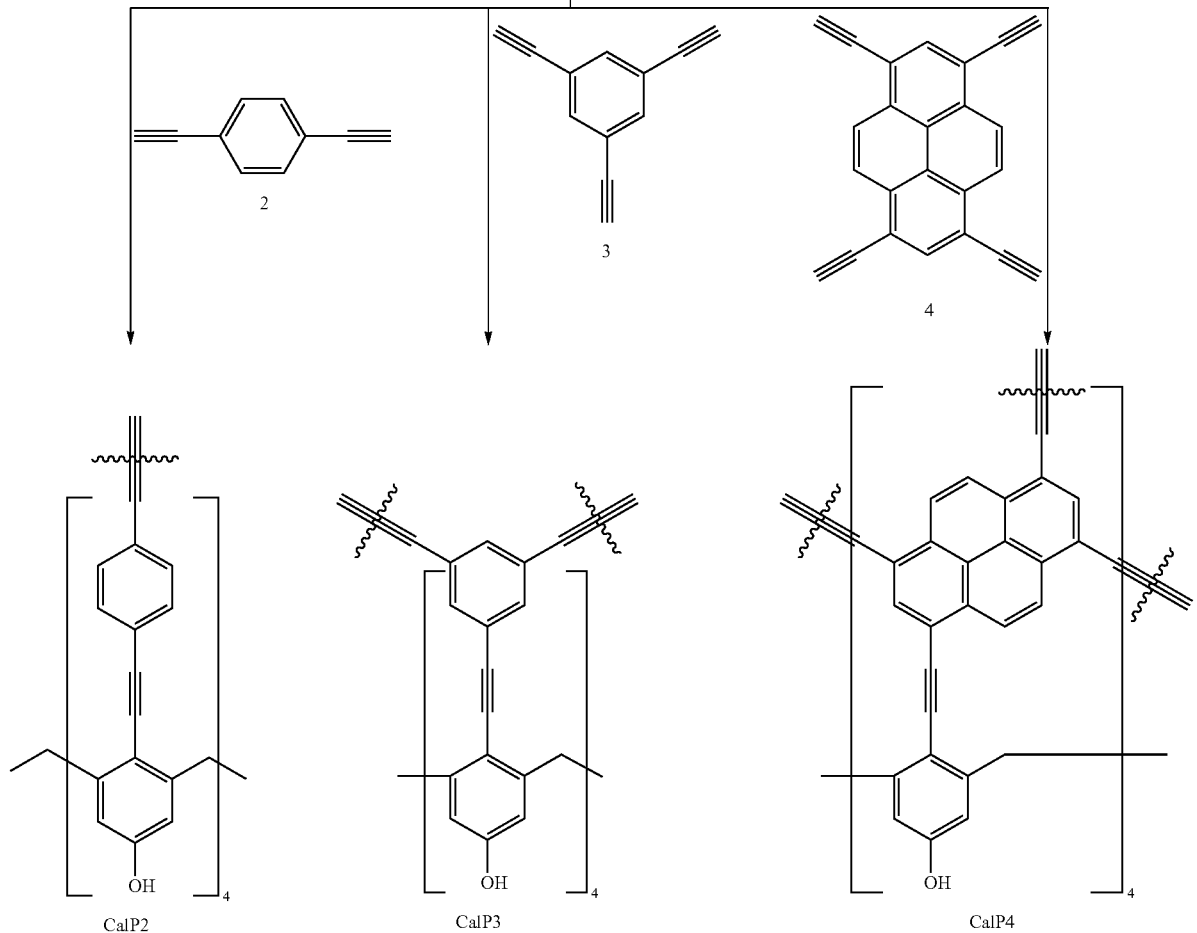

A solution of 5,11,17,23-Tetrabromo-25,26,27,28-tetrahydroxycalix[4]arene, bis(triphenylphosphine)palladium(II) chloride, and copper(I) iodide in anhydrous tetrahydrofuran were placed in a 250 mL two-neck round-bottom flask equipped with a condenser. Diisopropylamine and alkyne linkers were loaded into a separate 50 mL flask. Both solutions were purged with argon for at least 15 min. The ethylnyl-compound solution was then added dropwise over 5 min to the calixarene solution with stirring to afford a dark brown reaction mixture after 5 min. The reaction was heated at 65° C. under argon for 60 h. After cooling to room temperature, the solid product was centrifuged and washed with excess (cold and hot) tetrahydrofuran, dimethyl acetamide, chloroform, ethanol, and (cold and hot) water to remove any unreacted monomers and metal catalyst residues. The final products were dried under a vacuum for 16 h at 60° C.

CalP2: 5,11,17,23-Tetrabromo-25,26,27,28-tetrahydroxycalix[4]arene (1.0 g, 1.36 mmol), 1,4 diethynylbenzene (0.34 g, 3.72 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (100 mL).

CalP3: 5,11,17,23-Tetrabromo-25,26,27,28-tetrahydroxycalix[4]arene (1.0 g, 1.36 mmol), 1,3,5-triethynylbenzene (0.275 g, 1.8 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (100 mL).

CalP4: 5,11,17,23-Tetrabromo-25,26,27,28-tetrahydroxycalix[4]arene (1.0 g, 1.36 mmol), 1,3,6,8-Tetraethynylpyrene (0.405 g, 1.36 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (160 mL).

Micropollutants batch adsorption kinetic studies. Adsorption kinetic studies were performed in 30 ml scintillation vials under sonication condition. The polymers (0.5 mg/l mL of pollutant solution) were transferred to a 20 ml scintillation vial containing pollutant stock solution (20 ml). The mixture was immediately sonicated and 2 ml aliquots of the suspension were taken at certain intervals via syringe and filtered immediately by a PTFE (Hydrophilic) Syringe filter (0.2 μm). The residual concentration of the pollutant in each sample was determined by UV-vis spectroscopy, based on calibration with their measured molar extinction coefficients (ε in units of $M^{-1}$ $cm^{-1}$), which were determined for bisphenol A (3,691 at $\lambda_{max}$=276 nm), 2-naphthol (5794 at $\lambda_{max}$=273 nm), 1-naphthyl amine (5,014 at $\lambda_{max}$=305 nm), and propranolol hydrochloride (5,106 at $\lambda_{max}$=290 nm).

The efficiency of pollutant removal (in %) by the sorbent was determined by the following equation:

Pollutant removal efficiency=$[(C_0-C_t)/C_0] \times 100$ where $C_0$ (mmol l$^{-1}$) and $C_t$ (mmol l$^{-1}$) are the initial and residual concentration of pollutant in the stock solution and filtrate, respectively.

The amount of pollutant bound to the sorbent was determined by the following equation:

$q_t=[(C_0-C_t)M_w]/m$ where $q_t$ (mg g$^{-1}$) is amount of pollutant adsorbed per g of sorbent at time t (min). $C_0$ (mmol l$^{-1}$) and $C_t$ (mmol l$^{-1}$) are the initial and residual concentration of pollutant in the stock solution and filtrate, respectively. m (g) is the mass of sorbent used in the study, and $M_w$ (g mol$^{-1}$) is the molar mass of the pollutant.

The uptake rate of each adsorbent was best described by Ho and McKay's pseudo-second-order adsorption model, shown in the following equation in a common linearized form:

$t/q_t=t/q_e+1/(k_{obs}q_e^2)$ where $q_t$ and $q_e$ are the adsorbate uptakes (mg adsorbate per g polymer) at time t (min) and at equilibrium, respectively, and $k_{obs}$ is an apparent second-order rate constant (g mg$^{-1}$ min$^{-1}$).

Thermodynamic studies of adsorption for CalP4. The adsorbent (CalP4, 2.5 mg) was transferred to a 20 ml vial containing 5 ml of pollutant stock solution (concentration ranging from 0.3 mM to 1 mM) was added, and the suspension was sonicated to reach equilibrium (15 min for bisphenol A and 20 min for propranolol). The suspension was then filtered on a PTFE (Hydrophilic) Syringe filter (0.2 μm), and the filtrate was measured by UV-vis spectroscopy. A Langmuir adsorption isotherm was generated by plotting $1/q_e$ versus $1/c$ in the following equation:

$1/q_e=1/q_{max,e}+1/q_{max,e}Kc$ where $q_e$ (mg g$^{-1}$) is the amount of pollutant adsorbed at equilibrium, $q_{max,e}$ (mg g$^{-1}$) is the maximum adsorption capacity of adsorbent at equilibrium, c (mol l$^{-1}$) is the residual pollutant concentration at equilibrium, and K (mol$^{-1}$) is the equilibrium constant.

CalP4 regeneration experiments. 10 mg polymer was then transferred to a 20 ml scintillation vial containing bisphenol A or propranolol stock solution (20 ml, 0.1 mM) was added. The mixture was sonicated at RT (15 min for bisphenol A and 20 min for propranolol) and centrifuged for 15 min (4000 rpm). The residual pollutant concentration in the filtrate was measured by UV-vis. CalP4 was regenerated by soaking in EtOH (10 ml×2) for 6 h and centrifuged to solid adsorbent. After drying the solid, adsorption/desorption cycle was performed 2 times. The ethanol washing filtrate was concentrated under vacuum, and re-dissolved in water to measure UV-vis spectra and in turn to determine the amount of recovered pollutants.

Example 3

This example provides a description of preparation, characterization and use of porous polymeric materials of the present disclosure.

A series of porous π-electron rich polymers containing calix[4]arene were synthesized by palladium catalyzed Sonogashira-Hagihara crosscoupling reactions of tetrabromocalix[4]arene and several alkyne-modified aryl linkers. The calixarenes of the polymers were lithiated at their lower rims to form charged polymeric networks. Both neutral and charged networks exhibited high affinities for solution and vapor phase iodine owing to the presence of a combination of non-polar and polar sorption sites. Lithiation of the polymers enhanced iodine uptake rate and capacity. The lithiated polymer CalP4-Li exhibited one of the highest iodine uptake capacities (312% w/w) ever measured in just 30 min. All polymers were easily regenerated by mild ethanol washings and could be reused with negligible loss of efficiency. Polymeric networks such as these may be useful for the sequestration of radioactive iodine.

Figure 39:
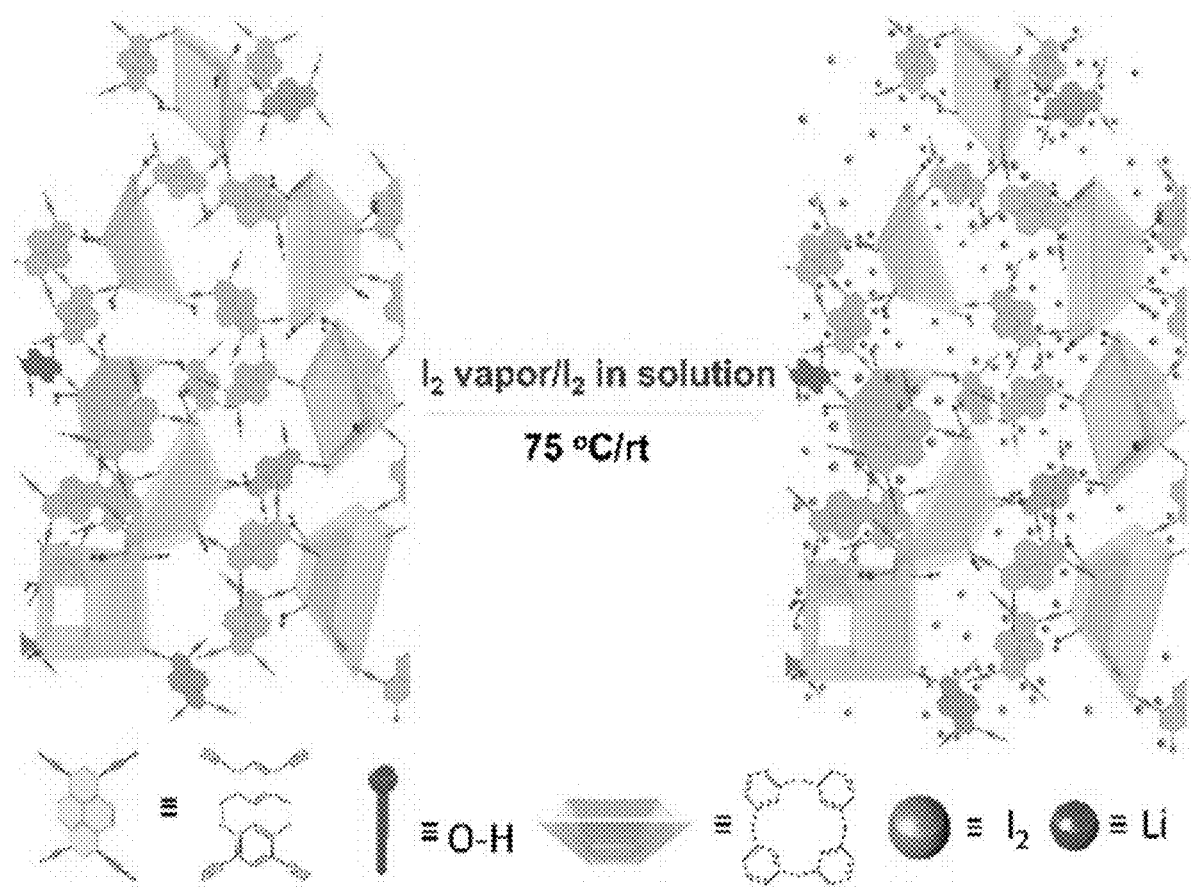
FIG. 39 shows a Li trap for $I_2$: A series of π-bond rich porous polymers were synthesized and lithiated to obtain the charged networks, which show ultrafast and ultrahigh affinity for iodine.

In this example, a series of hyper-crosslinked π-bond-rich porous covalent polycalix[4]arenes, CalP2, CalP3 and CalP4, for I$_2$ adsorption were designed (FIG. 39). We enriched the polymers with arenes and alkynes. Furthermore, we synthesized the corresponding series of lithiated polymers: CalP2-Li, CalP3-Li and CalP4-Li. We found that both types of polymer CalPn and CalPn-Li (n=2-4) performed well as I$_2$ adsorbents.

Figure 41:
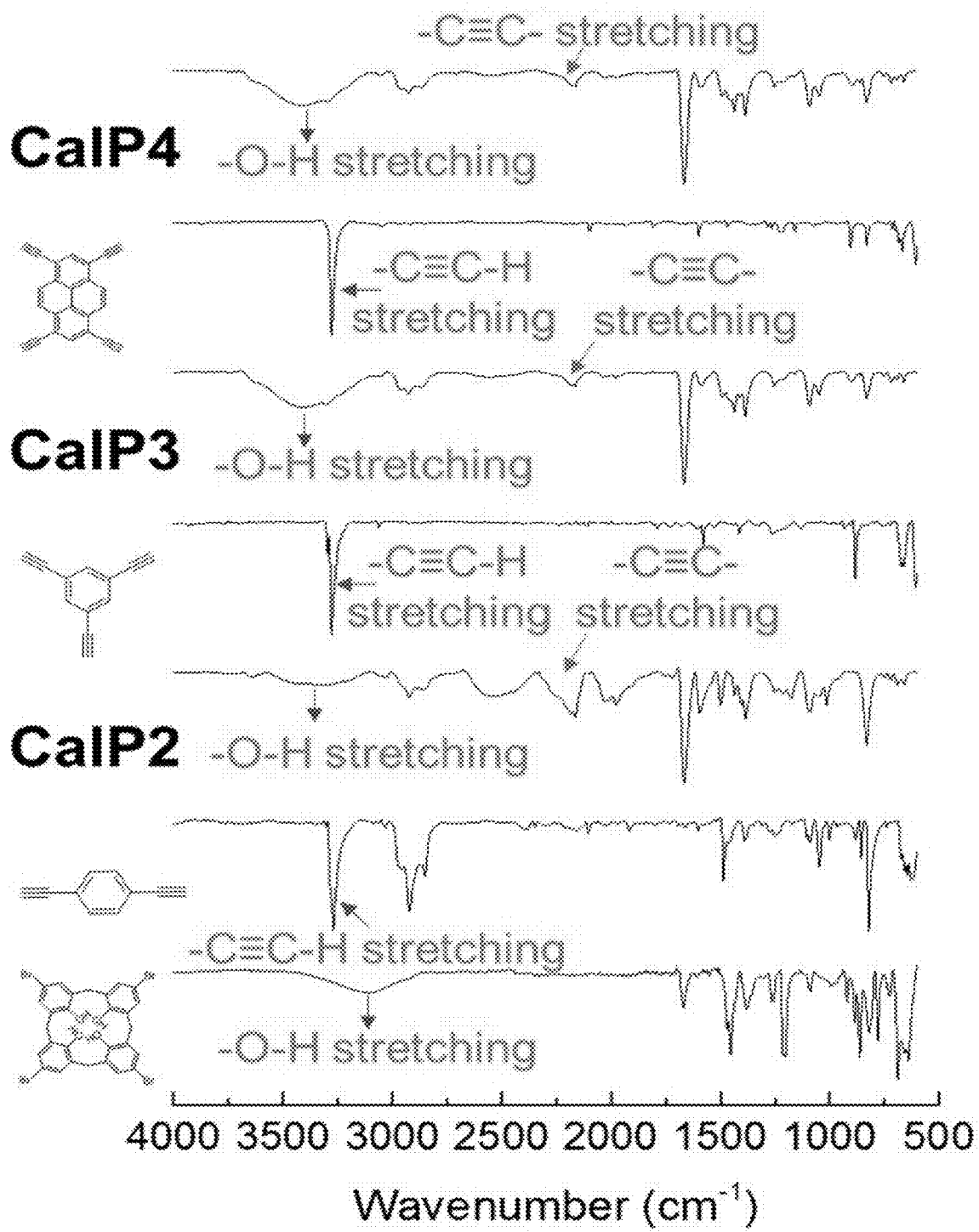
FIG. 41 shows FTIR spectra of CalP2, CalP3, CalP4, and corresponding monomers.

Polymer syntheses were accomplished (Scheme 1) by palladium catalysed Sonogashira-Hagihara cross-coupling of 1 with three acetylene linkers (2, 3 and 4). Polymerizations were carried-out in dry THF at 65° C. for 60 h. Products were centrifuged and washed multiple times. All products were completely insoluble in all organic solvents tested, including THF, acetone, CHCl$_3$, DMF and DMA, indicating the formation of covalently crosslinked structures. FTIR spectra (FIG. 41) of the polymers do not exhibit the terminal alkyne —C—H stretching absorption bands near 3300 cm$^{-1}$ that are present in the spectra of the acetylene monomers, nor do they have near 650 cm$^{-1}$ the C—Br stretching absorption bands typical of bromocalix[4]arene. The absence of both types of bands provides evidence for successful cross-coupling. Importantly, the spectra of the final products exhibit a peak near 2250 cm$^{-1}$ and a broad peak near 3320 cm$^{-1}$, which correspond to alkyne —C≡C— stretching vibrations and calix[4]arene —O—H stretching vibrations, respectively. These bands indicate the incorporation of alkynes and macrocycles within the polymeric networks.

Scheme 1. Synthetic routes to the polycalix[4]arene networks CalPn and their lithiated analogues, CalPn-Li.
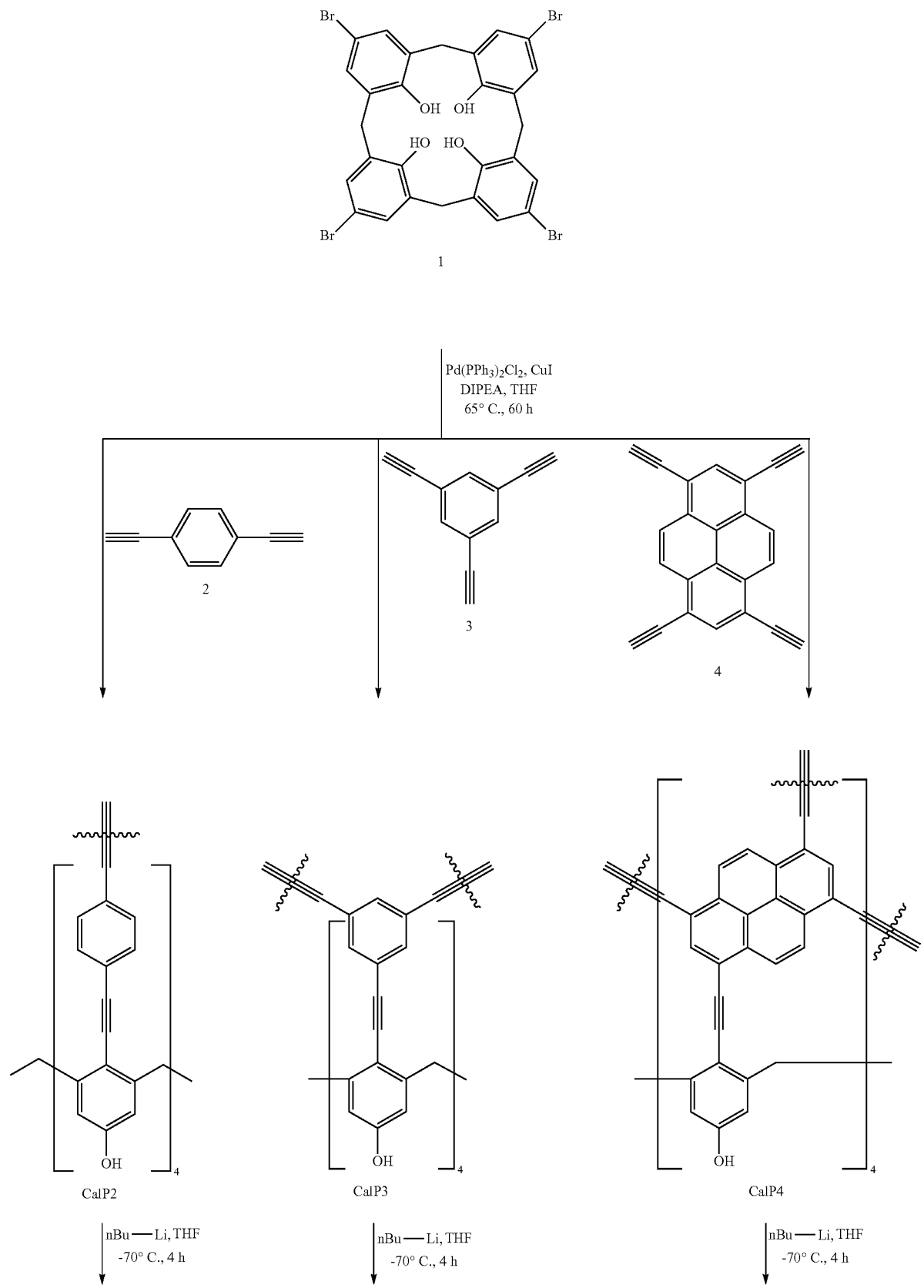

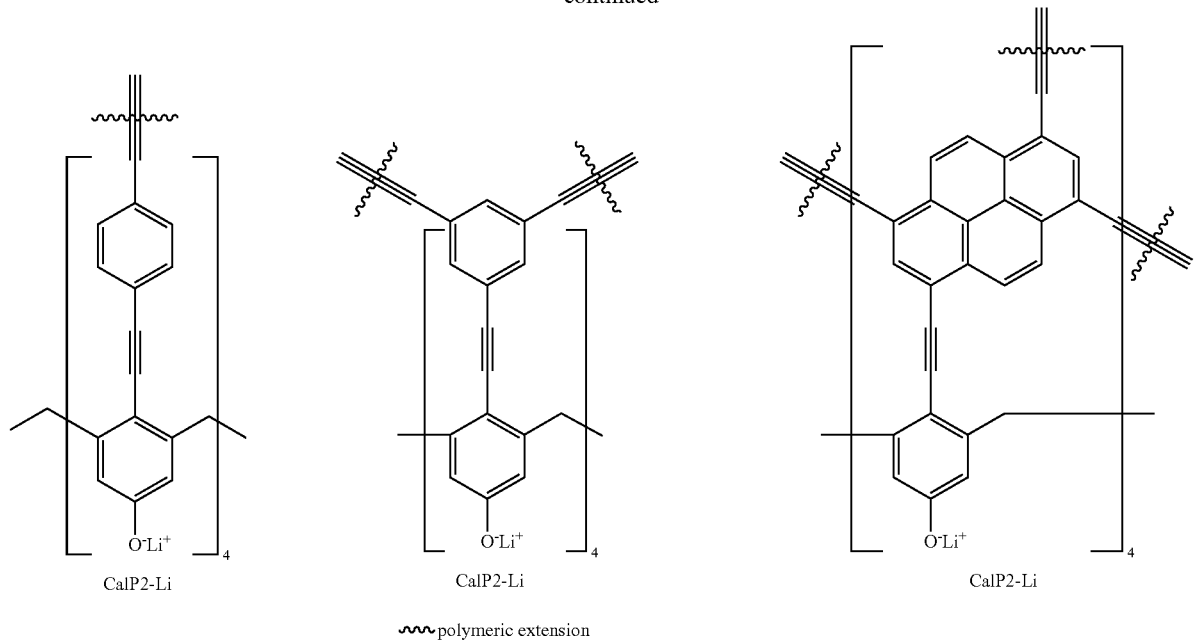

CalP2-Li    CalP2-Li    CalP2-Li

∿∿ polymeric extension

Figure 37:
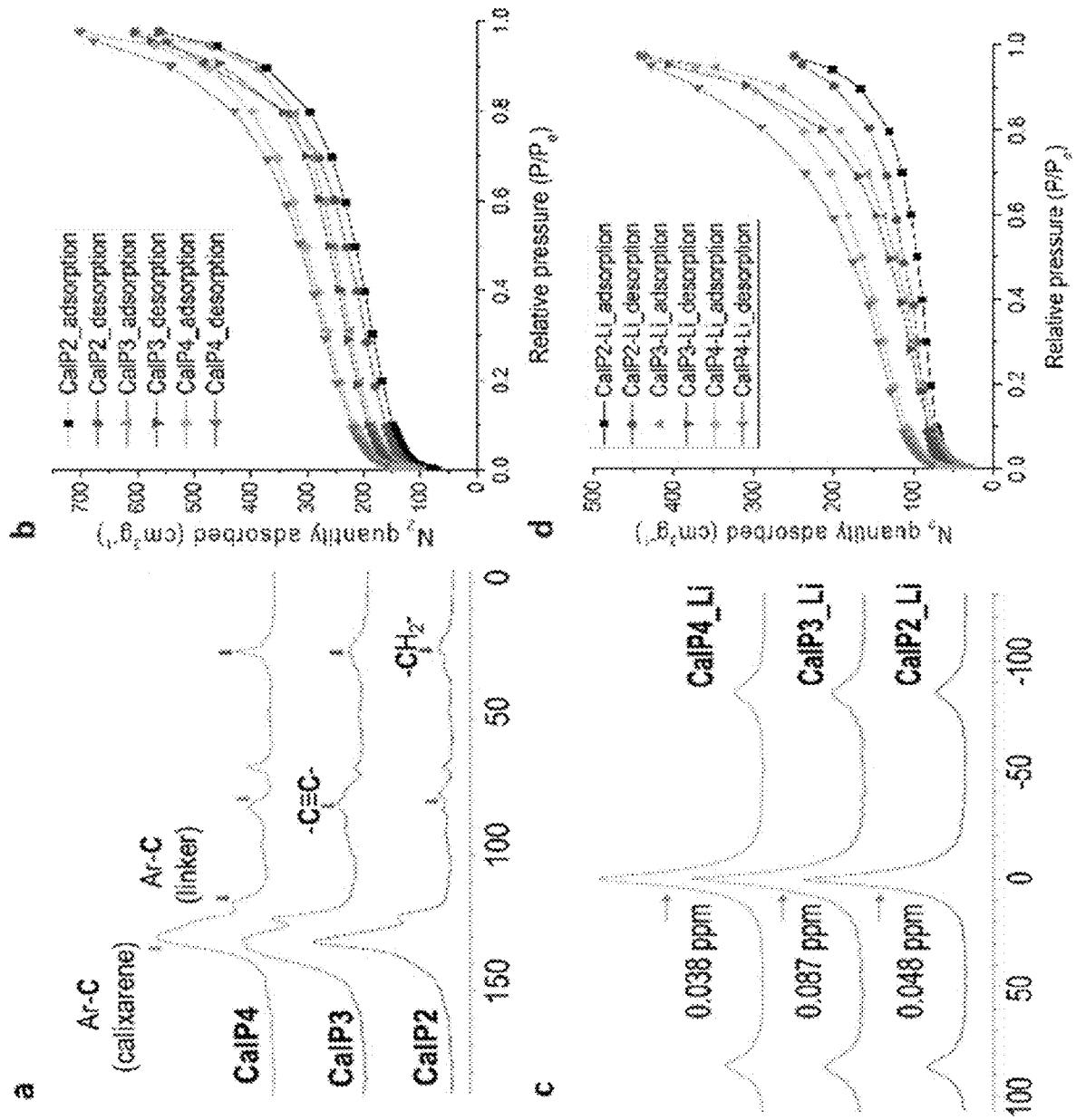
FIG. 37 shows a) $^{13}$C CP/MAS NMR spectra of CalP2, CalP3, and CalP4 with corresponding peak assignments. b) $N_2$ uptake isotherms at 197 K; calculated surface areas=596 m$^2$ g$^{-1}$ for CalP2, 630 m$^2$ g$^{-1}$ for CalP3, and 759 m$^2$ g$^{-1}$ for CalP4. c) Solid-state $^7$Li MAS NMR spectra of lithiated polymers. d) $N_2$ uptake isotherms at 197 K for lithiated polymers; calculated surface area=274 m$^2$ g$^{-1}$ for CalP2-Li, 308 m$^2$ g$^{-1}$ for CalP3-Li, and 445 m$^2$ g$^{-1}$ for CalP4-Li.

The networks were further characterized by solid-state cross-polarization magic angle spinning (CP/MAS)$^{13}$C NMR spectroscopy (FIG. 37*a*). The signals with chemical shift values in the range of 135-160 ppm correspond to the aromatic carbons of the phenylene groups of the macrocycles whereas peaks near 130 ppm correspond to the phenylene carbons of the linkers. The broad peak near 25 ppm is associatated with the methylene carbons (—CH$_2$—) of the calix[4]arenes. The acetylene resonances (—C≡C—) appear near 90 ppm. The FTIR and CP/MAS $^{13}$C NMR spectra are also consistent with the formation of covalently crosslinked polymers.

Figure 42:
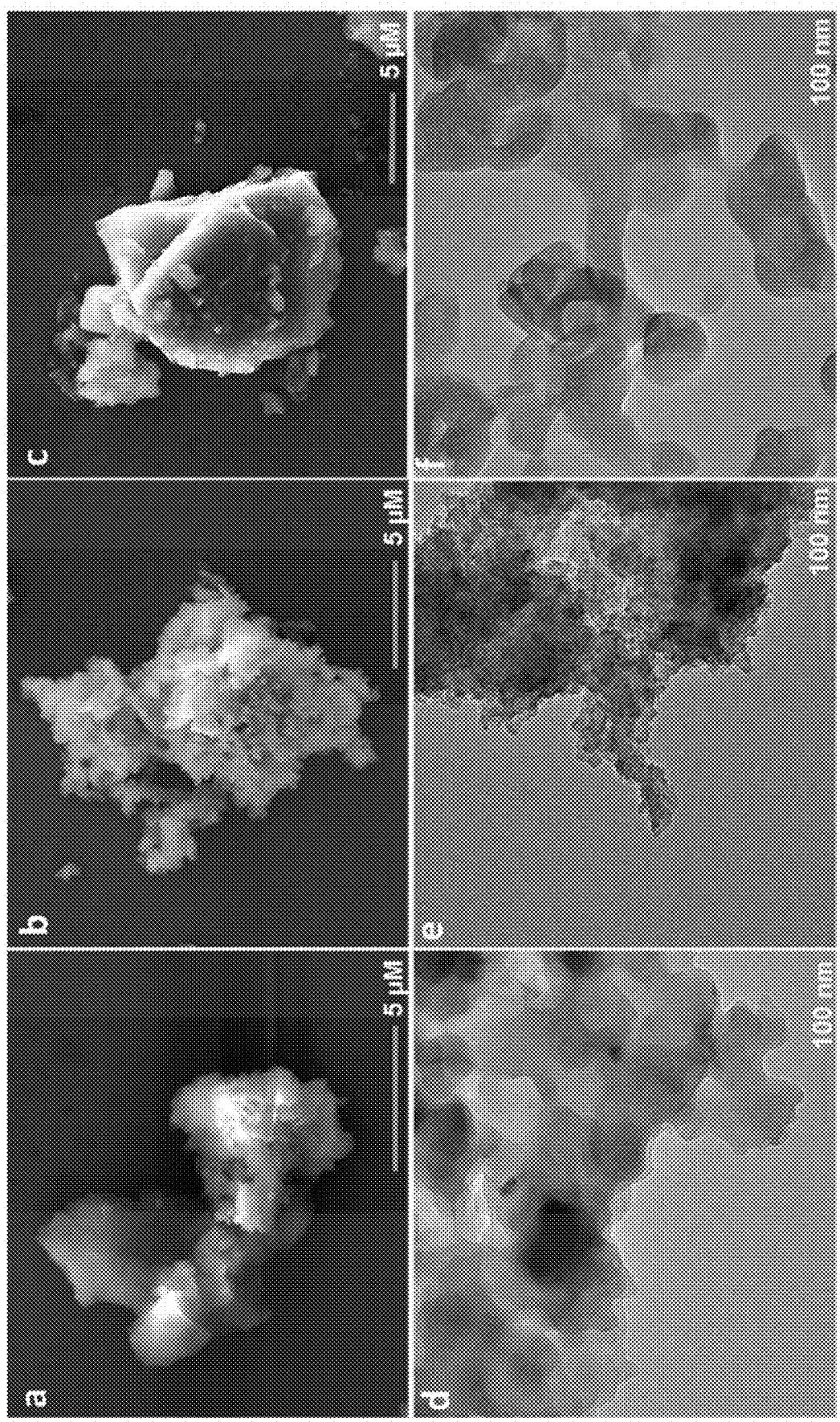
FIG. 42 shows low-magnification SEM images of CalP2 (a), CalP3 (b), and CalP4 (c); scale bar=5 μm. High-resolution TEM images of CalP2 (d), CalP3 (e), and CalP4 (f) that hints at the presence of pores in the polymers; scale bar=100 nm.
Figure 43:
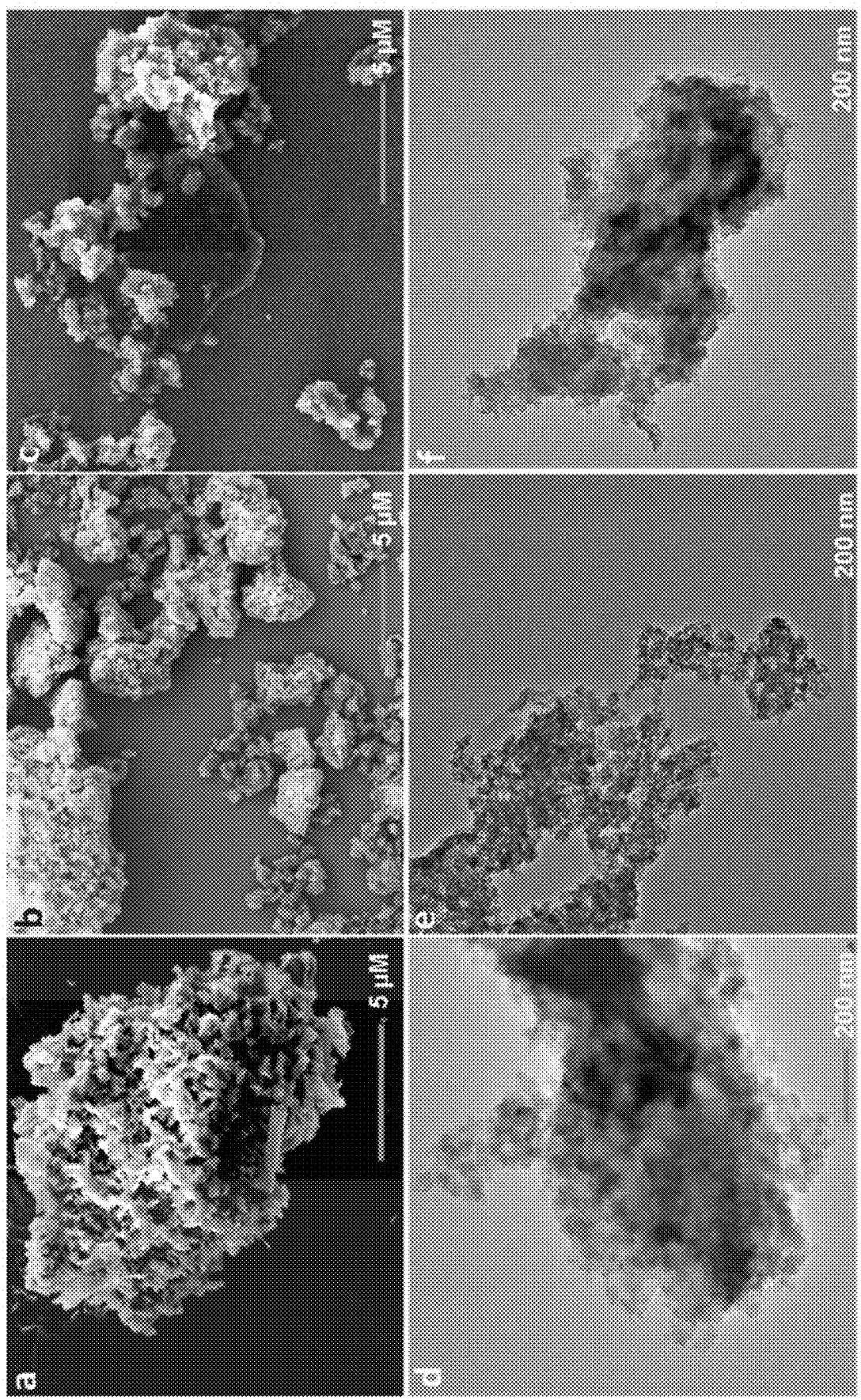
FIG. 43 shows low-magnification SEM images of CalP2-Li (a), CalP3-Li (b), and CalP4-Li (c); scale bar=5 μm. High-resolution TEM images of CalP2-Li (d), CalP3-Li (e), and CalP4-Li (f) that hints the presence of pores in the polymers; scale bar=200 nm.
Figure 44:
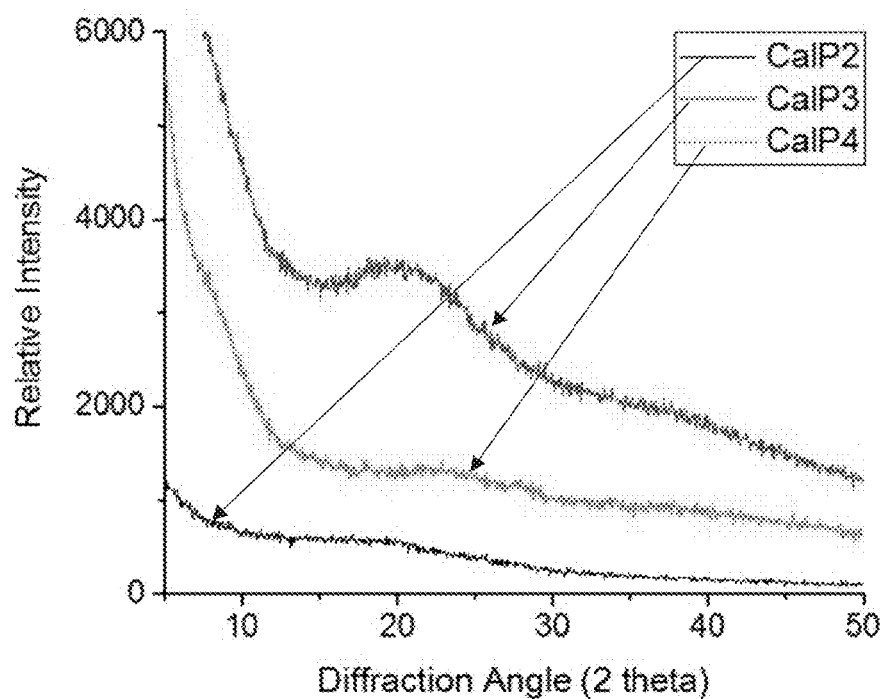
FIG. 44 shows a powder X-ray diffraction (PXRD) pattern of CalP2 (black), CalP3 (red), and CalP4 (green).
Figure 45:
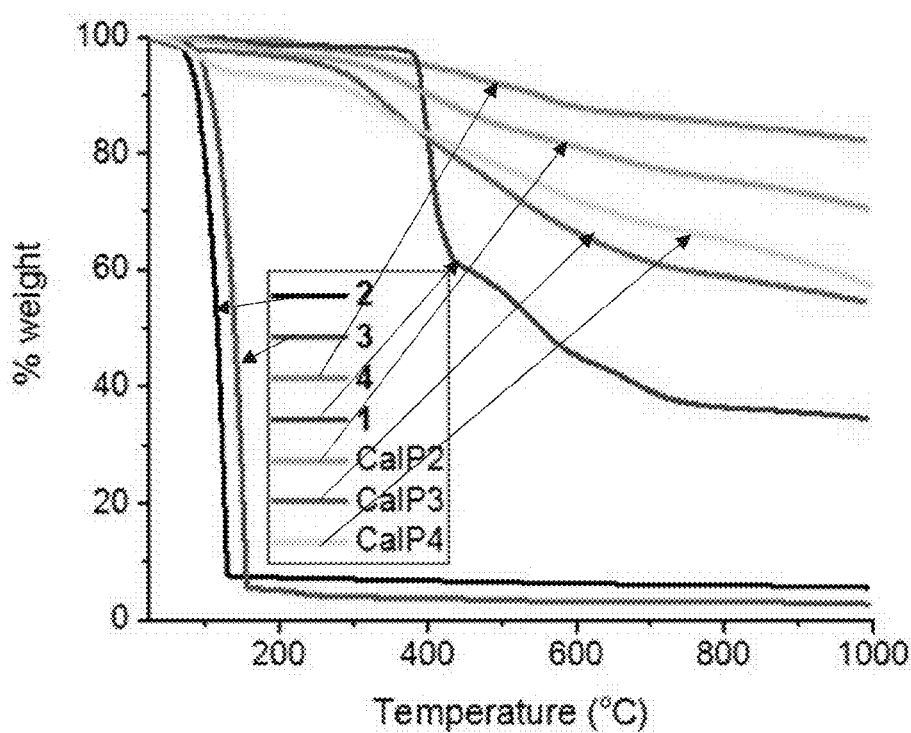
FIG. 45 shows TGA plots for CalP2 (green), CalP3 (pink), CalP4 (yellow), 1,4-diethynlebenzene (2, black), 1, 3, 5-triethynylbenzene (3, red), 1,3,6,8-Tetraethynylpyrene (4, green) and tetrabromocalix[4]arene (1, blue).

The bulk morphology of the polymers was characterized by scanning electron microscopy (SEM) and transmission electron microscopy (TEM). Both SEM and TEM images show fused amorphous clumps (FIG. 42); however, TEM images hint at the presence of pores. The powder X-ray diffraction (PXRD) patterns of the polymers (FIG. 44) show broad signals consistent with amorphous structure, and thermogravimetric analysis (TGA) indicates excellent thermal stability over 500° C. (FIG. 45).

Figure 46:
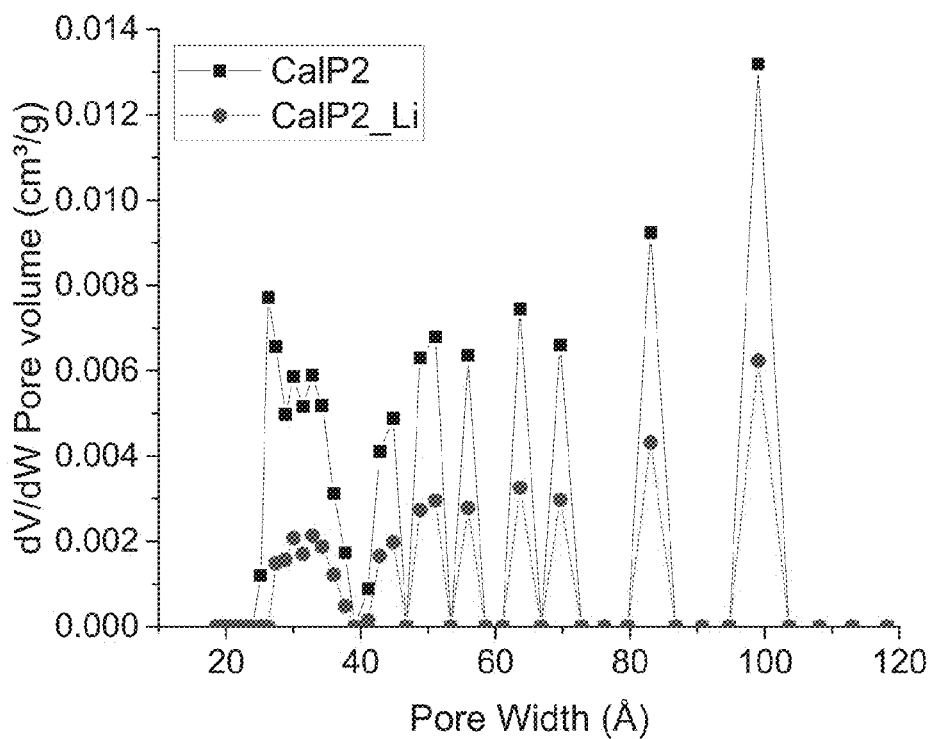
FIG. 46 shows NLDFT pore size distribution for CalP2 and CalP2-Li determined from $N_2$ adsorption/desorption isotherms.
Figure 47:
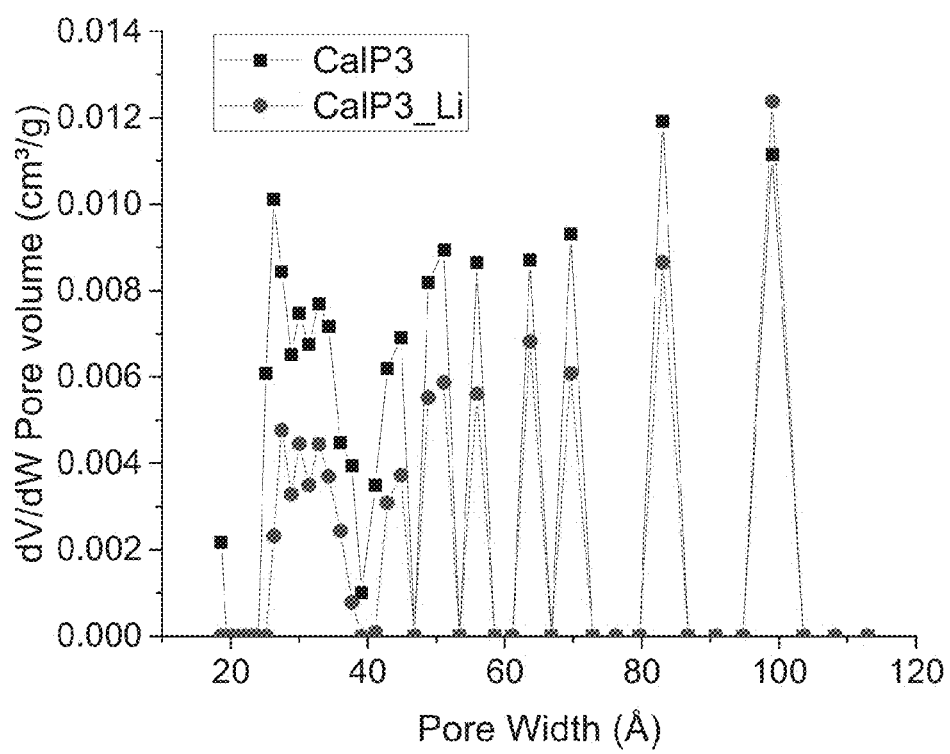
FIG. 47 shows NLDFT pore size distribution for CalP3 and CalP3-Li determined from $N_2$ adsorption/desorption isotherms.
Figure 48:
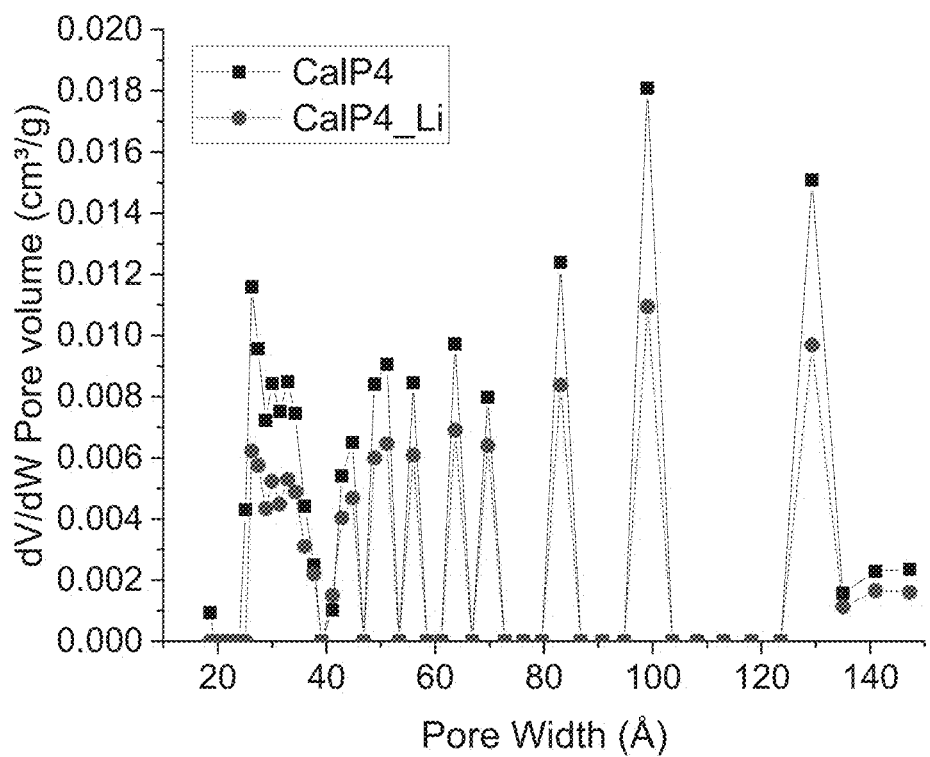
FIG. 48 shows NLDFT pore size distribution for CalP3 and CalP3-Li determined from $N_2$ adsorption/desorption isotherms.

The porosity of the polymers was characterized by N$_2$ gas adsorption/desorption measurements. The polymers were activated at 358 K for 24 h prior to the measurements to remove solvent and trapped gas molecules. Based on the IUPAC classification system, the observed N$_2$ sorption isotherms (FIG. 37*b*) can be categorized as type II with H$_4$ type hysteresis loops corresponding to desorption. These data suggest a complex polymeric network that contains both micropores and mesopores and that swells with gas intake. The polymers have a pore size distribution mainly in the mesopore region, NLDFT average pore diameter in the range of 62-97 Å and a cumulative pore volume in the range of 0.56-1.09 cm$^3$ g$^{-1}$ (FIG. 46-48). Calculation using the Brunauer-Emmett-Teller (BET) model gives specific surface areas of 596, 630, and 759 m$^2$g$^{-1}$ for CalP2, CalP3, and CalP4, respectively, with increased surface area corresponding to a greater number of acetylene units in the linker molecule.

Figure 49:
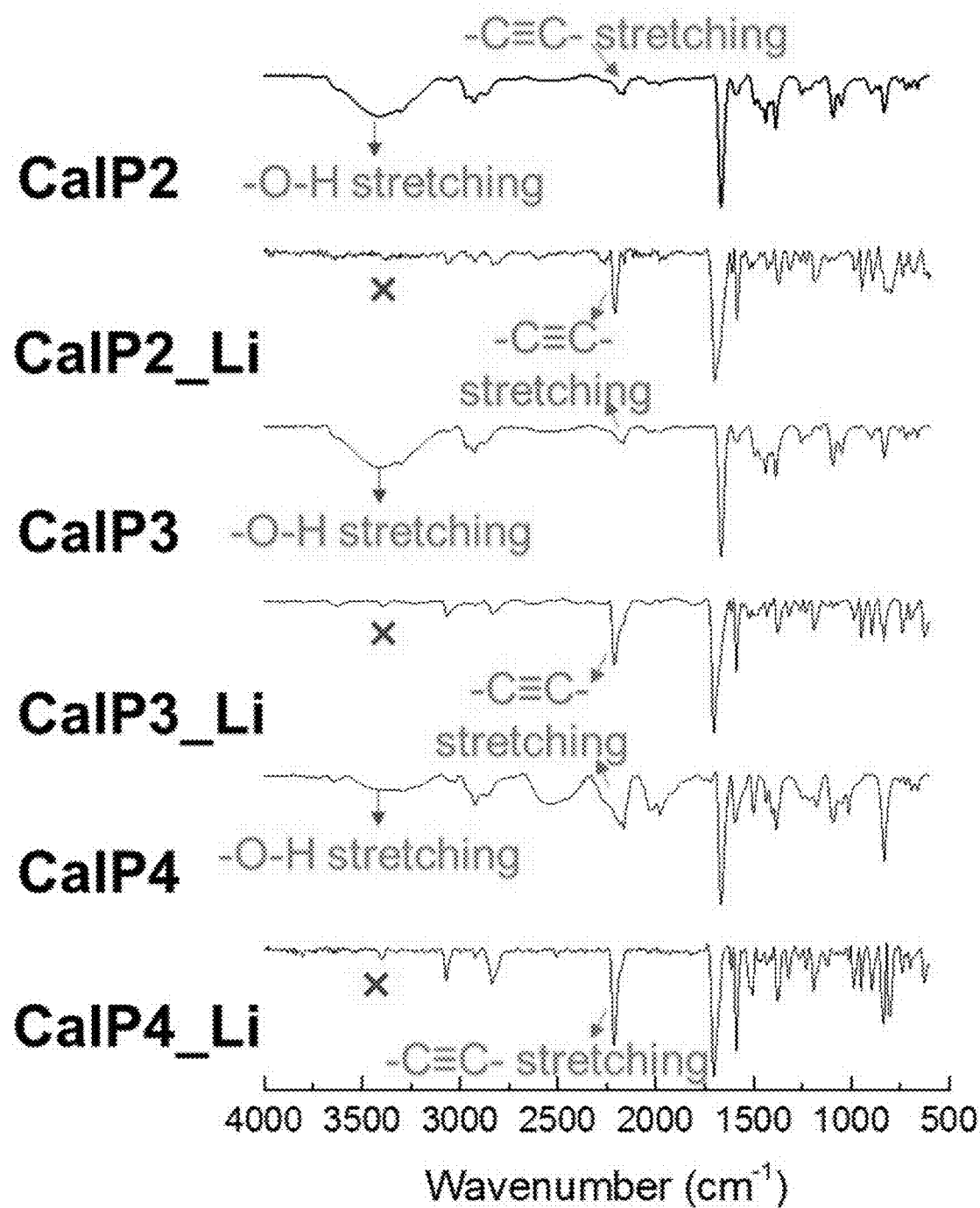
FIG. 49 shows FTIR spectra of CalP2, CalP3, CalP4, and their corresponding lithiated polymers (CalP2-Li, CalP3-Li, and CalP4-Li).
Figure 50:
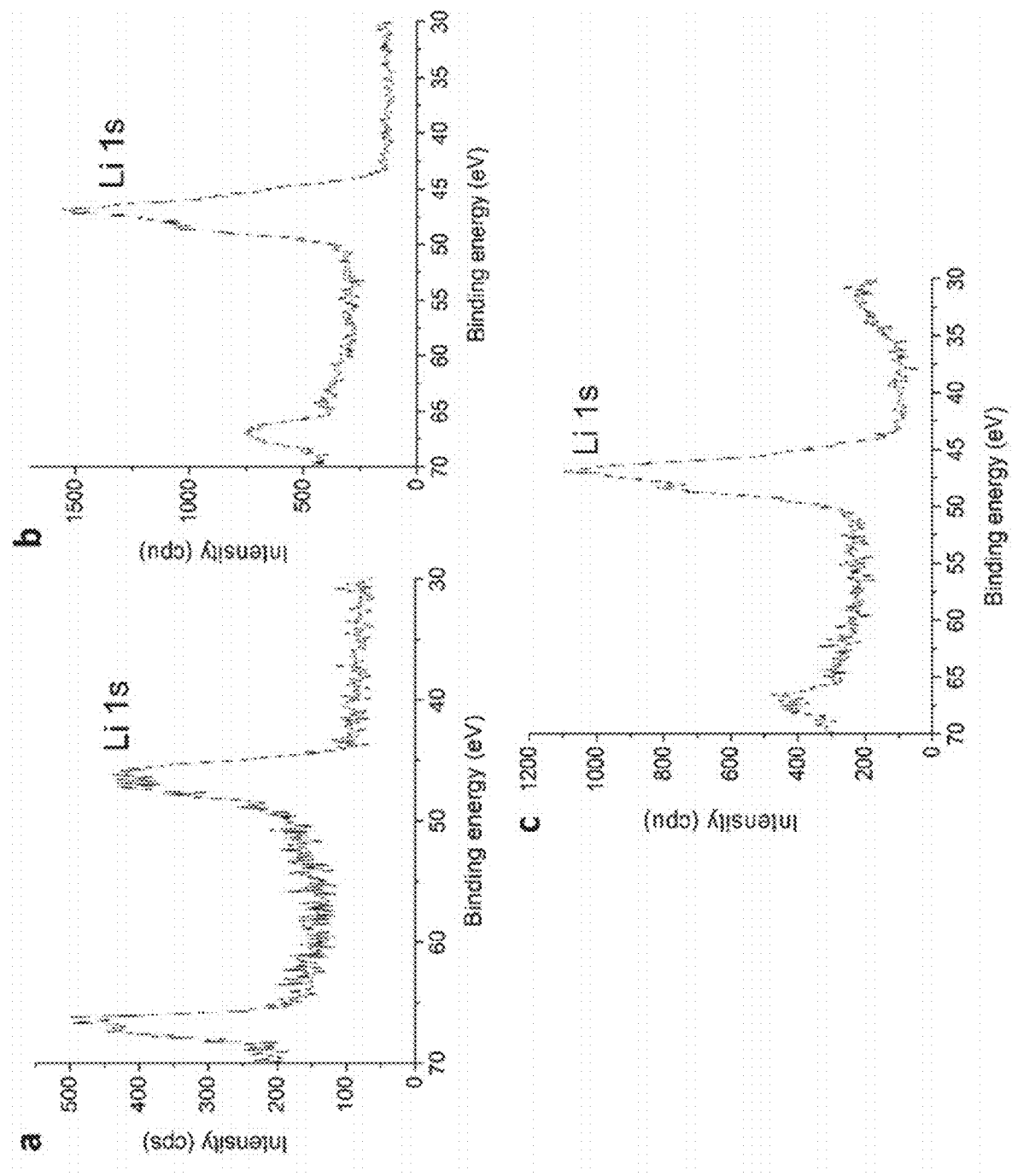
FIG. 50 shows an XPS spectrum of CalP2-Li (a), CalP3-Li (b) and CalP4-Li (c).
Figure 51:
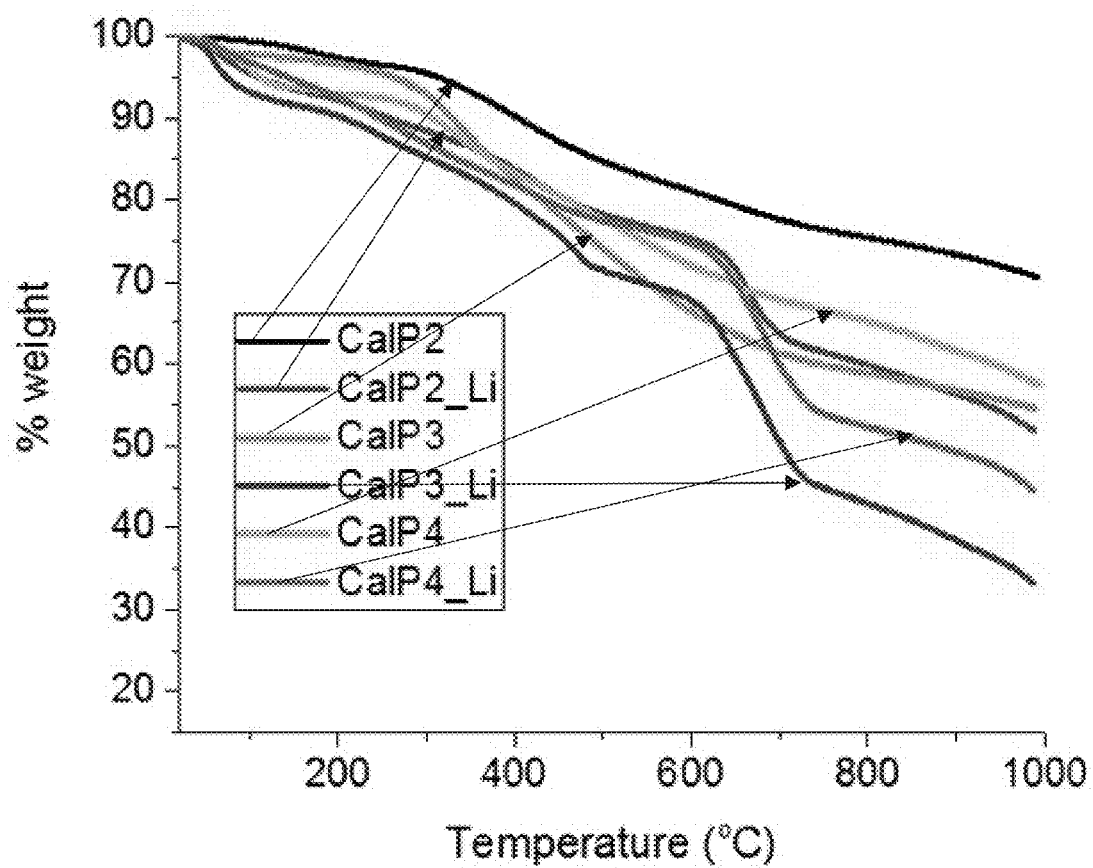
FIG. 51 shows TGA plots for CalP2 (black), CalP2-Li (red), CalP3 (green), CalP3-Li (blue), CalP4 (magenta) and CalP4-Li (pink).

Lithiation of the phenolic hydroxyl groups of the calix[4]arenes within the polymers was achieved by stirring the polymers in dry THF containing n-butyl lithium at −70° C. for 4 h. The mixtures were centrifuged and the solid products were washed with dry THF several times to remove excess n-butyl lithium. The polymers were heated to 120° C. under vacuum to remove impurities trapped within their networks. FTIR spectra (FIG. 49) of the lithiated polymers lack phenolic —O—H stretching vibrations but show alkynyl —C≡C— stretching bands that are also present in the spectra of the pre-lithiated polymers. These data indicate that the lithiated polymers are deprotonated yet remain intact. The presence of lithium was confirmed by X-ray photoelectron spectroscopy (XPS) and solid state lithium magic angle spinning NMR experiments ($^7$Li MAS-NMR). The Li is peak near 48 eV observed by XPS corresponds to ionic Li atoms (FIG. 50) and is consistent with the chemical shift range (0.038-0.087 ppm) of signals detected in the $^7$Li MAS NMR spectra of all three polymers (FIG. 37*d*). TGA analysis shows that the thermal stabilities of the lithiated polymers are similar those of the corresponding pre-lithiated ones (FIG. 51). The calculated BET surface areas determined from porosity measurements of CalP2-Li, CalP3-Li, and CalP4-Li were found to be 274, 308, and 445 m$^2$g$^{-1}$, respectively (FIG. 37*e*). These values are less than those for the corresponding pre-lithiated analogues. Further analysis of porosity showed that the total pore volumes of the lithiated polymers are much less than those of pre-lithiated ones (0.73 cm$^3$g$^{-1}$ for CalP2, 0.31 cm$^3$g$^{-1}$ for CalP2-Li, 0.639 cm$^3$g$^{-1}$ for CalP3 versus 0.558 cm$^3$g$^{-1}$ for CalP3-Li, 1.08 cm$^3$g$^{-1}$ for CalP4 and 0.588 cm$^3$g$^{-1}$ for CalP4-Li). However, though pore volume is decreased by lithiation, it is clear from NLDFT curves that pore-size distributions remain unchanged by this modification (FIG. 46-48).

Figure 38:
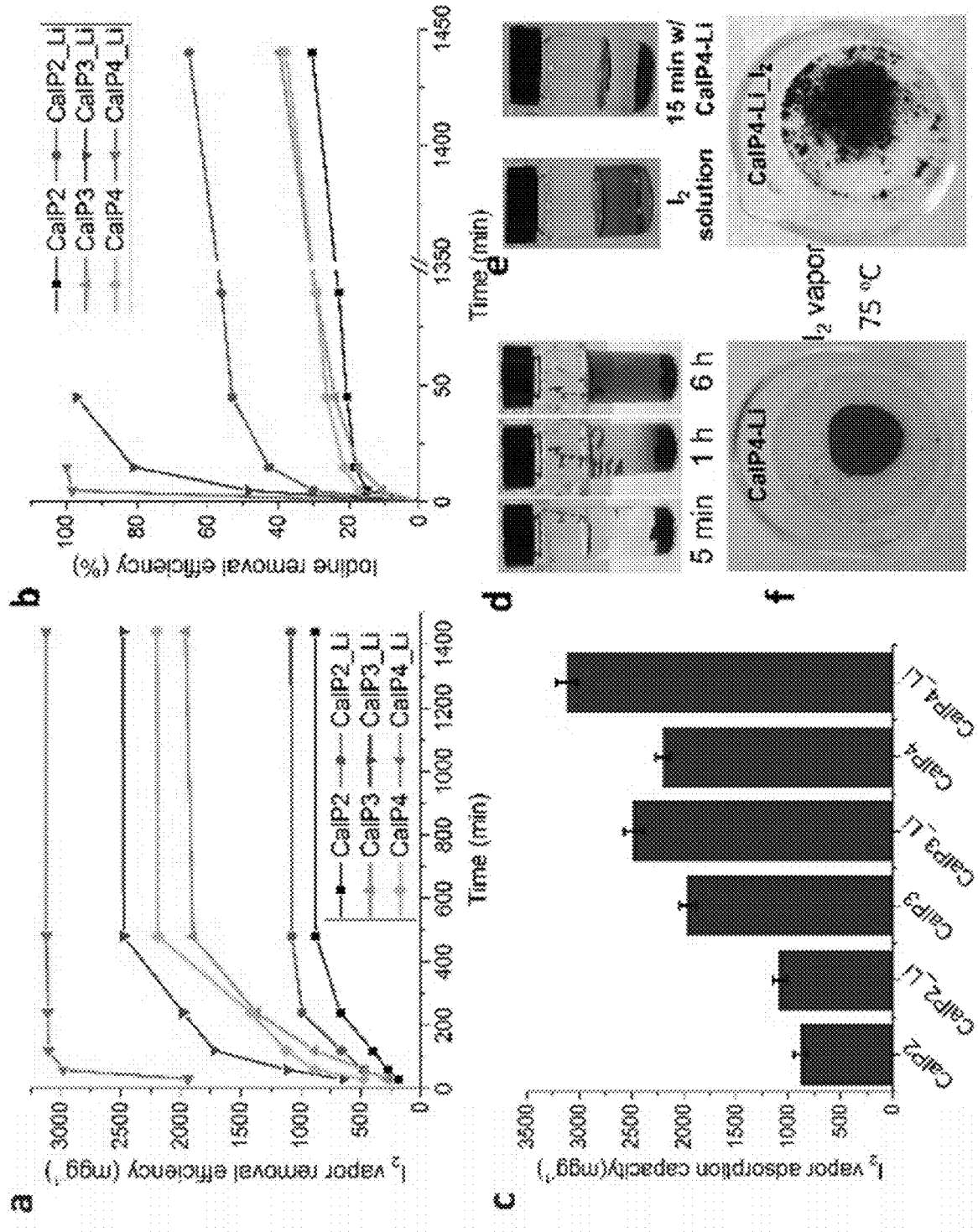
FIG. 38 shows a) iodine vapor uptake (mg g$^{-1}$) over time by pre-lithiated and lithiated polymers; CalP4-Li adsorbed $I_2$ vapor fastest, requiring only 30 min for maximum uptake. b) Efficiency of iodine removal from hexane solution by the polymers; lithiated polymers displayed faster uptake than non-lithiated polymers. c) Maximum $I_2$ vapor adsorption capacities (mg g$^{-1}$) of the polymers, with CalP4-Li showing the highest efficiency (312 wt %). d) Regeneration of CalP4-Li in EtOH after $I_2$ vapor adsorption. e) Solution of $I_2$ in hexane before (left) and after (right) addition of CalP4-Li. f) CalP4-Li powder before (left) and after (right) $I_2$ vapor adsorption.

Because of their extensive unsaturation, large surface areas and, in the case of the CalPn-Li series, lithium ion content, we anticipated that the polymers would exhibit high affinity for iodine. Iodine vapor capture experiments were conducted under previously reported typical nuclear fuel reprocessing conditions (75° C. and ambient pressure). FIG. 40 shows the chemical structures of the polymers as well as their surface areas and iodine uptake capacities. In a typical measurement, 25 mg of polymer powder was loaded in a pre-weighed glass vial, placed in a closed glass chamber and heated at ambient pressure. Gravimetric measurements were taken at intervals and as time progressed, the light brown color of the polymers darkened (FIG. 38f). Iodine uptake continued with time until the adsorption equivalent had been reached (FIG. 38a). The time required for maximum uptake varied but took no longer than 8 h for any sample. The maximum amount of $I_2$ adsorbed (FIG. 38b) also varied, with lithiated polymers outperforming their pre-lithiated counterparts (88 wt % for CalP2 vs 108 wt % for CalP2-Li; 196 wt % for CalP3 vs 248 for CalP3-Li; 220 wt % for CalP4 vs 312 wt % for CalP4-Li). Among all polymers tested, $I_2$ uptake was fastest with CalP4-Li, which required only 30 minutes for complete adsorption. CalP4-Li also displayed the the highest uptake efficiency, 312 wt %, which is one of the highest values measured for any porous material (Table 1).

Figure 52:
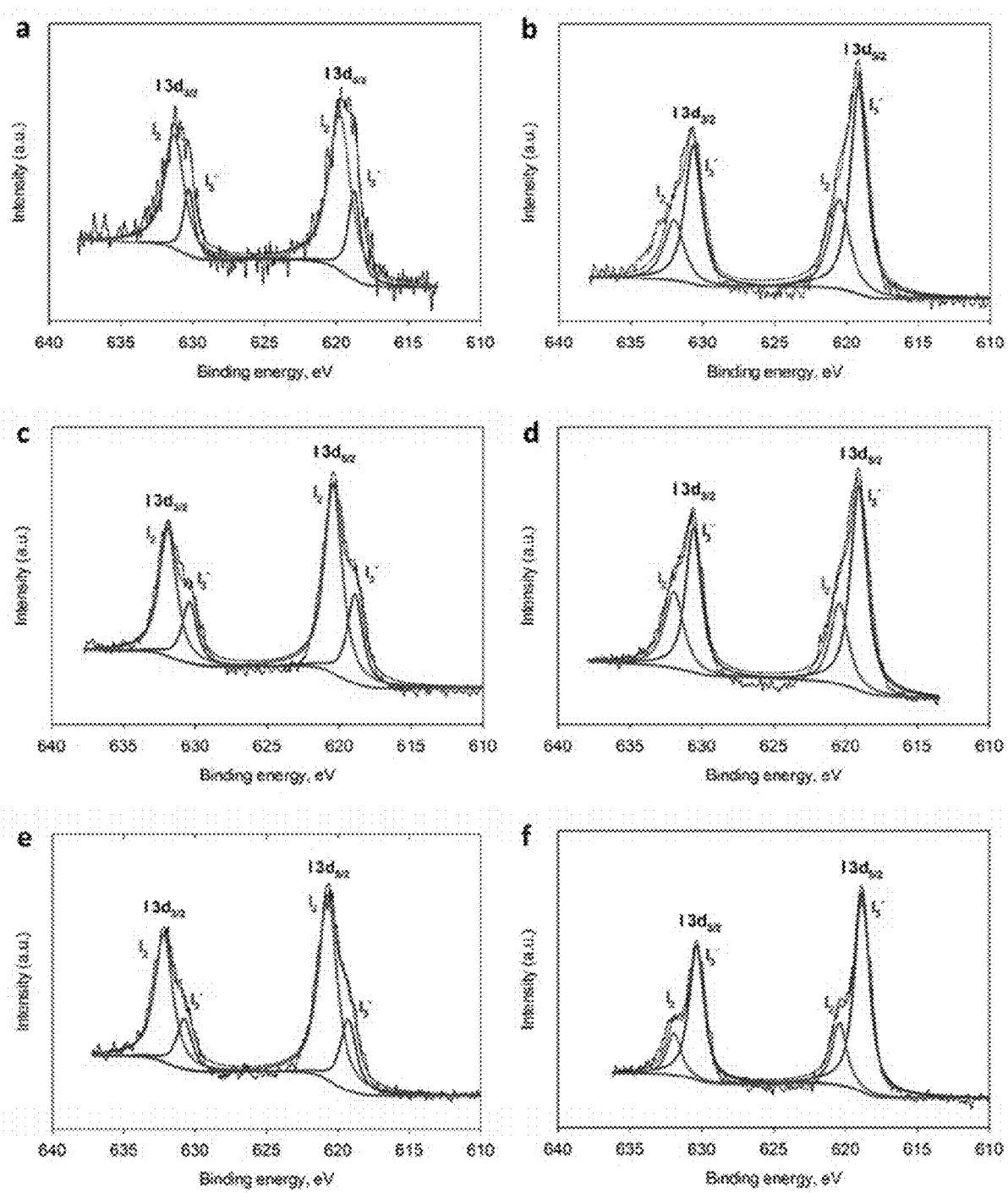
FIG. 52 shows deconvoluted XPS spectra of $I_2$-loaded CalP2 (a), CalP2-Li (a), CalP3 (c), CalP3-Li (d), CalP4 (e) and CalP4-Li (f). Region of interest is iodine potential.
Figure 53:
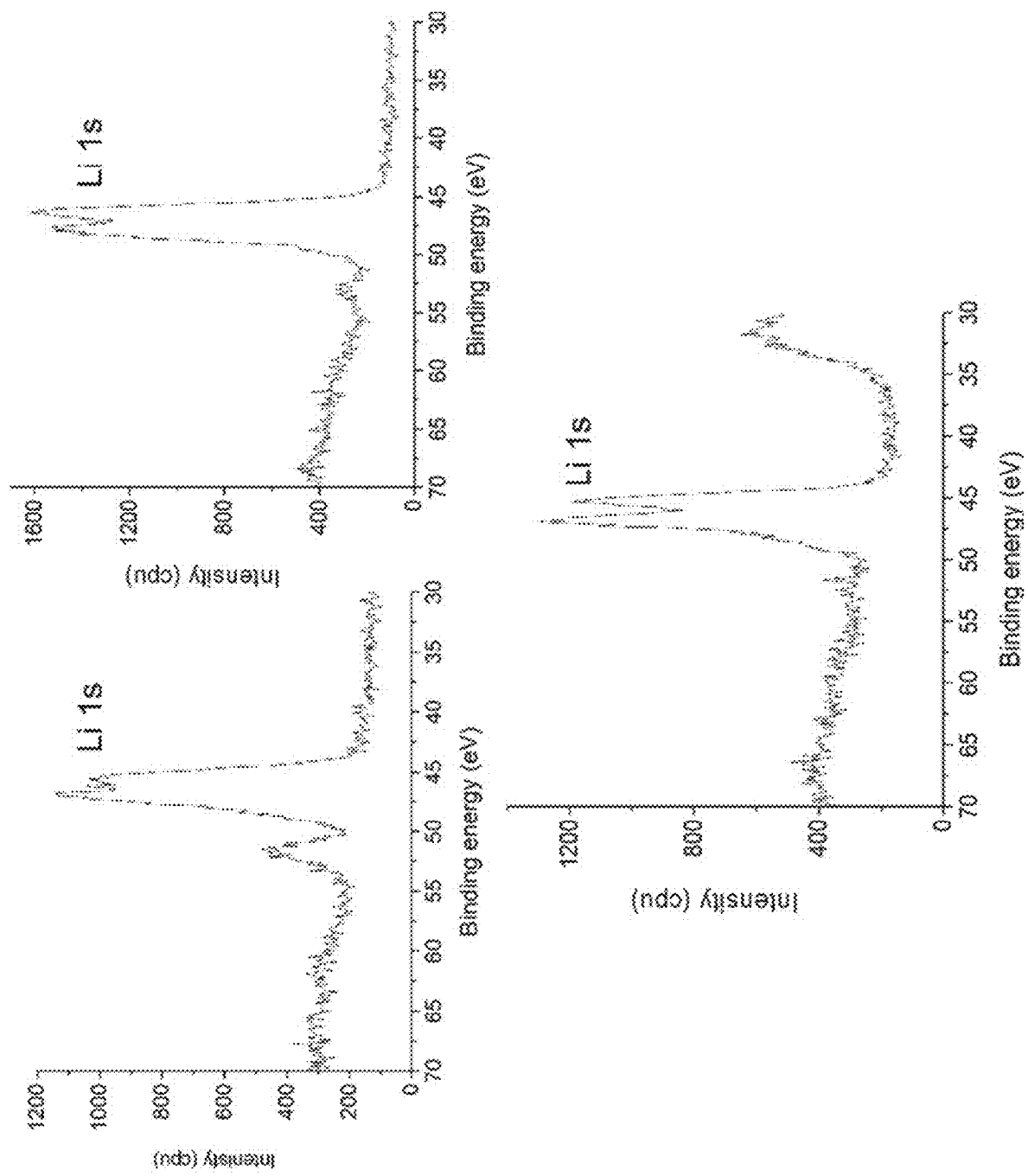
FIG. 53 shows an XPS spectrum of $I_2$-loaded CalP2 (a), CalP2-Li (a), CalP3 (c), CalP3-Li (d), CalP4 (e) and CalP4-Li (f). Region of interest is lithium potential.
Figure 54:
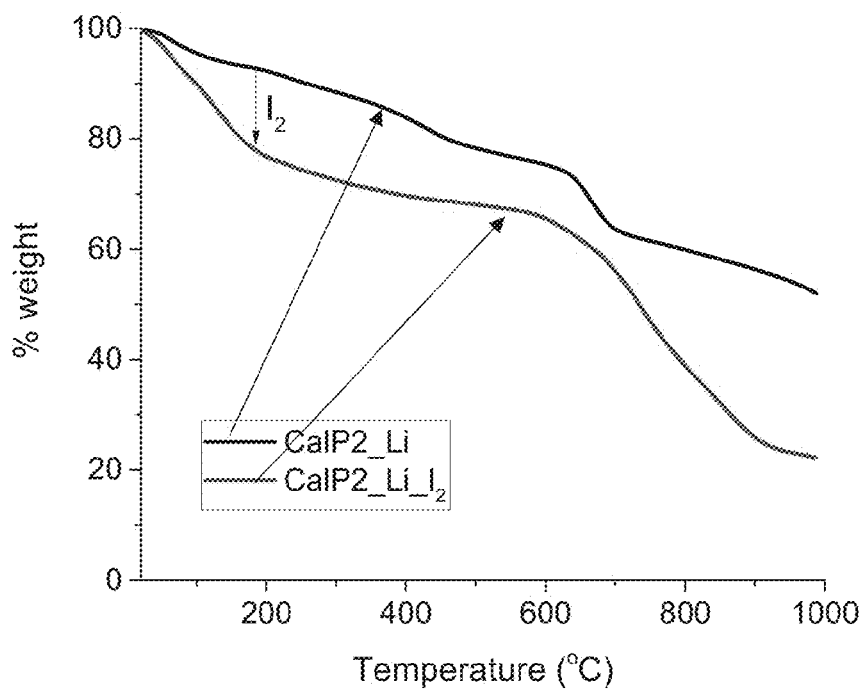
FIG. 54 shows TGA plots for CalP2-Li before (black) and after (red) $I_2$ adsorption.
Figure 55:
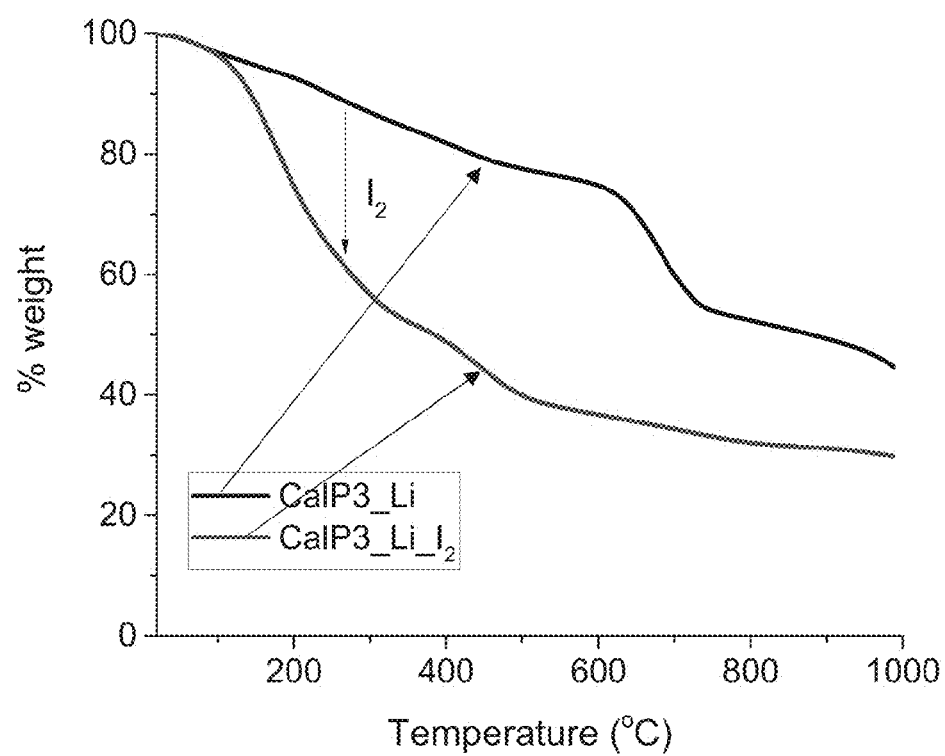
FIG. 55 shows TGA plots for CalP3-Li before (black) and after (red) $I_2$ adsorption.
Figure 56:
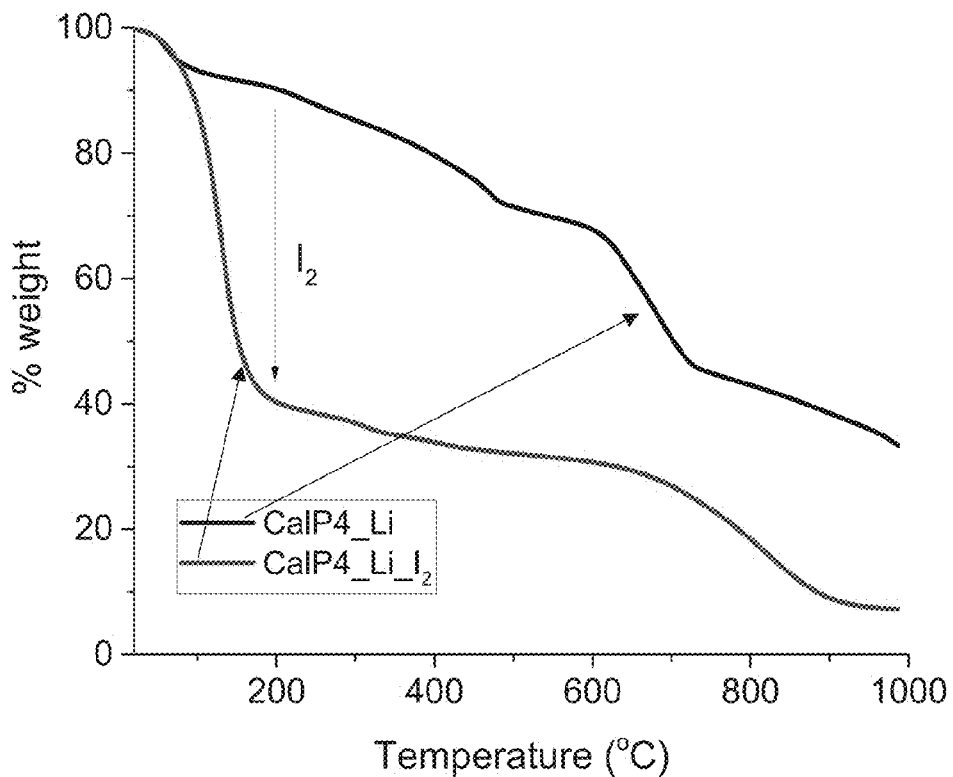
FIG. 56 shows TGA plots for CalP4-Li before (black) and after (red) $I_2$ adsorption.

In general, uptake of $I_2$ by an absorbent depends on the affinities of the material's molecular components for $I_2$ as well physical features of the bulk material such as pore size and pore volume. Of the lithiated polymers, CalP4-Li has, per repeat unit, the greatest number of aromatic rings (20) and alkynes (10), and we attribute the its fast $I_2$ uptake and high $I_2$ uptake capacity to interactions between $I_2$ and these groups as well as charged sites within the network. Intense XPS absorption peaks near 617 and 629 eV are attributable to 3d electrons of $I_2$ and confirm that all of the polymers adsorb iodine (FIG. 52). Deconvoluted XPS spectra indicate that iodine adsorbed on the surface of the pre-lithiated polymers mostly remains as neutral $I_2$, whereas most of the iodine adsorbed on the lithiated polymers is in the form of $I^3$ (Table S2). Furthermore, in the spectra of the lithiated polymers, we observe two peaks near 45 and 48 eV that correspond to Li is electrons (FIG. 53). The peak at 45 eV is possibly the result of electronic interaction between $Li^+$ and $I_2$. Iodine release was measured by TGA analysis (FIGS. 54-56). All $I_2$-loaded samples had similar release profiles, with significant mass loss occurring from 100 to 200° C. Nevertheless, there were differences. For example, loss was much greater in the case of $I_2$-loaded CalP4-Li (~60%) than it was with $I_2$-loaded CalP2-Li (~20%), reflecting the higher $I_2$-loading capacity of the former.

Figure 57:
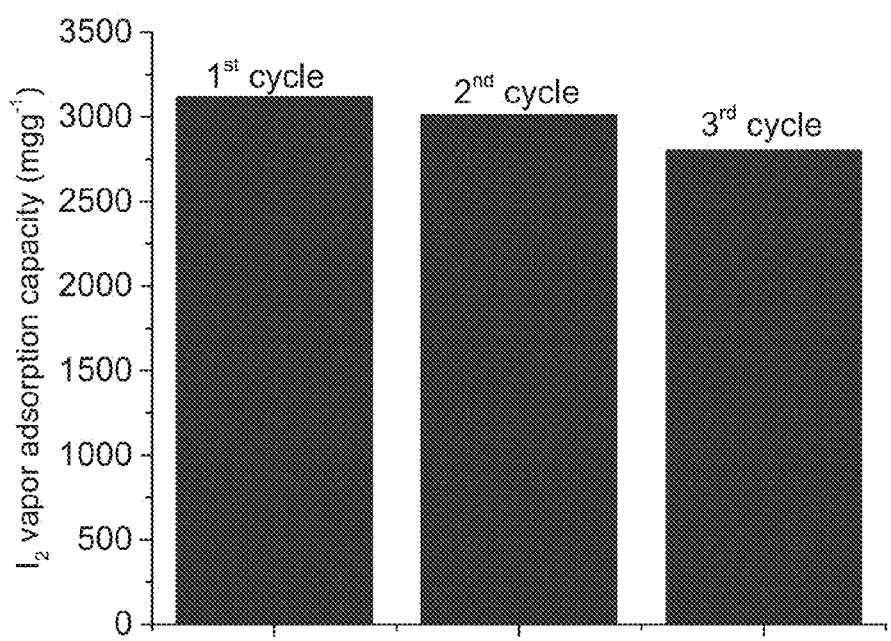
FIG. 57 shows recycling efficiency of CalP4-Li for $I_2$ vapor adsorption.

It was found that sorption of $I_2$ by the polymers is reversible. Captured $I_2$ could be easily removed by immersing the $I_2$-loaded samples in ethanol for 12 h at room temperature, during which time the colorless solutions gradually became dark brown (FIG. 38d), indicating $I_2$ release. After regeneration, the polymers were dried and could be re-used up to three times with negligible decrease in adsorption capacity (FIG. 57), an advantageous feature for practical applications.

Sorption of $I_2$ from solution was measured as well. All polymers were capable of removing iodine from hexane. In a typical experiment, a polymer sample (5 mg) was immersed in a hexane solution of iodine (10 mL, 1 mM) in a glass vial at room temperature. As a result of iodine adsorption, the dark purple color of the solution dissipated over time until the solution was colorless (FIG. 38e). In general, removal rates were much faster with the lithiated polymers than with the corresponding non-lithiated polymers (FIG. 38b). Uptake of $I_2$ by CalP3-Li and CalP4-Li was especially fast and efficient. Complete sorption was observed within 5 to 15 minutes.

A series of porous covalent polycalixa[4]arenes were synthesized and lithiated by post-synthetic modification to form charged polymeric networks. Both types of polymer, neutral and lithiated are π-electron rich and contain multiple sites for dipole-dipole, ion-dipole, and van der Waals interactions. All polymers were capable of iodine adsorption from solution and vapor phases. The lithiated polymers were generally faster and more efficient adsorbers. The iodine loading capacity of one of the lithiated polymers, CalP4-Li, is 312% (w/w), which is one of the highest measured for any porous material. These findings demonstrate that calixarene-based materials are potentially useful for environmental remediatian, and, in particular, as adsorbents of radioactive iodine Methods:

General. All the chemicals and solvents were purchased from Sigma-Aldrich and used without further purification. Deionized water was used from Millipore Gradient Milli-Q water purification system. Thin-layer chromatography (TLC) was performed on silica gel 60 F254 (E. Merck). The plates were inspected with UV light. Column chromatography was performed on silica gel 60F (Merck 9385, 0.040-0.063 mm). Routine nuclear magnetic resonance (NMR) spectra were recorded at 25° C. on a Bruker Avance spectrometer, with working frequencies of 500 MHz for $^1H$, and 125.7 MHz for $^{13}C$ nuclei, respectively. All chemical shifts are reported in ppm relative to the signals corresponding to the residual non-deuterated solvent (DMSO-$d_6$: δ=2.50 ppm).

Materials characterization. FTIR studies were carried out on Agilent 670-IR spectrometer. TGA experiments were performed on a TA SDT Q600. SEM images were obtained from FEI Quanta 450FEG. TEM images were obtained from a FEI-Titan 300. Solid-state cross-polarization magic angle spinning (CP/MAS)$^{13}C$ NMR spectra of the polymers were recorded on a Bruker Avance 500 Wide Bore (500 MHz) NMR spectrometer at ambient temperature with a magic angle spinning rate of 18.0 kHz. Solid-state magic angle spinning $^7Li$-MAS NMR spectra of the polymers were recorded on a Bruker Avance-I (300 MHz) NMR spectrometer at resonance frequency 107.7 MHz. We used a MAS double resonance probe designed for 4 mm o.d. zirconia spinners, and all the sample were spun at 10 kHz, at room temperature. UV-Vis studies were carried out on Cary 5000 UV-Vis-NIR spectrophotometer. All UV-Vis spectra were recorded at room temperature using a quartz cell with 10 mm or 1 mm path length over the range 200-800 nm and corrected against an appropriate background spectrum. Surface area measurements were conducted on a Micromeritics 3Flex gas sorption analyzer. Samples (50-150 mg) were degassed at 85° C. for 24 h and then backfilled with $N_2$. Adsorption isotherms were generated by incremental exposure to ultrahigh-purity nitrogen up to 1 atm in a liquid nitrogen bath, and surface parameters were determined using BET adsorption models included in the instrument software (Micromeritics ASAP 2020 V4.00). he elemental information and oxidation states of Li in the solid samples were analyzed using X-ray Photoelectron spectroscopy (XPS, Kratos AXIS UltraDLD). High resolution of I 3d and Li is XPS spectra was collected using monochromatic Al Kα (1486 eV) X-ray source at 40 eV or 20 eV of pass energy with 4 sweeps and then calibrated with 483.5 eV of C is XPS spectra, while a wide survey scan of the solid samples was collected at pass energy of 80 eV with 2 sweeps for identification of the all elemental information.

Synthesis of 5,11,17,23-Tetrabromo-25,26,27,28-tetrahydroxycalix[4]arene (1)

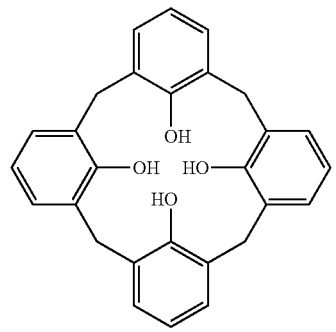

Bromine (0.4 mL, 7.84 mol) in DMF (5 mL) was added dropwise with stirring to a solution of calix[4]arene (0.5 g, 1.18 mmol) in DMF (20 mL). The solution was stirred for 4 h. A precipitate began to form after about 0.5 h. After the 4 h of reaction, methanol (20 mL) was added, and the mixture was left to stir for an additional 0.5 h. The precipitate was filtered off and washed with methanol to yield the brominated product, 1 (0.75 g, 87%) as a white solid. $^1$H NMR ([D6]DMSO, 25° C., 500 MHz): δ=7.34 (s, 8H), 3.81 ppm (br s, 8H). $^{13}$C NMR ([D6]DMSO, 25° C., 125.7 MHz): δ$_c$=151.8, 131.98, 131.08, 110.89, 30.94.

1,3,6,8-Tetrakis(trimethylsilylethynyl)pyrene

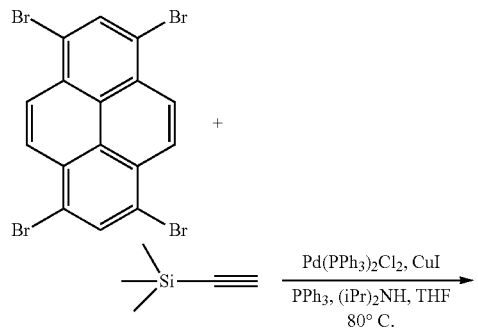

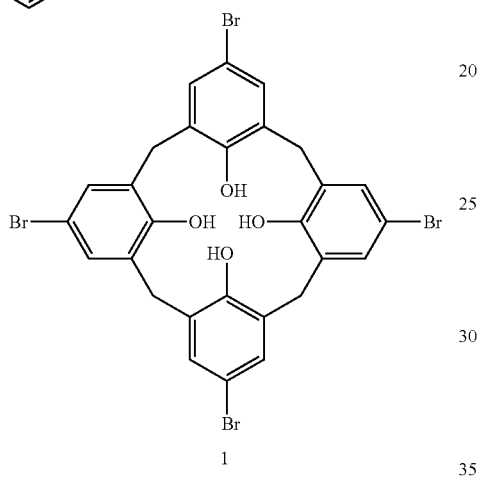

Compound 1,3,6,8-Tetrabromopyrene (1.0 g, 1.93 mmol), [PdCl$_2$(PPh$_3$)$_2$] (67 mg, 0.096 mmol), CuI (18 mg, 0.096 mmol), PPh$_3$ (50 mg, 0.193 mmol), and the terminal alkyne (11.6 mmol) were added to a degassed solution of diisopropylamine (20 mL) and THF (20 mL) under argon. The resulting mixture was stirred at 70° C. for 48 h. The reaction mixture was then cooled to room temperature and solvent was removed to give the crude reaction mixture. Column chromatographic purification of the crude product on silica gel with hexane as the eluent yielded a red orange solid (0.72 g, 66%). $^1$H NMR (CDCl$_3$, 25° C., 500 MHz): δ=8.51 (s, 4H), 8.26 (s, 2H), 0.37 (s, 36H) ppm. $^{13}$C NMR (CDCl$_3$, 25° C., 125.7 MHz): δ=134.5, 131.9, 126.8, 123.4, 118.5, 102.8, 101.3, 0.1 ppm.

1,3,6,8-Tetraethynylpyrene (4). To remove the silyl-protection groups, the filtrate was dissolved in ethanol (500 mL) in the presence of KOH (5 g), and stirred overnight. Two-thirds of solvent was removed by evaporation, and gradual addition of water gave a pale brownish precipitate. It was extracted using methylene chloride several times. Removal of the solvent gave the product 1 $^1$H NMR ([D8]THF, 25° C., 500 MHz): δ=8.68 (s, 4H), 8.34 (s, 2H), 4.28 (s, 4H) ppm. $^{13}$C NMR ([D8]THF, 25° C., 125.7 MHz): δ=135.7, 132.6, 127.3, 123.5, 119.1, 86.3, 81.9 ppm.

General Procedure for the Synthesis of Polymer.

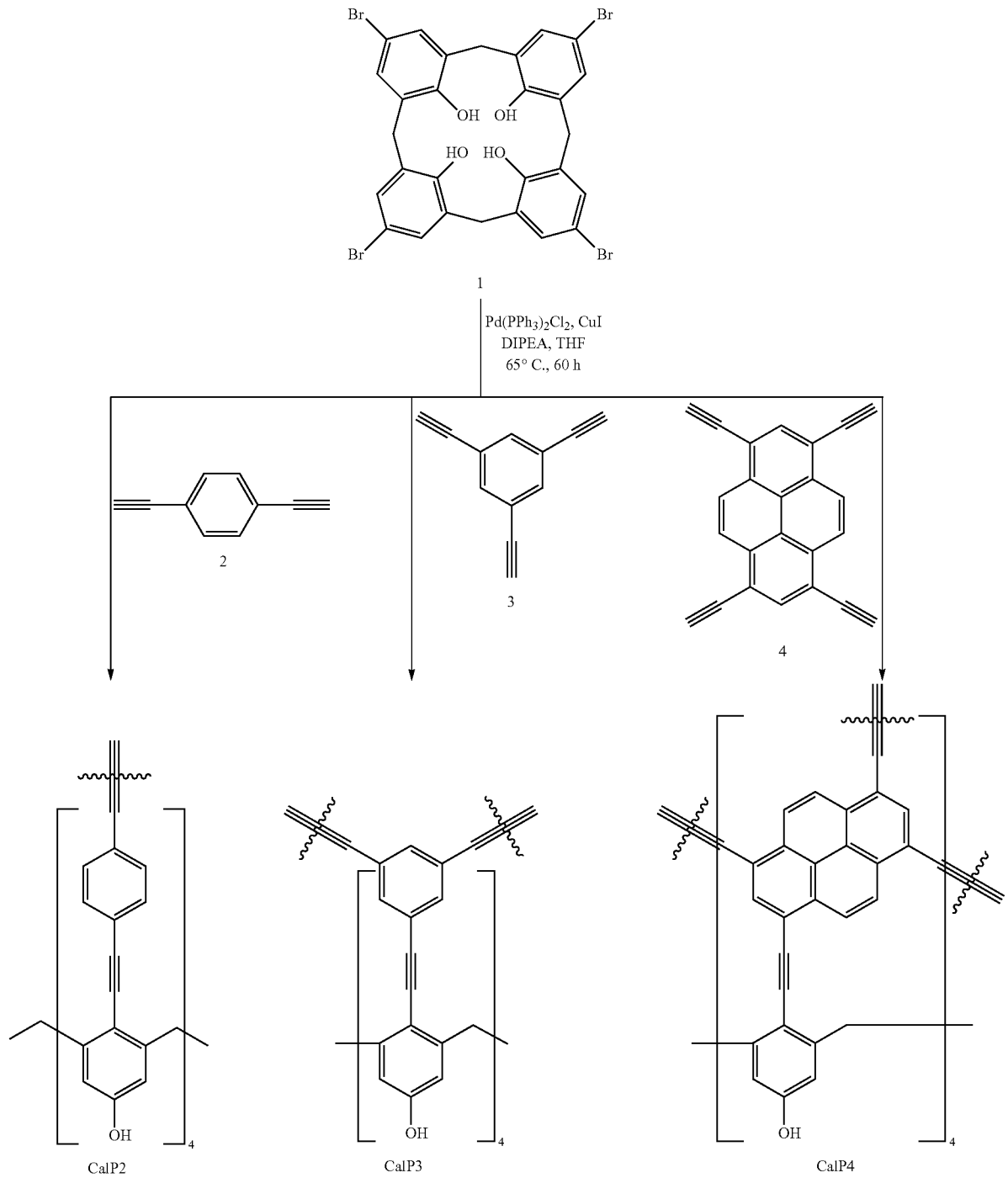

A solution of 5,11,17,23-Tetrabromo-25,26,27,28-tetrahydroxycalix[4]arene, bis(triphenylphosphine)palladium(II) chloride, and copper(I) iodide in anhydrous tetrahydrofuran were placed in a 250 mL two-neck round-bottom flask equipped with a condenser. Diisopropylamine and alkyne were loaded into a separate 50 mL flask. Both solutions were purged with argon for at least 15 min. The ethylnyl-compound solution was then added dropwise over 5 min to the calixarene solution with stirring to afford a dark brown reaction mixture after 5 min. The reaction was heated at 65° C. under argon for 60 h. After cooling to room temperature, the solid product was centrifuged and washed with excess (cold and hot) tetrahydrofuran, dimethyl acetamide, chloroform, ethanol, and (cold and hot) water to remove any unreacted monomers and metal catalyst residues. The final products were dried under a vacuum for 16 h at 60° C.

CalP2: 5,11,17,23-Tetrabromo-25,26,27,28-tetrahydroxycalix[4]arene (1.0 g, 1.36 mmol), 1,4 diethynylbenzene (0.34 g, 3.72 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (100 mL).

CalP3: 5,11,17,23-Tetrabromo-25,26,27,28-tetrahydroxycalix[4]arene (1.0 g, 1.36 mmol), 1,3,5-triethynylbenzene (0.275 g, 1.8 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (100 mL).

CalP4: 5,11,17,23-Tetrabromo-25,26,27,28-tetrahydroxycalix[4]arene (1.0 g, 1.36 mmol), 1,3,6,8-Tetraethynylpyrene (0.405 g, 1.36 mmol), bis(triphenylphosphine)palladium(II) chloride (0.285 g, 0.45 mmol), copper(I) iodide (0.13 g, 0.68 mmol), Diisopropylamine (1 mL), and tetrahydrofuran (160 mL).

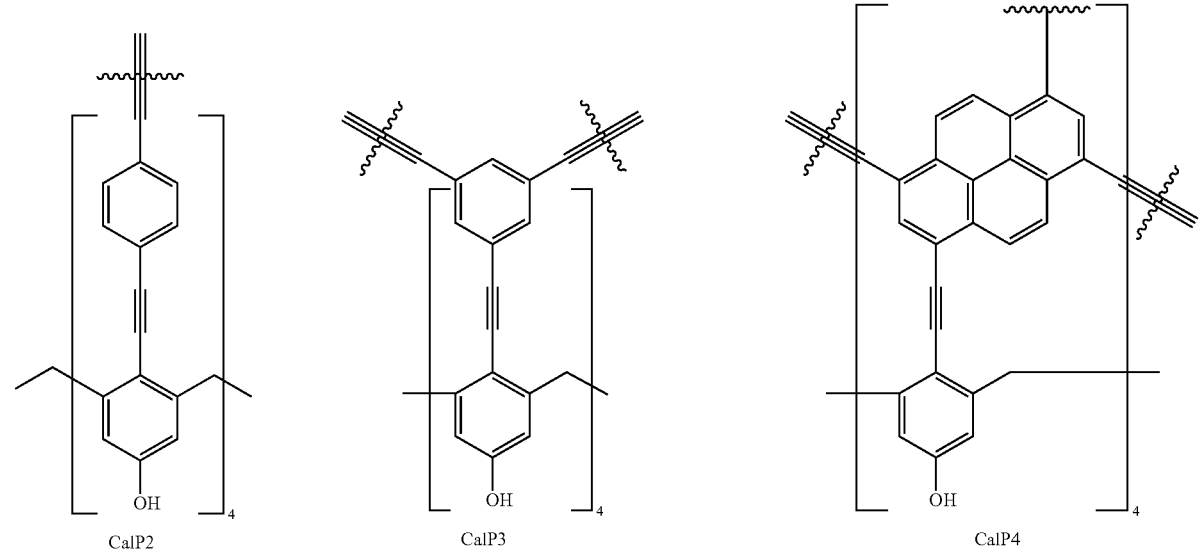

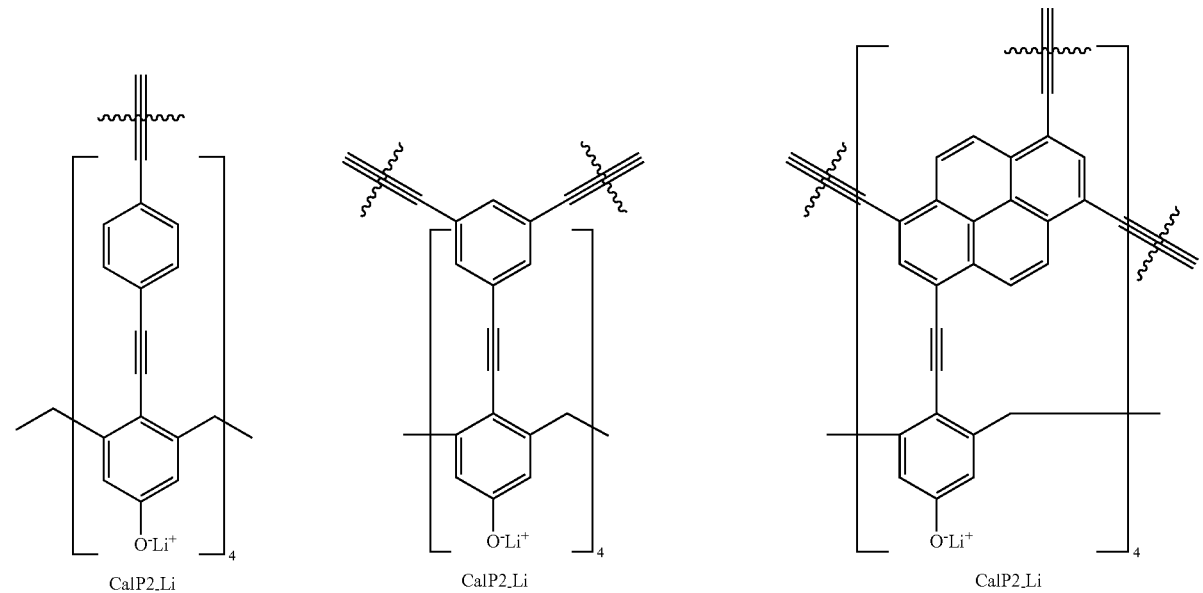

General procedure for the synthesis of lithiated-polymer. 0.2 g of each polymer (CalP2, CalP3, or CalP4) was immersed in anhydrous THF under argon atmosphere. The reaction mixture was stirred vigorously and cooled to −70° C. 3 mL of 2.0 M n-butyl lithium in cyclohexne was introduced slowly to the reaction flask while maintaining the temperature at −78° C. and continued stirring at same temperature for 4 h. After bringing the reaction flasks to room temperature, solid polymer was centrifuged and washed with anhydrous THF for 5 times. The resulting solid was dried under inert atmosphere and heated to 120° C. for 16 h to remove the trapped impurities.

TABLE 1

Comparison of iodine uptake capcities of our materials with those of other reported materials.

| Material | Sorption method | Adsorption time | Temp. (K) | $I_2$ uptake (wt %) |
|---|---|---|---|---|
| PAF-1 | Fixed vapor pressure | 10 h (In n-hexane) | 333 | 74.2 |
| JUC-Z2 | Vacuum swing adsorption | 10 h (Innhexane) | 298 | 59.0 |
| JUC-Z2 | Fixed vapor pressure | 10 h (Innhexane) | 333 | 80.4 |
| {[Zn3(DL1ac)2(pybz)2]·2.5DMF}n | Vapor adsorption/ Cyclohexane | 90 min (Vapor) 48 h (Cyclo-hexane) | — | 82.6 |
| PAF-24 | Vapor adsorption/ Cyclohexane | 48 h (Vapor) 72 h (cyclohexane) | 348 | 276 |
| Azo-Trip | Vapor adsorption/ Cyclohexane | 48 h (Vapor) 36 h (cyclohexane) | 350 | 233 |
| NiP-CMP | Vapor adsorption/ Cyclohexane | 48 h (Vapor) 24 h (cyclohexane) | 350 | 202 |
| [Mo3S13] | Vapor | 24 h | 333 | 100 |
| Sb4Sn3S12, Zn2Sn2S6, and K0.16CoSx | Vapor | 48 h | 348 | 225 |
| (BEA)2[PbBr4] | Vapor | 4-72 h | 313 | 43 |
| SCMP-II | Vapor | 60 min | 353 | 345 |
| HCMP-3 | Vapor | 40 min | 358 | 336 |
| COP-Series | Vapor/ Cyclohexane | 3-5 min | 333 | 195-380 |
| CalP2 | Vapor/ Cyclohexane | 8 h | 343 | 88 |
| CalP3 | Vapor/ Cyclohexane | 8 h | 343 | 196 |
| CalP4 | Vapor/ Cyclohexane | 8 h | 343 | 220 |
| CalP2_Li | Vapor/ Cyclohexane | 6 h | 343 | 108 |
| CalP3_Li | Vapor/ Cyclohexane | 2 h | 343 | 248 |
| CalP4_Li | Vapor/ Cyclohexane | 30 min | 343 | 312 |

N.B: Equilibrium uptake in weight (%) $\alpha = (m_2 - m_1)/m_1 \times 100$ wt %, $m_1$ = Sample mass and $m_2$ = (Sample + iodine) mass.

TABLE 2

Summary of I 3d XPS spectra of solid samples

| Sample | S.O.S* | O.S.I** | B.E. (eV) | FWHM*** | Area | % Area | $I_2/I_3^-$ |
|---|---|---|---|---|---|---|---|
| CalP2-Li | I $3d_{3/2}$ | $I_2$ | 631.9 | 1.67 | 3028 | 13.7 | 0.52 |
| | | $I_3^-$ | 630.7 | 1.40 | 5809 | 26.3 | |
| | I $3d_{5/2}$ | $I_2$ | 620.5 | 1.70 | 4542 | 20.6 | |
| | | $I_3^-$ | 619.2 | 1.40 | 8715 | 39.4 | |
| CalP3-Li | I $3d_{3/2}$ | $I_2$ | 631.9 | 1.58 | 4789 | 17.0 | 0.51 |
| | | $I_3^-$ | 630.6 | 1.29 | 7428 | 26.4 | |
| | I $3d_{5/2}$ | $I_2$ | 620.4 | 1.48 | 4788 | 17.0 | |
| | | $I_3^-$ | 619.1 | 1.37 | 11143 | 39.6 | |
| CalP4-Li | I $3d_{3/2}$ | $I_2$ | 631.9 | 1.19 | 1762 | 9.30 | 0.30 |
| | | $I_3^-$ | 630.4 | 1.25 | 5799 | 30.8 | |
| | I $3d_{5/2}$ | $I_2$ | 620.4 | 1.22 | 2644 | 13.9 | |
| | | $I_3^-$ | 618.8 | 1.26 | 8699 | 46.0 | |
| CalP2 | I $3d_{3/2}$ | $I_2$ | 631.3 | 1.64 | 1867 | 30.3 | 3.13 |
| | | $I_3^-$ | 630.3 | 0.9 | 597 | 9.69 | |
| | I $3d_{5/2}$ | $I_2$ | 619.8 | 1.82 | 2802 | 45.5 | |
| | | $I_3^-$ | 618.8 | 1.02 | 896 | 14.5 | |
| CalP3 | I $3d_{3/2}$ | $I_2$ | 631.9 | 1.45 | 7362 | 28.2 | 2.39 |
| | | $I_3^-$ | 630.4 | 1.27 | 3097 | 11.8 | |
| | I $3d_{5/2}$ | $I_2$ | 620.4 | 1.46 | 11044 | 42.3 | |
| | | $I_3^-$ | 618.9 | 1.31 | 4646 | 17.7 | |
| CalP4 | I $3d_{3/2}$ | $I_2$ | 632.2 | 1.50 | 5764 | 29.9 | 2.96 |
| | | $I_3^-$ | 630.8 | 1.27 | 1929 | 10.1 | |
| | I $3d_{5/2}$ | $I_2$ | 620.7 | 1.56 | 8647 | 44.9 | |
| | | $I_3^-$ | 619.3 | 1.35 | 2894 | 15.1 | |

*S.O.S = Spin-orbit splitting
**O.S.I = Oxidation states of iodine
***FWHM = Full width at half-maximum of a peak Although the present disclosure has been described with respect to one or more particular embodiments and/or examples, it will be understood that other embodiments and/or examples of the present disclosure may be made without departing from the scope of the present disclosure.

The invention claimed is:

1. A porous polymeric material comprising a plurality of calixarene moieties crosslinked by one or more crosslinking moieties, wherein the calixarene has the following structure:

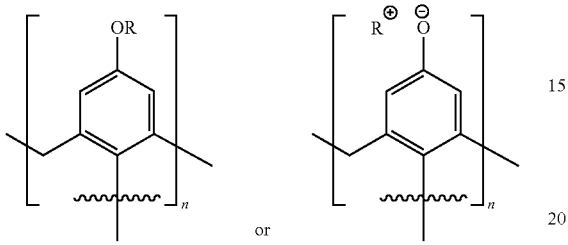

wherein
R is at each occurrence in the polymeric material independently H, $Na^+$, $K^+$, $Cs^+$, $Li^+$; a polyether group or a polythioether group, or a combination thereof,
two R groups are linked by a polyether moiety or polythioether moiety.

2. The porous polymeric material of claim 1, wherein the calixarene is chosen from substituted or unsubstituted calix[4]arene moieties, substituted or unsubstituted calix[6]arene moieties, substituted or unsubstituted calix[8]arene moieties, and combinations thereof.

3. The porous polymeric material of claim 1, wherein the one or more crosslinking moieties have 5 to 40 carbons and comprise one or more $C_5$-$C_{30}$ aromatic moiety and, optionally, one or more $C_2$ alkynyl moieties.

4. The porous polymeric material of claim 3, wherein the aromatic moiety comprises one or more fused-ring moiety and/or one or more biaryl moiety.

5. The porous polymeric material of claim 1, wherein the crosslinking moiety has the following structure:
—Ar—$(R^2)_x$—, wherein
Ar is independently at each occurrence in the polymeric material comprises one or more $C_5$-$C_{20}$ aryl moiety;
$R^2$ are independently at each occurrence in the polymeric material a $C_2$ alkynyl moiety or —B(—(O)—)$_2$ moiety; and
x is 2, 3, 4, 5, 6, 7, or 8.

6. The porous polymeric material of claim 5, wherein the crosslinking moiety has the following structure:
—$R^1$—Ar—$R^2$—, wherein
$R^1$ and $R^2$ are independently at each occurrence in the polymeric material a $C_2$ alkynyl moiety.

7. The porous polymeric material of claim 6, wherein the crosslinking moiety further comprises one or more aryl linking moiety that is covalently bound to two or more aryl moieties.

8. The porous polymeric material of claim 7, wherein the crosslinking linking moiety is selected from the group consisting of:
$C_1$-$C_6$ aliphatic moieties, —S(O)—, phosphorous atom, nitrogen atom, $C_5$-$C_{30}$ aryl or heteroaryl moieties, and combinations thereof.

9. The porous polymeric material of claim 1, wherein in the one or more crosslinking moieties is/are selected from the group consisting of:

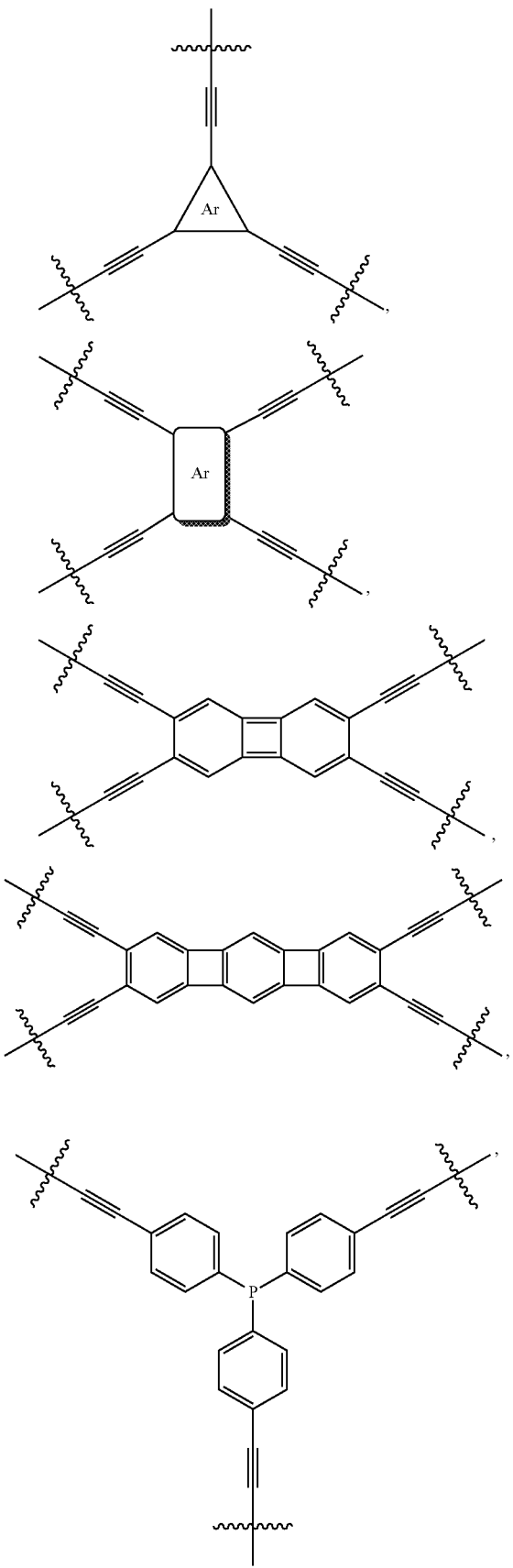

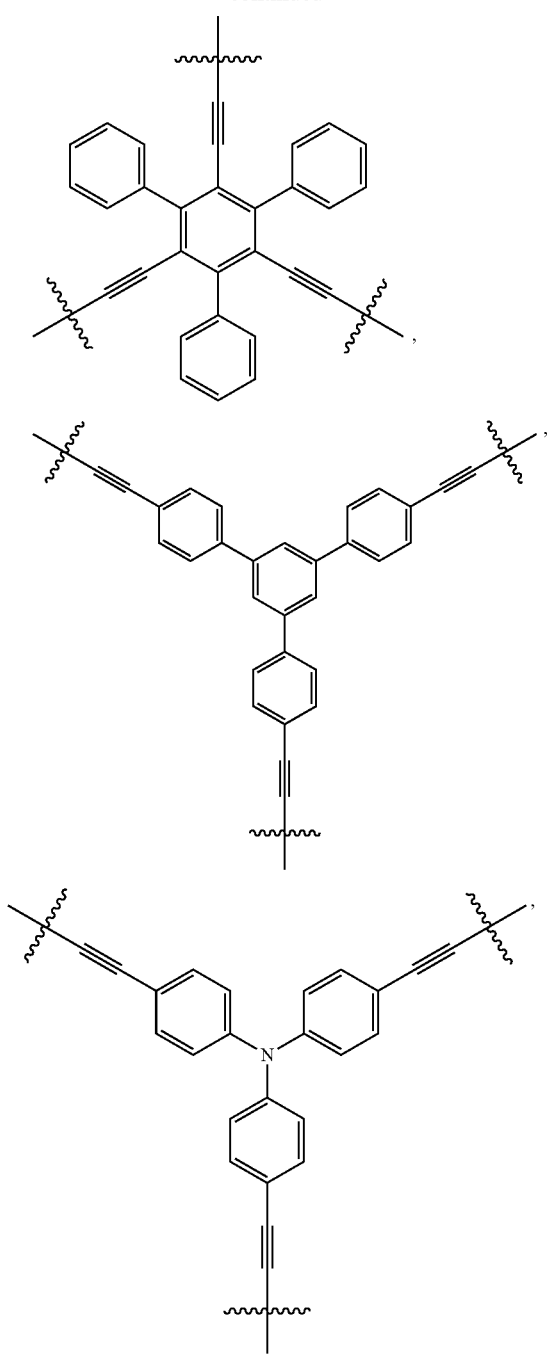

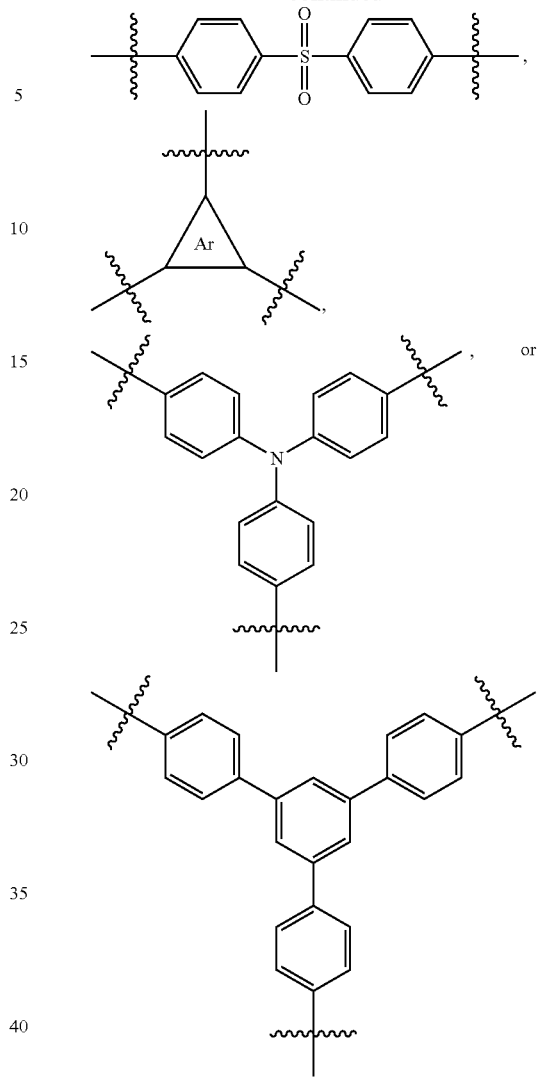

and combinations thereof, wherein Ar is independently at each occurrence in the porous polymeric material comprises one or more $C_5$-$C_{20}$ aryl moiety; or

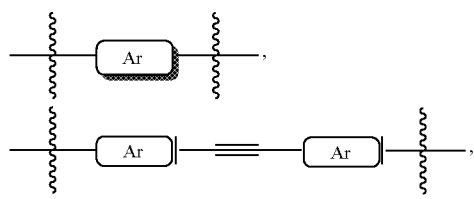

or a combination thereof, wherein Ar is independently at each occurrence in the porous polymeric material comprises one or more $C_5$-$C_{30}$ aryl moiety.

10. The porous polymeric material of claim 1, wherein the porous polymeric material is mesoporous and/or microporous, has a Brunauer-Emmett-Teller (BET) surface area of 100 m²/g to 5000 m²/g, is amorphous, exhibits a surface tension of 120 degrees to 180 degrees, is insoluble in aqueous solvents, or a combination thereof.

11. A method of preparing a porous polymeric material of claim 1, comprising reacting one or more calixarene compounds having a plurality of reactive groups with one or more crosslinking compounds comprising i) at least two terminal alkyne groups or ii) at least two boronic acid groups and/or boronate ester groups in the presence of a metal catalyst,
wherein the porous polymeric material is formed.

12. The method of claim 11, wherein the calixarene compound is a substituted calix[4]arene, a substituted calix[6]arene, a substituted calix[8]arene, or a combination thereof.

13. The method of claim 11, wherein the one or more calixarene compounds are selected from the group consisting of tetrabromo-calix[4]arene-tetrol (5,11,17,23-tetrabromo-25,26,27,28-tetrahydroxycalix[4]arene), hexabromo-calix[6]arene-hexol, octabromo-calix[8]arene-octol, p-sulfonatocalix[4,6,8]arenes, thia-crown-calix[4,6,8]arenes, and combinations thereof.

14. The method of claim 11, wherein the one or more crosslinking compounds are selected from the group consisting of 1,4-diethynylbenzene, 1,3,5-triethynylbenzene, 1,3,6,8-tetraethynylpyrene, di-, tri- and tetra-ethynyl derivatives of substituted and/or unsubstituted phenyl moieties, biphenyl moieties, heteroaryl moieties, and combinations thereof.

15. The method of claim 11, wherein the stoichiometric ratio of the reactive groups of the one or more calixarene compounds and crosslinking compounds is 1:1.

16. The method of claim 11, wherein the polymeric material comprises a plurality of phenoxy groups and the polymeric material is contacted with a lithium source and a lithiated polymeric material is formed or the polymeric material is contacted with a metal source and a metalated polymeric material is formed.

17. An article of manufacture comprising the porous polymeric material of claim 1 or a porous polymeric material made by the method of claim 11.

18. The article of manufacture of claim 17, wherein the article of manufacture is a column or filter cartridge.

19. A method of
   i) purifying a sample comprising one or more pollutants, the method comprising contacting the fluid sample with the porous polymeric material of claim 1, a polymeric material made by the method of claim 11, or the article of manufacture of claim 17, whereby at least 80% of the total amount of the one or more pollutants in the fluid sample is adsorbed by the porous polymeric material, and optionally, reusing the porous material from which at least part of the one or more pollutants have been removed;
   ii) determining the presence or absence of compounds in a sample comprising:
      a) contacting the sample with the porous polymeric material of claim 1, a porous polymeric material made by the method of claim 11, or the article of manufacture of any one of claim 17 for an incubation period;
      b) separating the porous polymeric material from a) from the sample; and
      c) heating the porous polymeric material from b) or contacting the porous polymeric material from b) with a solvent such that at least a portion of the compounds are the released by the porous polymeric material; and
      d) determining the presence or absence of any compounds, wherein the presence of one or more compounds correlates to the presence of the one or more compounds in the sample, or isolating the compounds;
   iii) removing compounds from a sample comprising:
      a) contacting the sample with the porous polymeric material of claim 1, a polymeric material made by the method of claim 11, or the article of manufacture of claim 17 for an incubation period such that at least some of the compounds are sequestered in the polymer;
      b) separating the porous polymeric material from a) from the sample;
      c) heating the porous polymeric material from b) or contacting the porous polymeric material from b) with a solvent such that at least part of the compounds are released by the porous polymeric material; and
      d) optionally, isolating at least a portion of the compounds;
      e) optionally, repeating steps a-d with the porous material from c) from which at least part of the compounds have been released.

* * * * *